(12) United States Patent
Kato

(10) Patent No.: US 6,912,996 B2
(45) Date of Patent: Jul. 5, 2005

(54) ENGINE WITH FUEL INJECTION SYSTEM

(75) Inventor: Masahiko Kato, Shizuoka (JP)

(73) Assignee: Yamaha Marine Kabushiki Kaisha, Shizuoka ( * ) Notice: Subject to any disclaimer, the term of this patent is extended or adjusted under 35 U.S.C. 154(b) by 82 days.

(21) Appl. No.: 10/420,538

(22) Filed: Apr. 21, 2003

(65) Prior Publication Data
US 2004/0007212 A1 Jan. 15, 2004

(30) Foreign Application Priority Data

Apr. 19, 2002 (JP) .......................................... 2002-117200
May 23, 2002 (JP) .......................................... 2002-149597

(51) Int. Cl.$^7$ ............................................. F02M 55/02
(52) U.S. Cl. ......................... 123/469; 123/456; 123/494
(58) Field of Search ................................. 123/456, 468, 123/469, 470, 494, 458

(56) References Cited

U.S. PATENT DOCUMENTS

| | | | |
|---|---|---|---|
| 5,036,669 A | * | 8/1991 | Earleson et al. ............... 60/602 |
| 5,699,766 A | | 12/1997 | Saito |
| 5,723,780 A | * | 3/1998 | Miwa et al. ............... 73/119 A |
| 5,785,025 A | * | 7/1998 | Yoshiume et al. .......... 123/497 |
| 5,791,304 A | * | 8/1998 | Taipale ...................... 123/73 C |
| 5,957,112 A | | 9/1999 | Takahashi et al. |
| 6,032,638 A | | 3/2000 | Kato |
| 6,032,654 A | * | 3/2000 | Kato ........................... 123/509 |
| 6,058,907 A | | 5/2000 | Motose et al. |
| 6,098,013 A | * | 8/2000 | Mueller ....................... 701/112 |
| 6,119,453 A | | 9/2000 | Motose et al. |
| 6,135,095 A | | 10/2000 | Motose et al. |
| 6,148,777 A | | 11/2000 | Motose et al. |
| 6,213,096 B1 | | 4/2001 | Kato et al. |
| 6,220,217 B1 | | 4/2001 | Kato |
| 6,276,338 B1 | | 8/2001 | Kato et al. |
| 6,295,955 B1 | | 10/2001 | Kato et al. |
| 6,295,956 B1 | | 10/2001 | Kato et al. |
| 6,302,086 B1 | | 10/2001 | Kato |
| 6,302,088 B1 | | 10/2001 | Kato |
| 6,305,354 B1 | | 10/2001 | Kato |
| 6,321,711 B1 | | 11/2001 | Kato |
| 6,354,277 B1 | | 3/2002 | Kato |
| 6,357,402 B1 | | 3/2002 | Kato |
| 6,460,511 B2 | | 10/2002 | Kato |
| 6,609,372 B2 | * | 8/2003 | Maddock et al. ............. 60/602 |

FOREIGN PATENT DOCUMENTS

| | | |
|---|---|---|
| JP | 2000-179432 | 12/1998 |
| JP | 2001-65386 | 8/1999 |

* cited by examiner

Primary Examiner—Thomas Moulis
(74) Attorney, Agent, or Firm—Knobbe, Martens, Olson & Bear, LLP

(57) ABSTRACT

An engine incorporates a fuel injector to supply fuel to a combustion chamber defined in an engine body. At least one fuel rail defines a fuel passage through which fuel is supplied to the fuel injector. The fuel rail is mounted to the engine body. A fuel pump pressurizes the fuel. A sensor unit is elastically mounted to the fuel rail. The sensor unit has a fuel pressure sensor that detects a pressure of the fuel pressurized by the fuel pump. The engine body has bosses that project therefrom. The engine body defines bolt holes that extend through the bosses and into the engine body adjacent to the bosses. A threaded section is formed in each bolt hole in the engine body adjacent to the corresponding boss. A bolt is screwed down into each threaded section. A portion of each bolt is spaced apart from an inner surface of a corresponding bolt hole to reduce the effects of thermal expansion of the engine body and the fuel rail.

34 Claims, 22 Drawing Sheets

ENGINE WITH FUEL INJECTION SYSTEM

PRIORITY INFORMATION

This application is based on and claims priority to Japanese Patent Applications Nos. 2002-117200 (filed on Apr. 19, 2002) and 2002-149597 (filed on May 23, 2002), the entire contents of which are hereby expressly incorporated by reference.

BACKGROUND OF THE INVENTION

1. Field of the Invention

The present invention generally relates to a fuel injection engine, and more particularly relates to a fuel injection engine that incorporates a fuel conduit through which fuel is supplied to the engine.

2. Description of Related Art

In all fields of engine design, there is an emphasis on obtaining more effective emission control, achieving better fuel economy and increasing power output. This trend has led to the use of fuel injection systems, as opposed to carburetors, as the engine charge former.

Some fuel injection systems inject fuel into the air intake manifold. Direct fuel injection systems inject fuel directly into the combustion chamber. Direct fuel injection systems potentially have significant advantages over indirect fuel injection systems including improved emission control. Marine engines, such as outboard motors, can employ direct injection systems.

A direct injection system incorporates a high-pressure fuel pump to pressurize the fuel entering the combustion chamber. Typically, the pressure of the fuel is higher than the pressure in the combustion chamber at the compression stroke to minimize the particle size of the injected fuel and to improve the penetration of the injected fuel into the high-pressure combustion chamber.

In general, engines can employ a mechanical high-pressure pump for pressurizing the fuel. The engines can also incorporate a fuel pressure sensor to detect the fuel pressure. The detected signal may be used in an electrical control system to control the engine operation. For example, an electronic control unit (ECU) of the engine may use the fuel pressure signal for adjusting the amount of injected fuel under certain conditions. For example, the amount of injected fuel may be adjusted when the engine is in a start up operation.

Pressurized fuel can be supplied to a fuel injector through a fuel rail. The fuel rail preferably is made of a metal material and is rigidly affixed to the engine. An ECU can be disposed close to the fuel rail. The fuel pressure sensor can be mounted to the fuel rail for easy connection with the ECU.

The fuel pressure sensor can incorporate electric circuit elements in addition to a pressure sensor. Such elements may include, for example, amplifying circuit elements that amplify the detected signal and temperature compensating circuit elements that adjust the detected signal in complying with temperature changes.

Additionally, the fuel rail can be mounted to the engine at multiple bosses projecting therefrom. Typically, the engine gets very hot during operations and portions of the engine can expand.

SUMMARY OF THE INVENTION

An aspect of the invention involves the recognition that electric circuit elements generally are not sufficiently durable against engine vibrations. If the fuel pressure sensor is mounted to the fuel rail, engine vibrations can be transmitted to the fuel pressure sensor through the fuel rail because the fuel rail is rigidly affixed to the engine. Accordingly, the engine vibrations can damage the fuel pressure sensor.

Additionally, the fuel rail does not heat up as much as the engine because fuel flowing through the fuel rail tends to cool the fuel rail. The fuel rail, therefore, does not expand as much as the engine portions, if it expands at all. The difference in the expansion rates between the engine and the fuel rail can cause high stress at the bosses. In addition, the relatively high pressure of the fuel flowing through the fuel rail and the engine vibrations can increase the stress at the bosses. A two-cycle engine needs higher pressure than a four-cycle engine, because the duration of injection for the two-cycle engine running in a relatively high-speed range is shorter than that for the four-cycle engine. The higher pressure in the two-cycle engine further increases the stress at the bosses.

Features of the present invention improve the fuel pressure sensor and fuel rail mounting structures. In particular, aspects of the present invention provide improved sensor mounting structures that can inhibit engine vibrations from being transmitted to the fuel pressure sensor. Additionally, aspects of the present invention can improve fuel rail mounting structures.

Accordingly, one aspect of the invention involves an internal combustion engine that comprises an engine body defining a cylinder bore. A movable member is movable within the cylinder bore. The engine body and the movable member together define a combustion chamber. The engine comprises a fuel injector to supply fuel to the combustion chamber for combustion therein. A fuel conduit defines a fuel passage through which fuel is supplied to the fuel injector. The fuel conduit is mounted to the engine body. A fuel pump pressurizes the fuel. A sensor unit is elastically mounted to the engine body. The sensor unit comprises a fuel pressure sensor that detects a pressure of the fuel pressurized by the fuel pump.

In accordance with another aspect of the present invention, a marine drive comprises a propulsion device and an internal combustion engine powers the propulsion device. The engine comprises an engine body defining a cylinder bore. A movable member is movable within the cylinder bore. The engine body and the movable member together define a combustion chamber. The engine comprises a fuel injector to supply fuel to the combustion chamber for combustion therein. A fuel conduit defines a fuel passage through which fuel is supplied to the fuel injector. The fuel conduit is mounted to the engine body. A fuel pump pressurizes the fuel. A sensor unit is elastically mounted to the fuel conduit. The sensor unit comprises a fuel pressure sensor that detects a pressure of the fuel pressurized by the fuel pump.

A further aspect of the invention involves an internal combustion engine that comprises an engine body defining a cylinder bore. A movable member is movable within the cylinder bore. The engine body and the movable member together define a combustion chamber. The engine comprises a fuel injector to supply fuel to the combustion chamber for combustion therein. A fuel rail defines a fuel passage through which fuel is supplied to the fuel injector. The engine body has a boss projecting therefrom. A bolt hole is defined to extend through the boss and into the engine body adjacent to the boss. The bolt hole forms a threaded section at least in the engine body adjacent to the boss. A bolt is screwed down into the threaded section.

In accordance with a still further aspect of the present invention, an internal combustion engine comprises an engine body defining a cylinder bore. A movable member is movable within the cylinder bore. The engine body and the movable member together define a combustion chamber. The engine comprises a fuel injector to supply fuel to the combustion chamber for combustion therein. A fuel rail defines a fuel passage through which fuel is supplied to the fuel injector. The engine body has a boss projecting therefrom. A bolt hole is defined to extend at least into the boss. At least a part of the bolt hole forms a threaded section. A bolt is screwed down into the threaded section. At least a portion of the bolt is spaced apart from an inner surface of the bolt hole.

In accordance with another aspect of the present invention, an internal combustion engine comprises an engine body defining a plurality of cylinder bores. Movable members are movable within the respective cylinder bores. The engine body and the movable members together define a plurality of combustion chambers. The engine comprises a plurality of fuel injectors to supply fuel to the respective combustion chambers for combustion therein. A fuel rail defines a fuel passage through which fuel is supplied to the fuel injectors. The fuel rail is affixed to the engine body by at least first, second and third fastening mechanisms that are spaced apart from each other along a longitudinal axis of the fuel rail. The third mechanism is interposed between the first and second mechanisms. A magnitude of strength for the first and second mechanisms is greater than a magnitude of strength for the third mechanism.

In accordance with a further aspect of the present invention, an internal combustion engine comprises an engine body defining a plurality of cylinder bores. Movable members are movable within the respective cylinder bores. The engine body and the movable members together define a plurality of combustion chambers. The engine comprises a plurality of fuel injectors to supply fuel to the respective combustion chambers for combustion therein. A fuel rail defines a fuel passage through which fuel is supplied to the fuel injectors. The engine body has first, second and third bosses extending therefrom. First and second bolt holes are defined to extend through the first and second bosses and into the engine body adjacent to the first and second bosses. A third bolt hole is defined to extend into the third boss and not into the engine body adjacent to the third boss. Each one of the first and second bolt holes forms a threaded section in the engine body adjacent to the first and second bosses. The third bolt hole forms a threaded section in the third boss. A plurality of bolts are screwed down into the respective threaded sections.

In accordance with a still further aspect of the present invention, an internal combustion engine comprises an engine body defining a plurality of cylinder bores. Movable members are movable within the respective cylinder bores. The engine body and the movable members together define a plurality of combustion chambers. The engine comprises a plurality of fuel injectors to supply fuel to the respective combustion chambers for combustion therein. A fuel rail defines a fuel passage through which fuel is supplied to the fuel injectors. The engine body has first, second and third bosses extending therefrom. The first and second bosses are thicker than the third boss is. First, second and third bolt holes are defined to extend at least into the first, second and third bosses, respectively. A threaded section is formed in each one of the bolt holes. A plurality of bolts are screwed down into the respective threaded sections.

Some of the applications and configurations of the improved fuel pressure sensor mounting structures and also the improved fuel rail mounting structures will be discussed below. It should be noted that the following discussion relates to several distinct features of the present invention and not all of the features need to be present in any single embodiment of the present invention. Thus, some of the features may be used with other features in some applications while other applications will only reflect one of the features. Moreover, the features, aspects and advantages can be applied to marine engines in the narrow sense but also other internal combustion engines recited in the appended claims that will become apparent to those of ordinary skill in the art.

BRIEF DESCRIPTION OF THE DRAWINGS

These and other features, aspects and advantages of the present invention are described below with reference to the drawings of a preferred embodiment, which is intended to illustrate and not to limit the invention. The drawings comprise 22 figures.

DETAILED DESCRIPTION OF THE PREFERRED EMBODIMENTS OF THE INVENTION

Overall Construction of Outboard Motor

With reference to FIGS. 1–8, one possible environment in which the present invention can be practiced is described below. The present fuel supply system has particular utility in the context of a marine engine, and thus, the system is described in the context of an outboard motor. The fuel supply system, however, can be used with other types of internal combustion engines. For example, the fuel supply system can be used with any machines using engine power such as watercrafts, land vehicles and utility machines.

Figure 1:
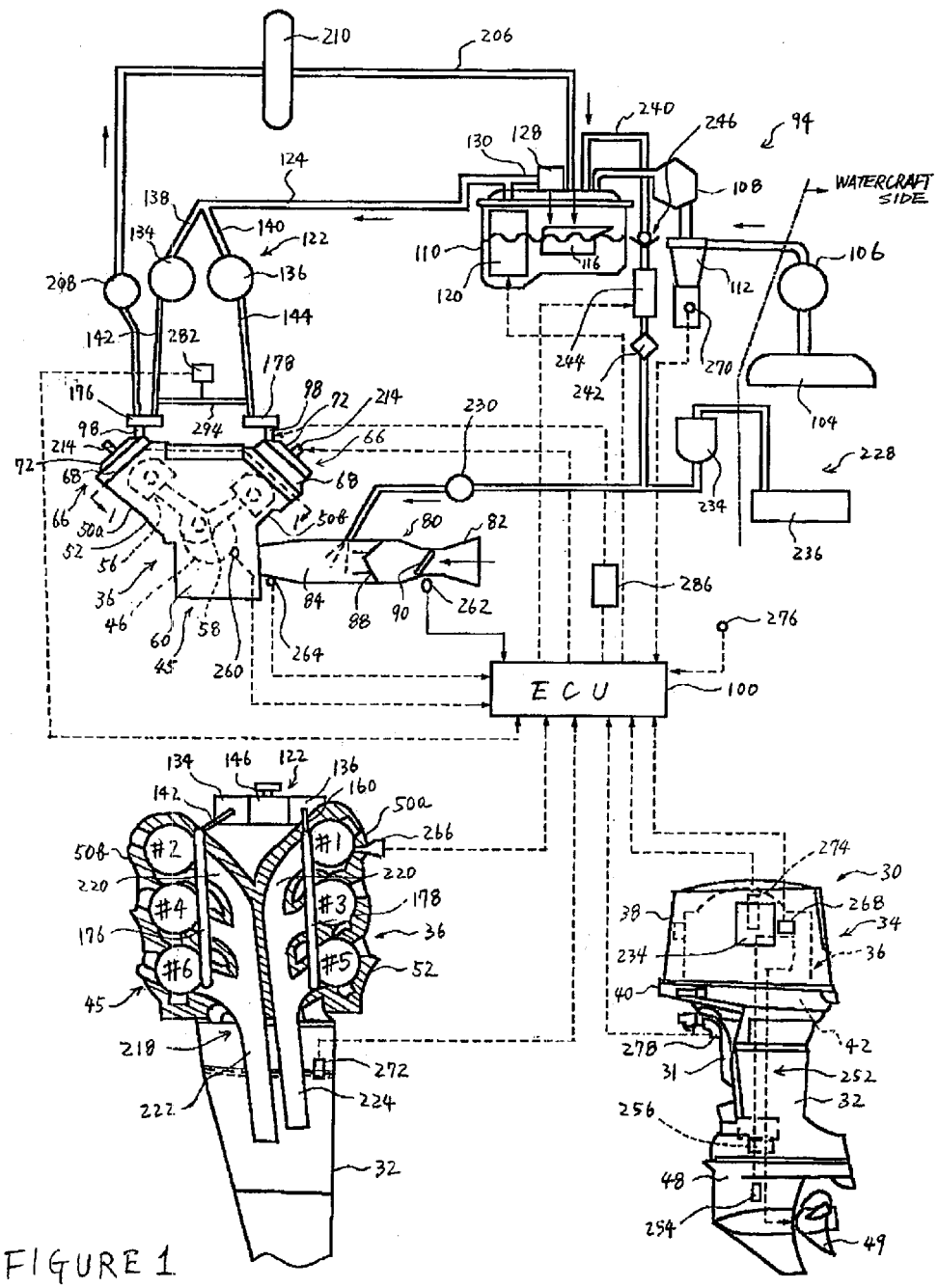
FIG. 1 is a multi-part schematic view; the lower right-hand portion is an outboard motor that employs an engine having a direct fuel injection system that relates to the present invention; the upper view is a partially schematic cross-sectional view of the engine of the outboard motor with its air induction and fuel injection systems shown in part schematically; and the lower left-hand portion is a rear elevational view of the outboard motor with portions removed and other portions broken away and shown in cross section as taken along the line 1—1 of the upper view so as to more clearly illustrate the construction of the engine, with the fuel injection system shown schematically in part. An ECU for the motor links the three views together.

With initial reference to FIG. 1, and in particular to the lower-right hand view of FIG. 1, an outboard motor 30 is depicted from the side. The outboard motor 30 has a bracket assembly 31 comprising a swivel bracket and a clamping bracket, which are typically associated with a driveshaft housing 32. The bracket assembly 31 is similar to that of another outboard motor shown in FIG. 15 and will be described with reference to FIG. 15 later.

The outboard motor 30 includes a power head 34 that is positioned above the driveshaft housing 32. The power head 34 comprises a protective cowling assembly and an internal combustion engine 36. This engine 36 is illustrated in greater detail in the remaining two views of this figure and in FIGS. 2, 3 and 5–8, and will be described by reference thereto.

A protective cowling assembly includes a top cowling member 38 and a bottom cowling member 40. Both the top and bottom cowling members 38, 40 together define a closed cavity in which the engine 36 is housed. The top cowling member 38 is detachably affixed to the bottom cowling portion 40 such that a user or service person can access the engine 36 for maintenance service or for other purposes. The top cowling member 38 preferably defines air intake openings on a rear and upper end surface. Air can thus be drawn into the cavity. An engine support or exhaust guide 42 is unitarily or separately formed atop the driveshaft housing 32 and forms a tray together with the bottom cowling member 40. The tray can hold a bottom of the engine 36 and the engine 36 is affixed to the engine support 42.

The engine 36 comprises an engine body 45 (the upper view and the lower-left hand view of FIG. 1) and a crankshaft 46 (the upper view of FIG. 1) rotatably journaled on the engine body 45. The crankshaft 46 rotates about a vertically extending axis. This facilitates the connection of the crankshaft 46 to a driveshaft (not shown) which depends into the driveshaft housing 32.

A lower unit 48 depends from the driveshaft housing 32. The propulsion device is mounted to the lower unit 48 and the driveshaft drives the propulsion device. The illustrated propulsion device is a propeller 49. The driveshaft drives the propeller 49 through a transmission disposed within the lower unit 48. The transmission includes a changeover mechanism that can change the rotational direction of the propeller 49 among forward, neutral and reverse. The propulsion device can take the form of a dual counter-rotating system, a hydrodynamic jet, or any of a number of other suitable propulsion devices.

With particular reference to the upper view and the lower left-hand view of FIG. 1, the engine 36 preferably operates on a two-stroke, crankcase compression principle. The illustrated engine 36 has a pair of cylinder banks 50a, 50b extending generally toward the rear of the engine in a V-shaped configuration. Each bank 50a, 50b defines three cylinder bores which are numbered #1–#6 in the lower left-hand view. The cylinder bores #1–#6 extend generally horizontally and are vertically spaced apart from each other in each bank 50a, 50b. As used in this description, the term "horizontally" means that the subject portions, members or components extend generally parallel to the water line where the associated watercraft is resting when the outboard motor 30 is not tilted. The term "vertically" in turn means that portions, members or components extend generally normal to those that extend horizontally. Although the invention is described in conjunction with the two-cycle engine having this cylinder number and cylinder configuration, the invention can be utilized with other engines operating on other combustion principles such as, for example, a four-stroke combustion principle, having other cylinder numbers and other cylinder configurations.

The engine body 45 comprises a cylinder block 52. The cylinder block 52 forms the cylinder banks 50a, 50b in the illustrated arrangement. The cylinder bank 50a is disposed on the starboard side of the outboard motor 30, while the cylinder bank 50b is disposed on the port side thereof. Movable members such as, for example, pistons 56 (the upper view of FIG. 1) are reciprocally disposed within the cylinder bores #1–#6. The crankshaft 46 is journaled for rotation within a crankcase chamber defined in part by a crankcase member 60 that is affixed to the cylinder block 50 in a suitable manner. The pistons 56 are coupled with the crankshaft 46 through connecting rods 58. Thus, the crankshaft 46 rotates with the reciprocal movement of the pistons 56.

Cylinder head assemblies 66 are affixed to each cylinder bank 50a, 50b to close open ends of the respective cylinder bores #1–#6. Each cylinder head assembly 66 comprises a cylinder head member 68 that defines a plurality of recesses on its inner surface corresponding to the cylinder bores #1–#6. Each of these recesses defines a combustion chamber together with the cylinder bore #1–#6 and the piston 56. Cylinder head cover members 72 complete the cylinder head assemblies 66. The cylinder head members 68 and cylinder head cover members 72 are affixed to each other and to the respective cylinder banks 50a, 50b in a suitable manner.

The engine 36 preferably is provided with an air induction system 80 that delivers air to each section of the crankcase chamber associated with each cylinder bore #1–#6. The induction system 80 comprises an air inlet device 82, an air intake manifold and a plurality of air intake conduits 84. The air inlet device 82 defines a plenum chamber through which the air is drawn into the induction system 80. The intake manifold is coupled with the inlet device 82. Each air intake conduit 84 is branched off from the intake manifold and defines an air intake passage connecting the plenum chamber and each section of the crankcase chamber that is associated with each combustion chamber. Accordingly, the air drawn into the plenum chamber is delivered to the sections of the crankcase chamber through the intake conduits 84.

Each intake conduit 84 preferably incorporates a reed valve 88 that allows the air to flow into the section of the crankcase chamber 60 and prevents the air in the section of the crankcase member 60 from flowing to the plenum chamber. Each intake conduit 84 also incorporates a throttle valve 90 between the plenum chamber and the reed valve 88. The throttle valve 90 is pivotally journaled on the intake conduit 84 to regulate the amount of the air entering the intake conduit 84 depending on the pivotal position thereof. The operator can change the pivotal position, or throttle position, through a suitable control mechanism.

The air drawn into the respective sections of the crankcase chamber is preliminarily compressed by the pistons 56. The air is then transferred to the combustion chambers through a scavenge system. The scavenge system preferably is a Schnurle type system that comprises a pair of main scavenge passages connected to each cylinder bore #1–#6 and positioned on diametrically opposite sides. These main scavenge passages terminate in main scavenge ports so as to direct scavenge air flowing into the combustion chamber.

In addition, an auxiliary scavenging passage is formed between the main scavenge passages and terminates in an auxiliary scavenging port which also provides a scavenge air flow. Thus, at the scavenge stroke, the air in the crankcase chamber is transferred to the combustion chambers to be further compressed by the pistons 56. The scavenge ports are selectively opened and closed as the piston reciprocates.

With particular reference to the upper view of FIG. 1, the engine 36 preferably is provided with a fuel supply system 94 that delivers fuel to the combustion chambers. The illustrated fuel supply system 94 uses a direct fuel injection method in which the fuel is directly sprayed into the combustion chambers.

The fuel supply system 94 comprises fuel injectors 98 associated the respective combustion chambers. The fuel injectors 98 preferably are mounted to the cylinder head members 68. A mounting structure of the fuel injectors 98 will be described in greater detail below. The fuel injectors 98 are electrically controlled by an electronic control unit (ECU) 100 (FIGS. 1 and 3) to spray the fuel. Pressurized fuel is supplied by the fuel supply system 94. The pressure preferably is regulated so as to be at a generally constant value at all times. The ECU 100 preferably controls the duration of each injection to spray a desired amount of fuel in response to various conditions of engine operations. For example, the air/fuel ratio is one of the most significant factors to control during engine operations. The ECU 100 controls the fuel injections 98 to keep the air/fuel ratio at an optimum ratio or at a desired ratio in complying with certain engine operations such as, for example, when the engine is idle or when there is acceleration.

Figure 2:
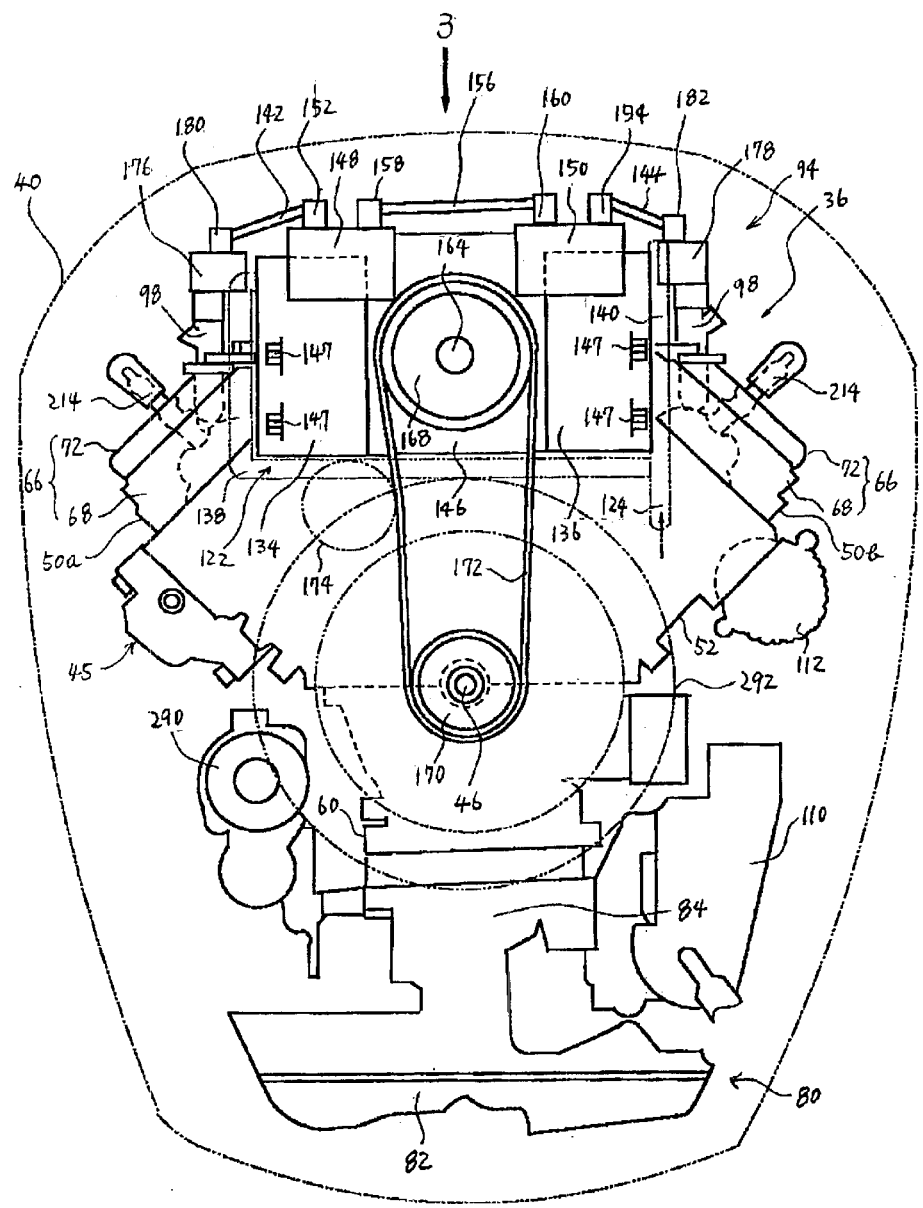
FIG. 2 is a top plan view of a power head of the outboard motor that incorporates the engine. The engine is illustrated generally in solid lines, and a protective cowling of the power head, which encloses the engine, is illustrated in phantom lines.

The fuel supply system 94 additionally comprises a fuel supply tank 104 that preferably is placed in the hull of the watercraft. A first low pressure pump 106 and a second low pressure pump 108 draw the fuel in the tank 104 into a vapor separator 110. The first low pressure pump 106 is a manually operated pump, while the second low pressure pump 108 is a diaphragm type pump operated by pulsating variations in pressure that occur in sections of the crankcase chamber. A quick disconnect coupling preferably is provided in a conduit that connects the first low pressure pump 106 to the second low pressure pump 108 to detachably connect the watercraft side of the conduit with the outboard side thereof. A fuel filter 112 is positioned between the first low pressure pump 106 and the second low pressure pump 108. The fuel filter 112 removes foreign substances such as, for example, water in the fuel. The fuel filter 112 is mounted to the cylinder block 52 and preferably is disposed on a side surface of the bank 50b as shown in FIG. 2.

The vapor separator 110 preferably is a fuel reservoir in which the fuel can be reserved. The inside of the vapor separator 110 is constructed so that it can separate vapor from the fuel to prevent vapor lock in the fuel supply system 94. The vapor separator 110 preferably is mounted to the crankcase member 60, or to a portion of the induction system 80, as shown in FIG. 2. A float 116 is provided in a cavity of the vapor separator. In the illustrated embodiment, the float 116 has a lever on which a needle valve is pivotally affixed. The needle valve can close or open an inlet port with the float 116 moving up or down, respectively. That is, when the fuel in the cavity decreases, the float 116 moves down and the needle valve opens the inlet port to allow fuel to flow into the cavity. When the amount of fuel increases, the float 116 moves up and the needle valve closes the inlet port to inhibit fuel from entering the cavity.

An electric pump 120 preferably is disposed in the cavity of the vapor separator 110 and is positioned next to the float 116. The electric pump 120 pressurizes and transfers the fuel in the vapor separator 110 to a high pressure pump unit 122 through a fuel passage 124. The pressure developed by the electric pump 120 is greater than the pressure developed by the low pressure pump 108; however, it is less than the pressure developed by the high pressure pump unit 122. In other words, the electric pump 120 pre-pressurizes the fuel to a certain level and the high pressure pump 122 increases the pressure to a higher level. Preferably, the pressure developed by the high pressure pump unit 122 is approximately 50–100 Kg/cm$^2$.

A pre-load regulator 128 is provided in a return passage 130 between the pre-load fuel passage 124 and the vapor separator 110 to return excessive fuel to the vapor separator 110. The pre-load regulator 128 limits the pressure that is delivered to the high pressure fuel pump unit 122 by dumping fuel back into the vapor separator 110.

The high pressure pump unit 122 preferably comprises a pair of high pressure pumps 134, 136. The illustrated pre-load passage 124 is bifurcated into two sections 138, 140 and the sections 138, 140 are connected to the pumps 134, 136, respectively. High pressure fuel passages 142, 144 extend from the respective pumps 134, 136. Flexible conduits preferably define the fuel passages 142, 144.

With reference to FIG. 2, the high pressure pump unit 122 preferably is disposed atop and in the rear of the cylinder block 52. More specifically, the illustrated pump unit 122 is generally positioned between both of the banks 50a, 50b in the top plan view. The pump unit 122 is affixed to the cylinder block 50 so as to overhang between the two banks 50a, 50b of the V arrangement. In the illustrated arrangement, the high pressure pump unit 122 comprises a pump drive 146. The high pressure fuel pumps 134, 136 are disposed on both sides of the pump drive 146 and affixed thereto by several bolts 147.

The high pressure pump 134 has a fuel divergence section 148, and the other high pressure pump 136 has a fuel divergence section 150. The high pressure fuel passage 142 extends at a joint 152 of the fuel divergence section 148. In the illustrated embodiment, the high pressure fuel passage 144, in turn, extends at a joint 154 of the fuel divergence section 150. The respective fuel divergence sections 148, 150 are coupled with each other through a connecting passage 156 that extends from a joint 158 at the section 148 and from a joint 160 at the section 150.

The pump drive 146 has a driveshaft 164 extending vertically. A cam disc preferably is affixed onto the driveshaft 164 and is engaged with plungers of the respective high pressure pumps 134, 136. The high pressure fuel pumps 134, 136 pressurize the fuel with the plungers when the cam disc pushes the plungers with the driveshaft 164 rotating.

A driven pulley 168 is affixed atop of the driveshaft 164. Also, a drive pulley 170 is affixed at a top of the crankshaft 46. An endless drive belt 172 is wound around the driven and drive pulleys 168, 170. Thus, the crankshaft 46 drives the driveshaft 164. A belt tensioner 174 is provided for maintaining tension in the belt 172.

The high pressure fuel passages 142, 144 are connected to fuel conduits. The fuel conduits couple the fuel passages 142, 144 with the respective fuel injectors 98. With reference to FIGS. 1 and 2, the fuel conduits preferably are fuel rails 176, 178 made of a rigid metal material. The fuel passages 142, 144 are coupled with the fuel rails 176, 178 at joints 180, 182, respectively. The fuel rails 176, 178 are affixed to the respective cylinder head assemblies 66 so as to extend generally vertically in the illustrated embodiment. Preferably, the fuel injectors 98 are coupled to the fuel rails 176, 178 with the respective internal fuel paths of the injectors 98 connected with the internal passages of the fuel rails 176, 178. Also, the fuel injectors 98 preferably are independently affixed to each cylinder member 68.

Figure 4:
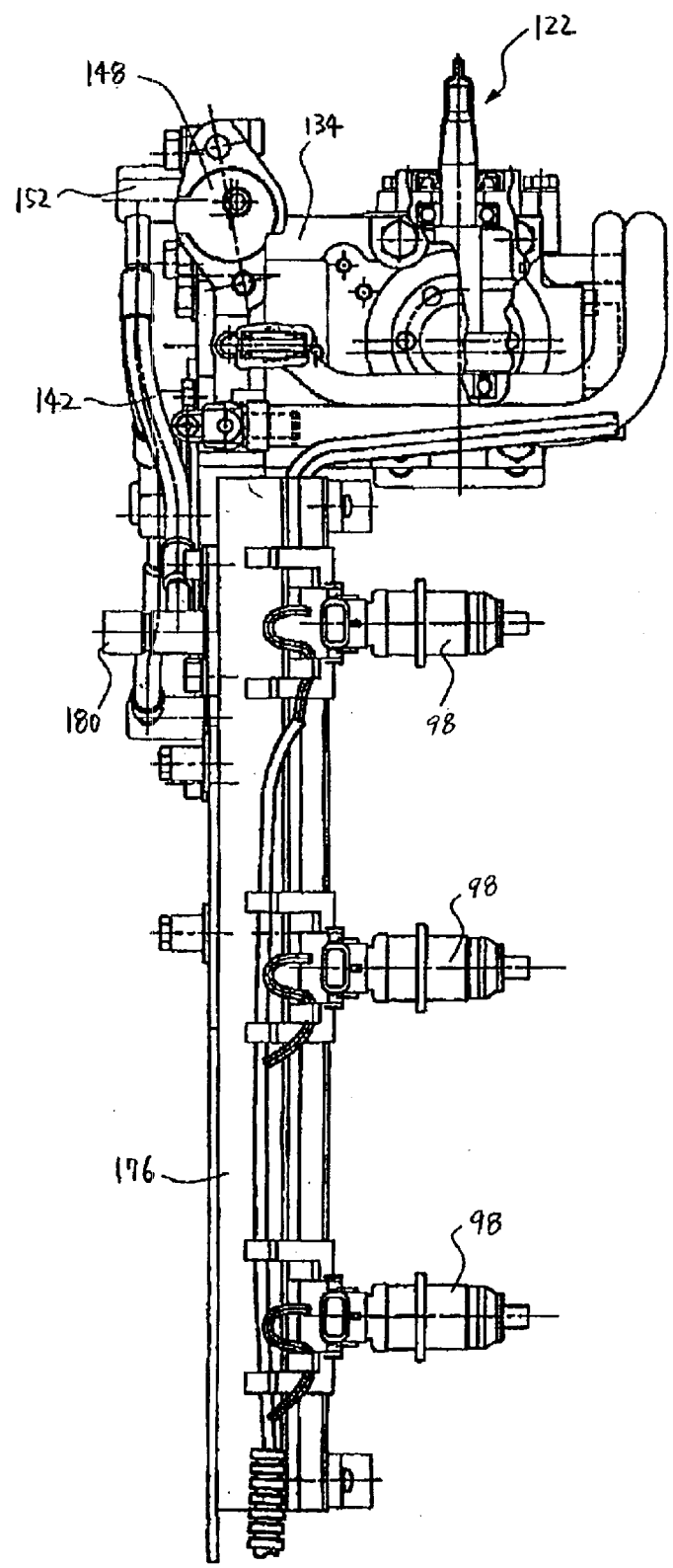
FIG. 4 is a side elevational view of a fuel rail disposed on the starboard side of the outboard motor. The view is taken in the direction of the Arrow 4 of FIG. 3.

With particular reference to FIG. 4, the fuel rails 176, 178 preferably are pre-assembled with the high pressure pump unit 122 in this arrangement prior to being affixed to the cylinder head assemblies 66.

Figure 5:
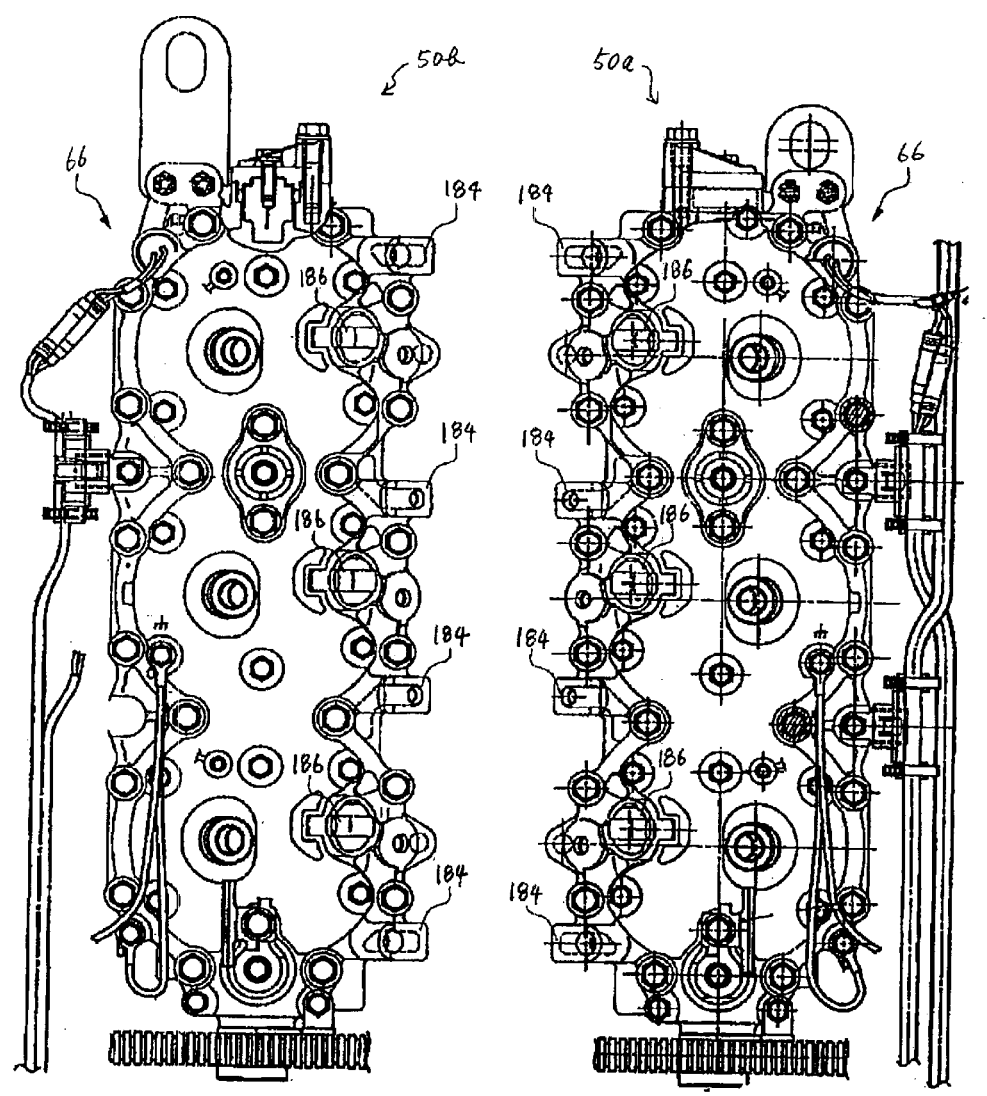
FIG. 5 is a rear elevational view of two banks of the engine. The most rear potion of the engine is illustrated without a high pressure fuel pump and the rest of the engine is omitted in the figure.
Figure 6:
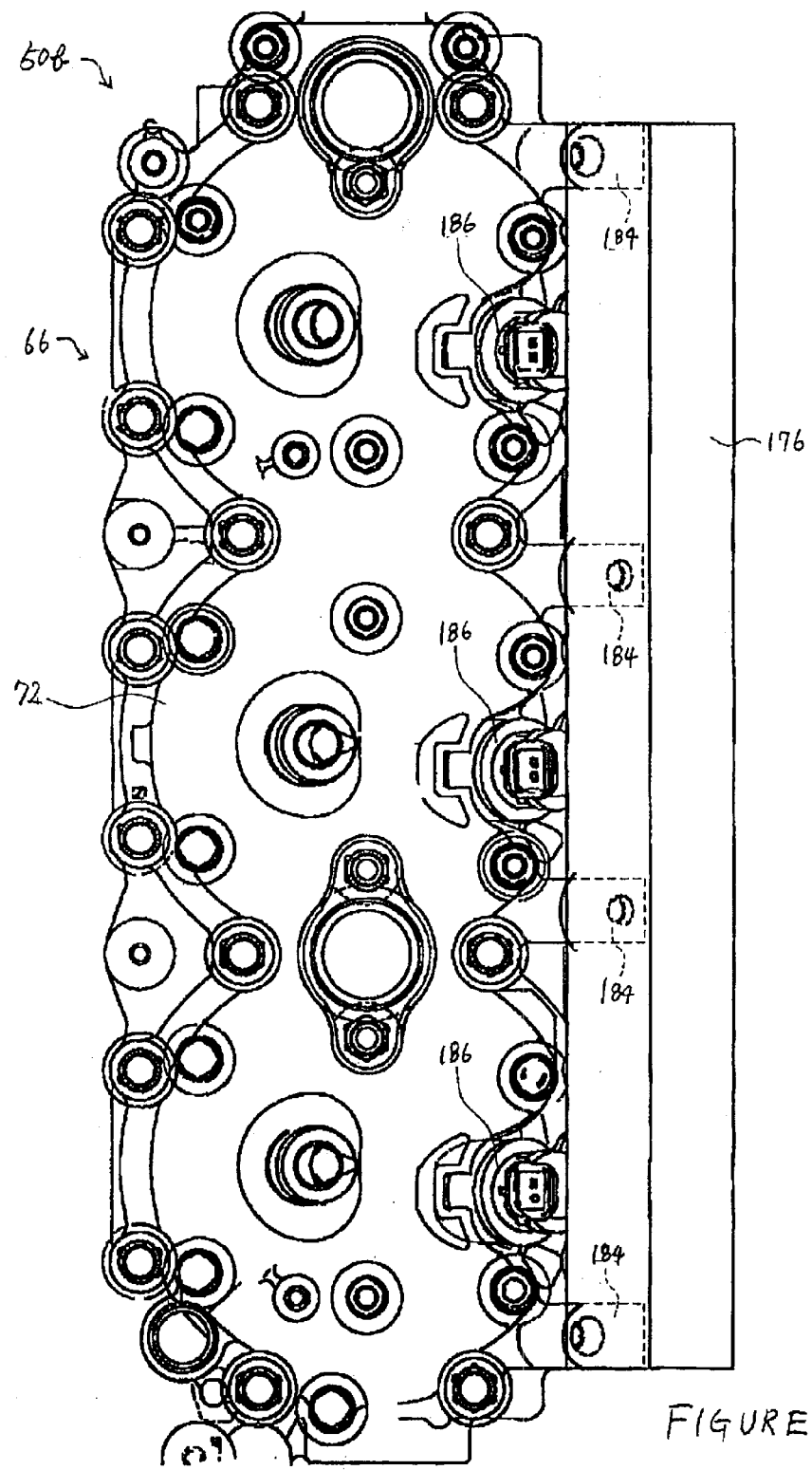
FIG. 6 is an enlarged rear elevational view of the bank on the starboard side.
Figure 7:
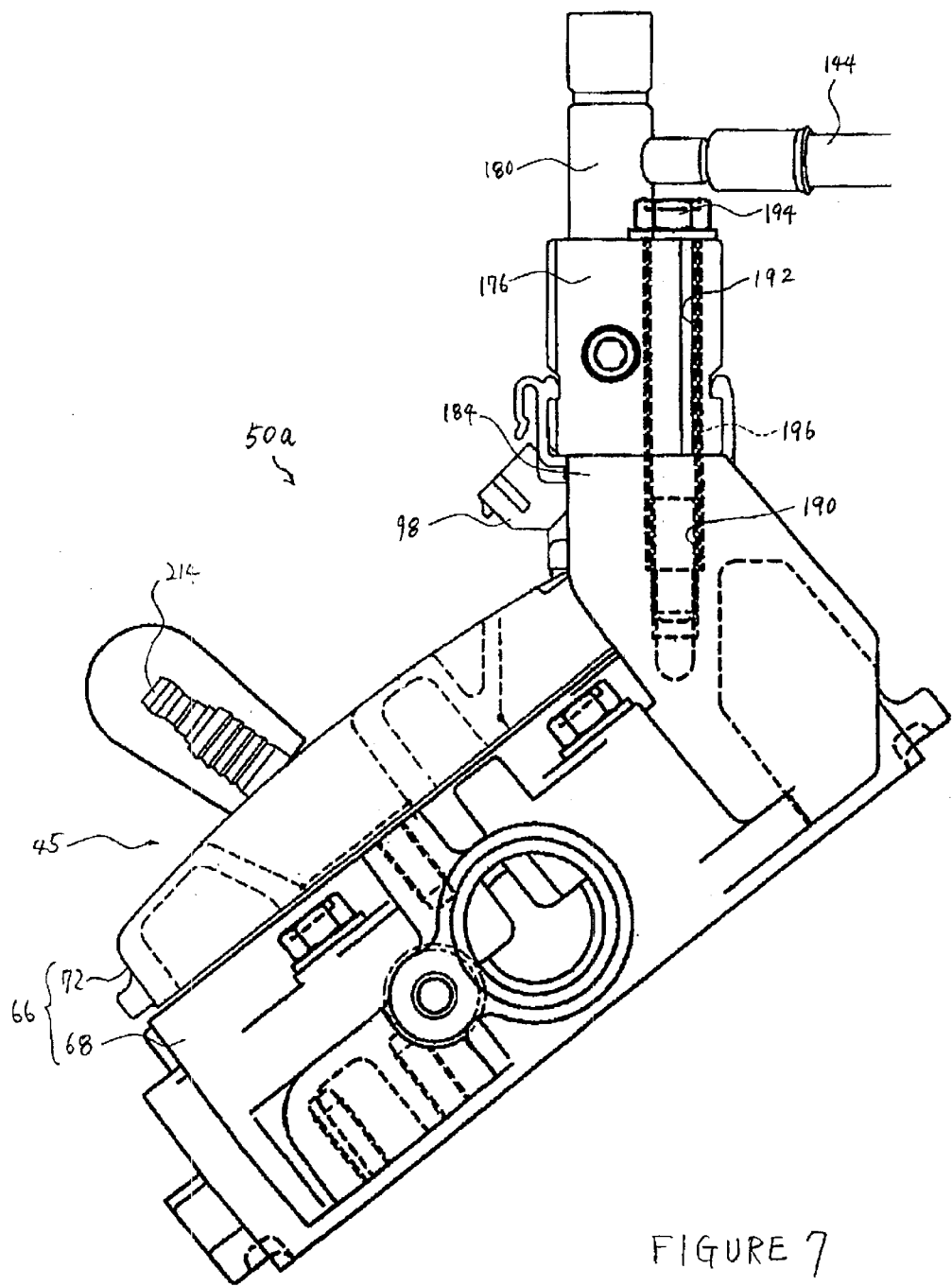
FIG. 7 is a top plan view of a cylinder head assembly of the engine with the fuel rail on the starboard side.

With reference to FIGS. 5–7, a plurality of mount bosses 184 project from the cylinder head assemblies 66, generally extending at the rear-most portions thereof next to a valley defined by the banks 50a, 50b. In the illustrated arrangement, four mount bosses 184 project from each cylinder member 68 and are spaced apart from each other vertically. Each cylinder head member 68 also defines three injector mounts 186 at which openings are formed, preferably into the combustion chamber. The fuel injectors 98 are fitted into the openings to expose respective nozzles preferably to the combustion chambers; however, in other applications the fuel injectors can be arranged to inject into a pre-chamber associated with each combustion chamber.

With particular reference to FIG. 7, the cylinder head member 68 of the bank 50a, for example, defines bolt holes 190. The bolt holes 190 are formed in part with a receptive threaded section. The fuel rail 176 also defines through-holes 192 aligning with the respective bolt holes 190. Bolts 194 are fitted into the through-holes 192 and the bolt holes 190, and are screwed down into the respective threaded section of the bolt holes 190. A collar 196 preferably is inserted together with each bolt 194 into the holes 192, 190 so as to extend around the bolt 194. The fuel rail 176 is thus firmly affixed to the cylinder head member 68. The same mount structure preferably is applied to the cylinder head member 68 and the fuel rail 178 on the other bank 50b.

Figure 8:
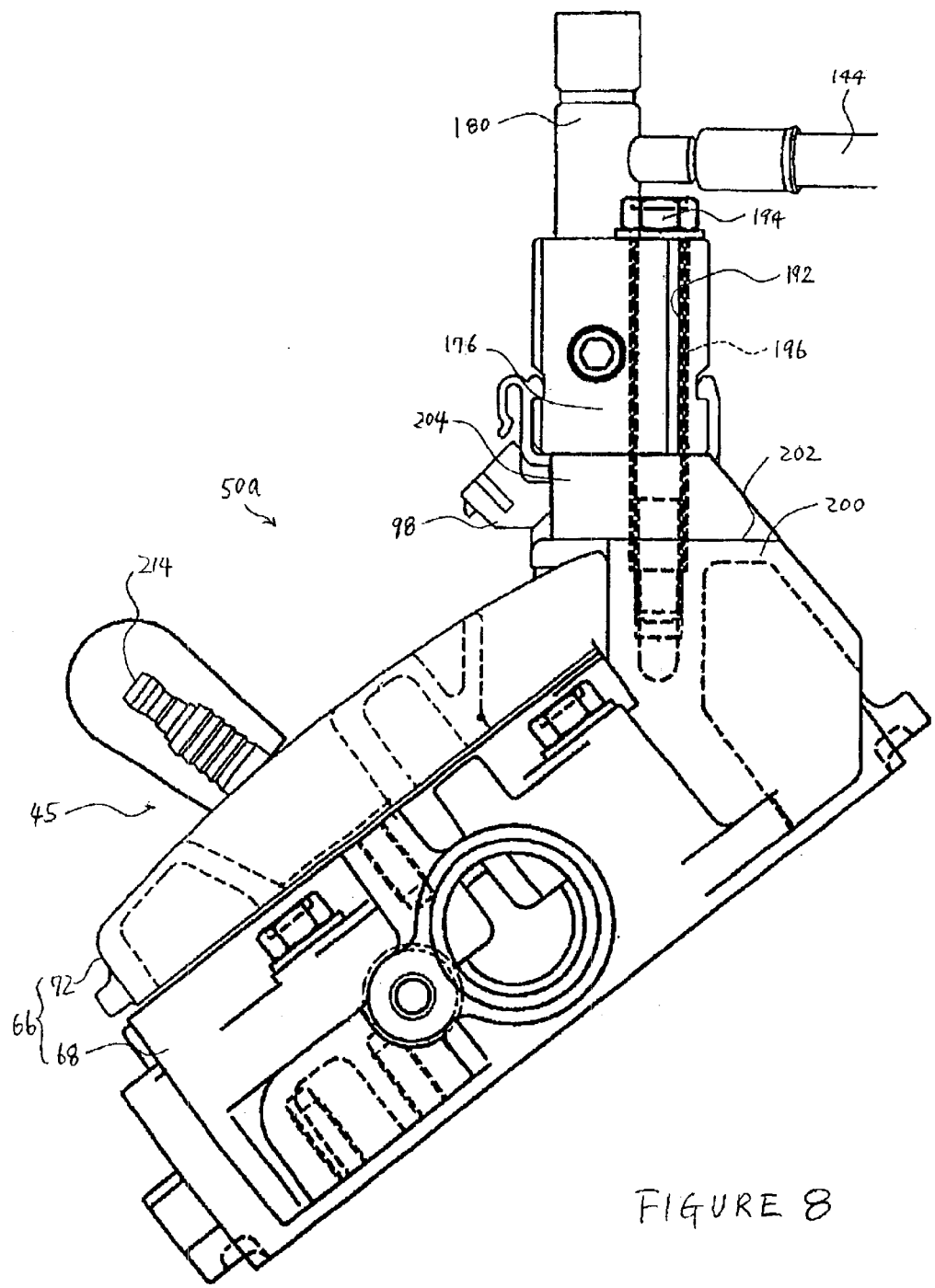
FIG. 8 is a top plan view of a modified cylinder head assembly of the engine with the fuel rail on the starboard side.

Another mount structure is illustrated in FIG. 8. Mount bosses 200 in this variation are shorter than the mount bosses 184 of FIGS. 5–7, or no mount bosses project from the cylinder head member 68 and generally flat surfaces 202 are defined where the mount bosses 184 exist in the embodiment shown in FIG. 7. As seen in FIG. 8, spacers 204 are interposed between the cylinder head member 68 and the fuel rail 176 to connect them with each other. In other words, the mount bosses are separately formed from the cylinder head member 68 in this variation. Other constructions and arrangements are the same as those of FIG. 7.

The spacers 204 can be advantageously used to adjust positions of the fuel rail. If a thicker spacer is used, the fuel rail can be positioned farther from the cylinder head member than shown in FIG. 8. If a thinner spacer is used, the fuel rail can be positioned nearer to the cylinder head member than shown in FIG. 8. In other words, the fuel rail can be attached to the cylinder head member using spacers of various sizes; however, preferably all of the spacers on the same bank have generally the same thickness. Similar mount structures will be described with reference to FIGS. 19–22 below.

With reference back to the upper view of FIG. 1, the fuel rail 176 is also connected to the vapor separator 110 through a high pressure fuel return passage 206. A high pressure regulator 208 is disposed within the return passage 206 to regulate and to maintain the fuel at a fixed or constant high pressure. Excess fuel returns back to the vapor separator 110 through the return passage 206. A fuel heat exchanger or cooler 210 preferably is provided in the return passage 206 to cool down the return fuel.

With reference to FIGS. 1, 2 and 7, the engine 36 preferably is provided with an ignition or firing system. Spark plugs 214 are affixed to plug bosses formed at the cylinder head assemblies 66. Spark producing electrodes of the plug 214, which are slightly spaced apart from each other, are exposed to the combustion chambers. The spark plugs 124 are controlled by the ECU 100 and ignite air/fuel charges in the combustion chambers.

With reference to the lower left-hand view of FIG. 1, the engine 36 preferably is provided with an exhaust system 218 that routes burned charges or exhaust gases to an external location from the combustion chambers. The illustrated exhaust system 218 generally discharges the exhaust gases to the body of water surrounding the outboard motor 30 except for the exhaust gases produced when the engine is idle. Each cylinder bore #1–#6 has an exhaust port 220 that is selectively opened or closed with the reciprocation of the pistons.

A pair of exhaust manifolds 222, 224 connect the exhaust ports 220 on each bank 50a, 50b with each other, respectively, and lead the exhaust gases through the engine support 42 and into the driveshaft housing 32. The driveshaft housing 32 and the lower unit 48 define an exhaust gas discharge mechanism connected to a hub of the propeller 49. The hub of the propeller 49 defines an opening through which the exhaust mechanism communicates with the body of water. Thus, the exhaust gases produced as the engine is running above idle are discharged to the body of water through the exhaust discharge mechanisms and the propeller hub.

The driveshaft housing 32 preferably defines an idle exhaust gas discharge mechanism. The exhaust gases discharged when the engine is idle can escape to the atmosphere through the idle exhaust discharge mechanism.

Each fuel injector 98 in the illustrated embodiment sprays fuel directly into the associated combustion chamber. The sprayed fuel is mixed with the air delivered through the scavenge passages to create an air/fuel charge. The spark plug 214 ignites the air/fuel charge. The injection timing, the duration of the fuel injection, and the firing timing are controlled by the ECU 100. Once the air/fuel charge burns in the combustion chamber, the increased pressure produced in the combustion chamber moves each piston. At this time, each exhaust port 220 is uncovered and the burnt charge or exhaust gases are discharge through the exhaust system 218.

With reference to the upper view of FIG. 1, the engine 36 preferably is provided with an engine lubrication system 228. The lubrication system 228 includes lubrication pumps 230 that pressurize and deliver lubricant to the respective intake passages of the intake conduits 84 downstream of the reed valves 88. The lubricant is drawn into the crankcase chamber together with the air and is delivered to engine portions that need lubrication such as, for example, connecting portions of the connecting rods 58 and pistons 56 and also with the crankshaft 46.

A main lubricant tank 234 and a sub-tank 236 are arranged upstream of the lubrication pumps 230. The main tank 234 preferably is mounted to either one of the cylinder banks 50a, 50b, while the sub-tank 236 placed upstream of the main tank 234 and preferably in the hull of the associated watercraft.

Some forms of direct lubrication can be additionally employed for delivering lubricant directly to certain components of the engine 36. In the illustrated arrangement, a lubricant delivery passage 240 connects the lubrication system 228 with the fuel supply system 94. A filter 242, another lubrication pump 244 and a check valve 246 are disposed in the lubricant delivery passage 240. The filter 242 removes foreign substances from the lubricant. The lubrication pump 244 pumps the lubricant to the vapor separator 110. A solenoid type pump or an electric motor type pump can be used as this lubrication pump 244. The check valve 246 allows the lubricant to flow to the vapor separator 110 from the lubrication system 228 and prevents the lubricant from flowing back into the lubrication system 228 from the fuel supply system 94. Thus, a portion of the lubricant in the lubrication system 228 is directly supplied to the engine portions that need lubrication.

The engine 36 and the exhaust system 218 can become very hot during the engine operations. With reference to the lower right-hand view of FIG. 1, the outboard motor 30 preferably is provided with a cooling system 252 that cools the engine body 45 and the exhaust system 218. The cooling system 252 preferably introduces cooling water from the body of water and then discharges the water back into the body of water. A water inlet 254 is defined at a side surface of the lower unit 48 and is submerged in the body of water when the outboard motor 30 is not tilted. A water pump 256 pumps the water to the water jackets of the engine 36 and the exhaust system 218. The water that has traveled around the engine 36 and the exhaust system 218 is discharged to the body of water together with the exhaust gases through the hub of the propeller 49.

The ECU 100 can employ various control methods including a feedback control. The outboard motor 30 is provided with a number of sensors that sense engine running conditions, ambient conditions, or conditions of the outboard motor 30 that will affect engine performance.

For example, there is provided a crankshaft angle position sensor 260 that, when measuring crankshaft angle versus time, outputs a crankshaft rotational speed signal or engine speed signal to the ECU 100. Operator demand or engine load, as determined by a throttle angle of the throttle valve 90, is sensed by a throttle position sensor 262 which outputs a throttle position or load signal to the ECU 100.

Other than the sensors 260, 262, there are preferably additional sensors. For example, an intake air temperature sensor 264 may be provided for detecting a temperature of the intake air. An oxygen ($O_2$) sensor 266 may be provided for detecting a residual amount of oxygen in the exhaust system 218. A water temperature sensor 268 may be provided for detecting a temperature of the cooling water. A water amount sensor 270 may be provided for detecting an amount of water removed by the fuel filter 112. An exhaust pressure sensor 272 may be provided for detecting an exhaust pressure in the exhaust system 218. A lubricant level sensor 274 may be provided for detecting an amount of lubricant in the main lubricant tank 234. An atmosphere temperature sensor 276 may be provided for detecting a temperature of the atmosphere. Finally, a trim sensor 278 may be provided for detecting a trim position of the outboard motor 30 relative to the associated watercraft.

A fuel pressure sensor 282 is also provided to detect the fuel pressure in the fuel supply system 94. The fuel pressure sensor 282 will be described in greater detail below.

The ECU 100 calculates the optimum or desired control values using control maps and the signals sensed by the sensors. The ECU 100, then, controls at least the fuel injectors 98 through an injector driver 286, the spark plugs 214, the electric pump 120 and the lubricant pump 246 in this arrangement.

The outboard motor 30 and the engine 36 can have other systems and devices. For example, the engine 36 incorporates a starter motor 290 (FIG. 2) for starting the engine operation and a flywheel 292 (FIG. 2) for stabilizing the rotation of the crankshaft 46.

Fuel Pressure Sensor Mounting Structures

With reference to FIGS. 1, 3, 9 and 10, the fuel pressure sensor 282 and a mounting structure of the sensor 282 will now be described in greater detail.

The illustrated fuel pressure sensor 282 detects the pressure downstream from the high pressure pump unit 122. As schematically illustrated in the upper view of FIG. 1, a connecting path 294 can connect the high pressure fuel passages 142, 144 and the fuel pressure sensor 282 can be mounted to the connecting path 294.

Figure 3:
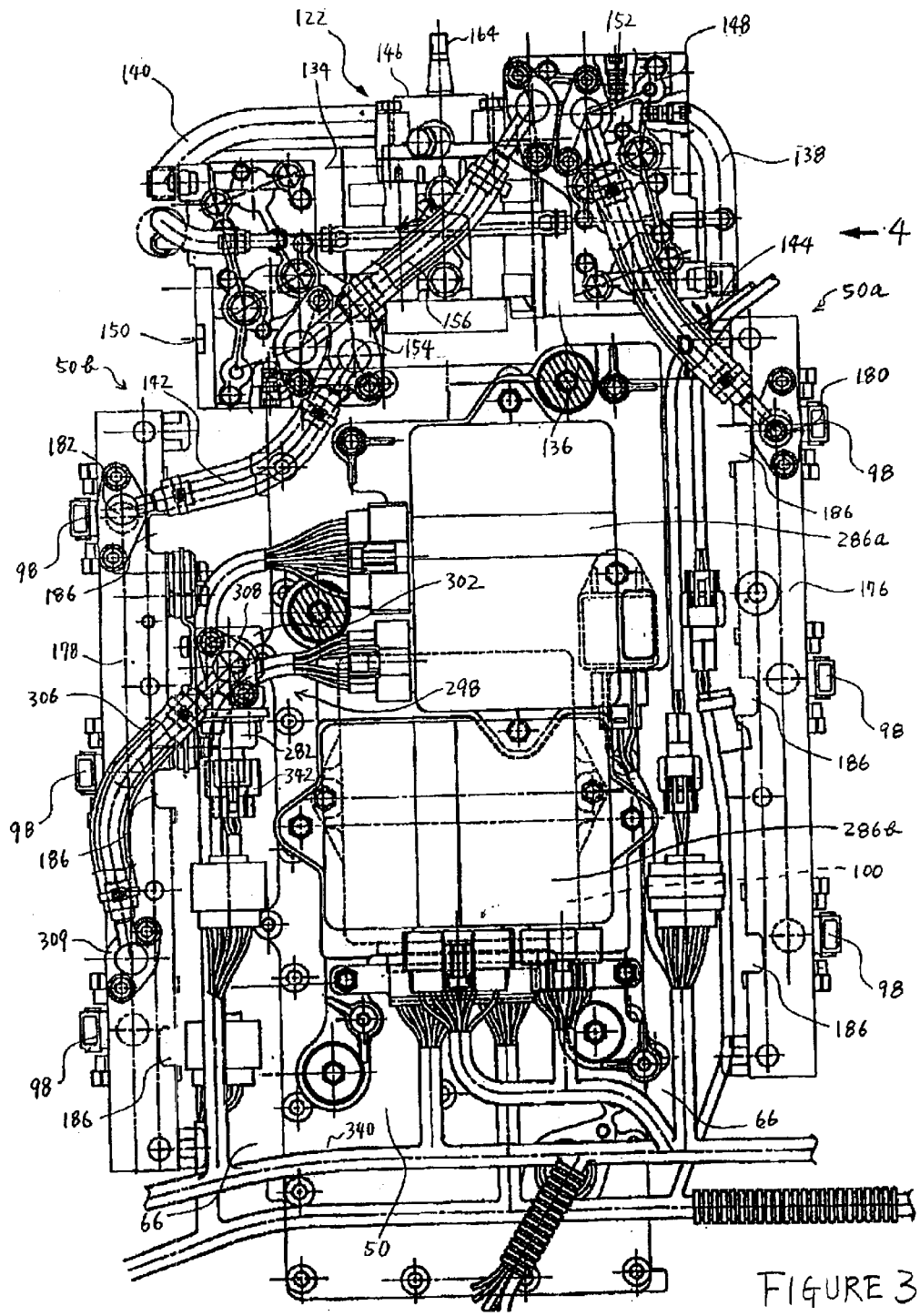
FIG. 3 is a partial elevational side view of the engine taken in the direction of the Arrow 3 of FIG. 2.
Figure 9:
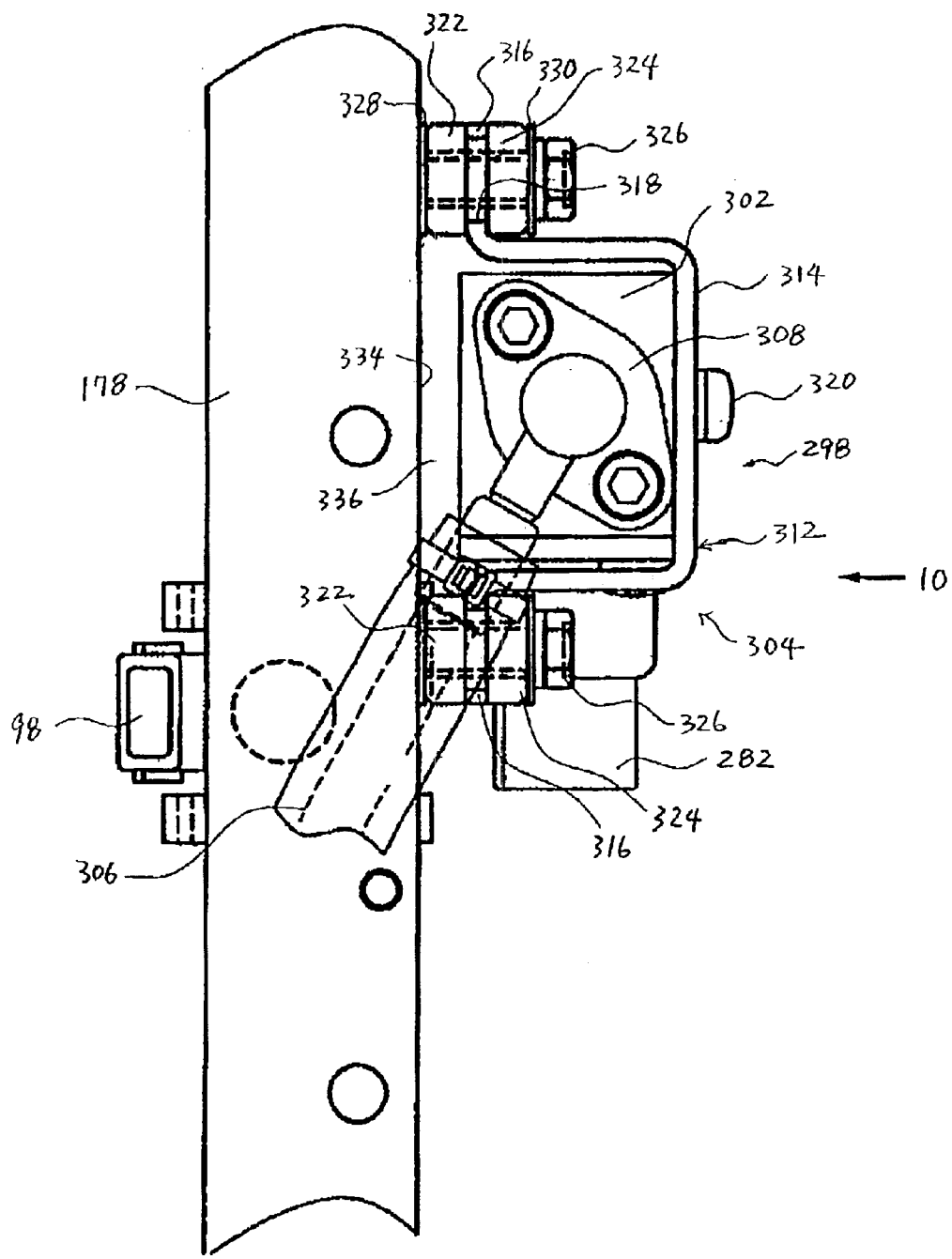
FIG. 9 is a partial rear view of a fuel pressure mounting structure configured in accordance with an embodiment of the present invention. A flexible conduit is illustrated in a see-through manner to show the mounting structure.
Figure 10:
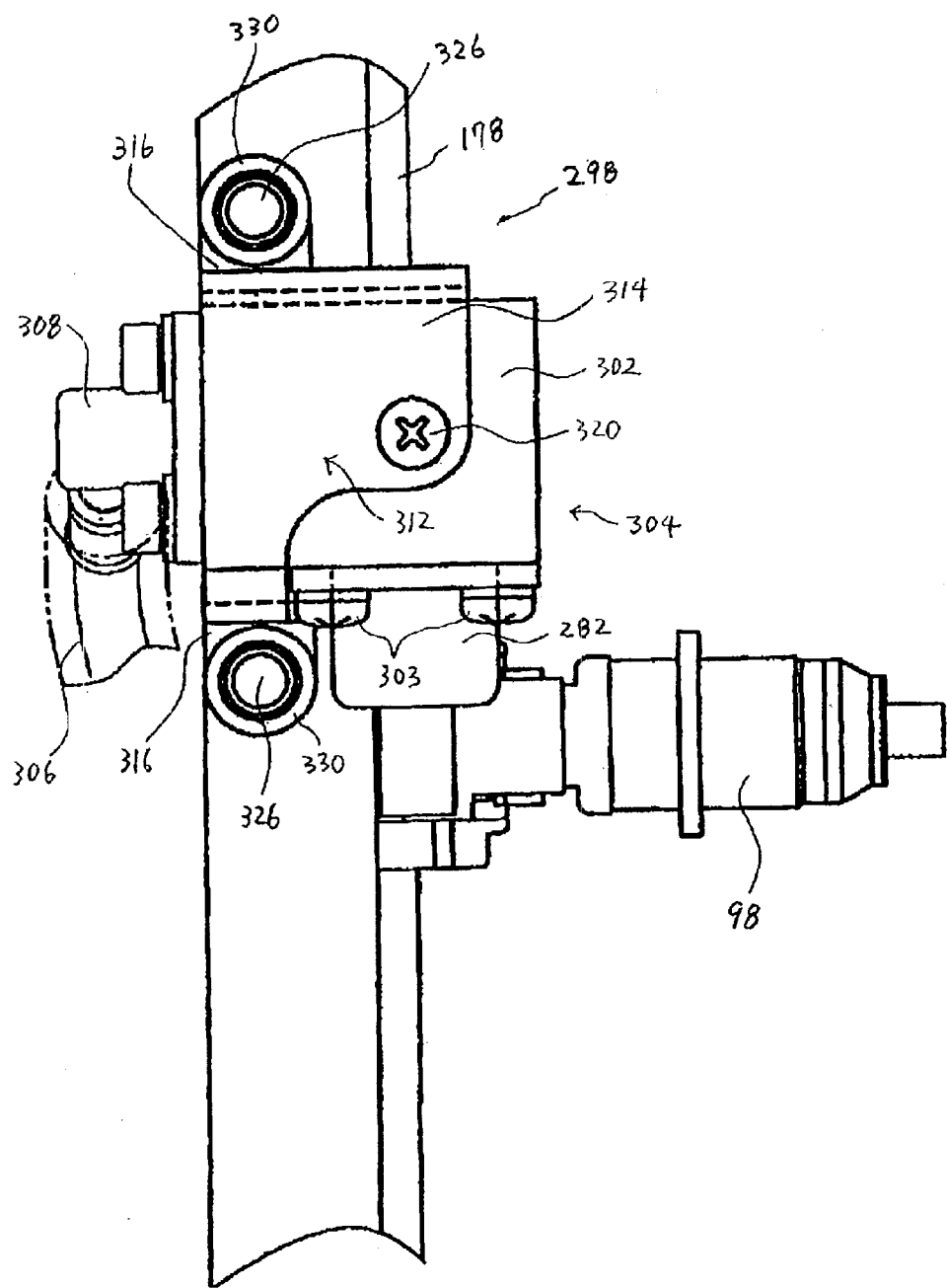
FIG. 10 is a partial side view of the fuel pressure mounting structure of FIG. 9 taken in the direction of the Arrow 10 of FIG. 9.

FIGS. 3, 9 and 10 illustrate a slightly different mounting structure 298. In the structure 298, the pressure sensor 282 is mounted to the fuel rail 178 so that it can easily be electrically connected to the ECU 100, which is positioned close to the fuel rail 178. Additionally, the fuel rails 178, 176 tend to transfer engine vibrations less than other components. The fuel pressure sensor 282, however, incorporates electric circuit elements, which are not generally durable against vibrations. The illustrated mounting structure 298 protects the fuel pressure sensor 282 from the engine vibrations.

The injector driver 286 preferably is divided into two driver units 286a, 286b. The driver units 286a, 286b preferably are disposed between the cylinder banks 50a, 50b and are mounted to the cylinder block 50. The driver unit 286a is positioned above the driver unit 286b in this arrangement. The illustrated ECU 100 preferably is placed between the lower driver unit 286b and the cylinder block 50 and is mounted to the cylinder block 50. As shown in FIG. 3, the lower driver unit 286b covers the ECU 100.

The illustrated fuel pressure sensor 282 is coupled with a pressure receiver 302 by screws 303 (FIG. 10) and forms a sensor unit 304 together with the pressure receiver 302. The sensor unit 304 preferably is mounted to a side surface of the fuel rail 178 so as to face the ECU 100. A flexible conduit 306 connects the pressure receiver 302 to the fuel rail 178 to convey the fuel pressure in the fuel rail 178 to the pressure receiver 302. The flexible conduit 306 is affixed to the pressure receiver 302 and the fuel rail 178 by joints 308, 309, respectively.

The fuel pressure sensor 282 preferably depends from the pressure receiver 302. The sensor 282 can be, for example, a diaphragm type sensor or piezo-electric type sensor to sense the pressure in the pressure receiver 302.

With particular reference to FIGS. 9 and 10, a support member 312 supports the sensor unit 304. In the illustrated arrangement, the support member 312 is made of a sheet metal such as, for example, an aluminum-alloy sheet metal, and has a support section 314 and mount sections 316. The support section 314 comprises a first portion that extends generally parallel to the fuel rail 178 and second portions that extend toward the fuel rail 178 from the first portion. Each mount section 316 extends generally parallel to the fuel rail 178 from each end of the second portions of the support section 314. Each mount section 316 defines an opening 318. The support section 314 and the mount sections 316 can be pressed from sheet metal. The openings 318 preferably are punched during the pressing process. Alternatively, the openings 318 can be made prior to or after the pressing process.

The support section 314 preferably supports the pressure receiver 302 of the sensor unit 304. In the illustrated arrangement, a screw 320 fastens the pressure receiver 302 to the first portion of the support section 314. The mount sections 316 are affixed to the fuel rail 178 with the support section 314 holding the sensor unit 304. In the illustrated arrangement, each mount section 316 is interposed between elastic members 322, 324 that preferably has a circular shape. A bolt 326 fastens each mount section 316 together with the elastic members 322, 324 to the fuel rail 178. The elastic members 322, 324 can be made of a rubber material. A washer 328 preferably is interposed between the elastic member 322 and the fuel rail 178. Similarly, a washer 330 preferably is interposed between the elastic member 324 and the head of the bolt 326.

Each opening 318 of the mount section 316 preferably has an inner diameter slightly larger than an outer diameter of the bolt 326. Thus, the mount sections 316 do not contact the bolts 326. Also, the distance between the second portion of the support section 314 and the fuel rail 178 is such that the pressure receiver 302 does not contact a side surface 334 of the fuel rail 178 when the pressure receiver 302 is affixed to the support section 314. In other words, a space 336 preferably is defined between the pressure receiver 302 and the fuel rail 178.

With reference to FIG. 3, a wire-harness 340 has an electric coupler 342 that is coupled with the fuel pressure sensor 282. The wire-harness 340 is connected to the ECU 100.

Preferably, the sensor unit 298 is mounted to the fuel rail 178 after the engine components, including the fuel rail 178 and the ECU 100, are mounted to the engine body 45. The joint 308 of the flexible conduit 306 preferably is coupled with the sensor unit 298 before the sensor unit 298 is mounted to the fuel rail 178. The joint 309 of the conduit 306 is preferably coupled with the fuel rail 178 after the sensor unit 298 is mounted to the fuel rail 178. The coupler 342 is then connected to the sensor unit 298.

As thus described, in the illustrated arrangement, a relatively short wire-harness may be used to connect the sensor unit to the ECU because the sensor unit is mounted to one of the fuel rails in close proximity to the ECU. Although the sensor unit is mounted the fuel rail, the sensor unit, and particularly the fuel pressure sensor itself, is well protected from engine vibrations because of at least the elastic members.

Additionally, the sensor unit can be mounted to the fuel rail after the engine components (including the fuel rail) are mounted to the engine body. Thus, the sensor unit can be easily installed. The sensor mounting structure can contribute to reduce the manufacturing cost and to less potential damage during the assembly of the engine.

Figure 11:
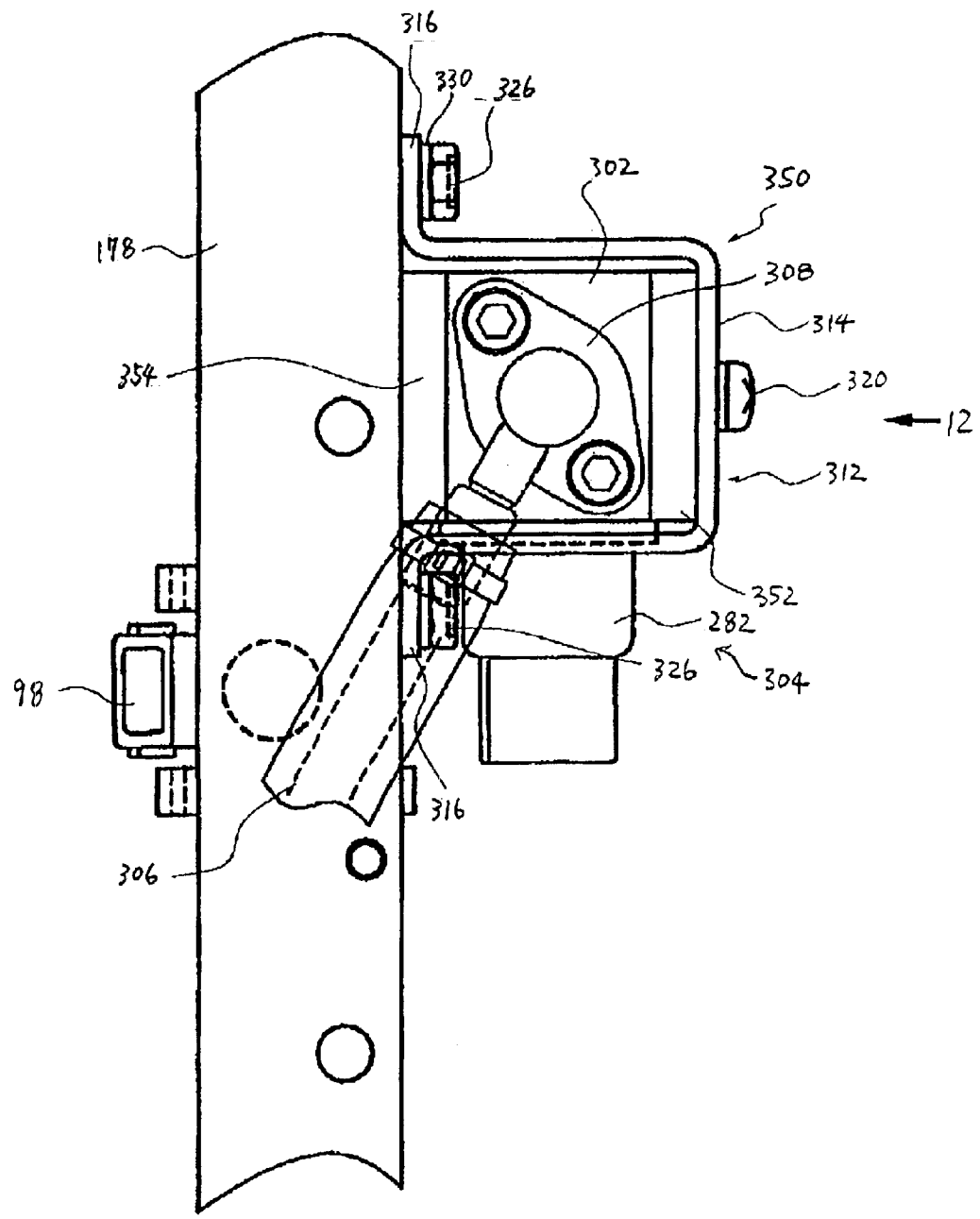
FIG. 11 is a partial rear view of a modified fuel pressure mounting structure configured in accordance with another embodiment of the present invention. The flexible conduit is illustrated in a see-through manner to show the mounting structure.
Figure 12:
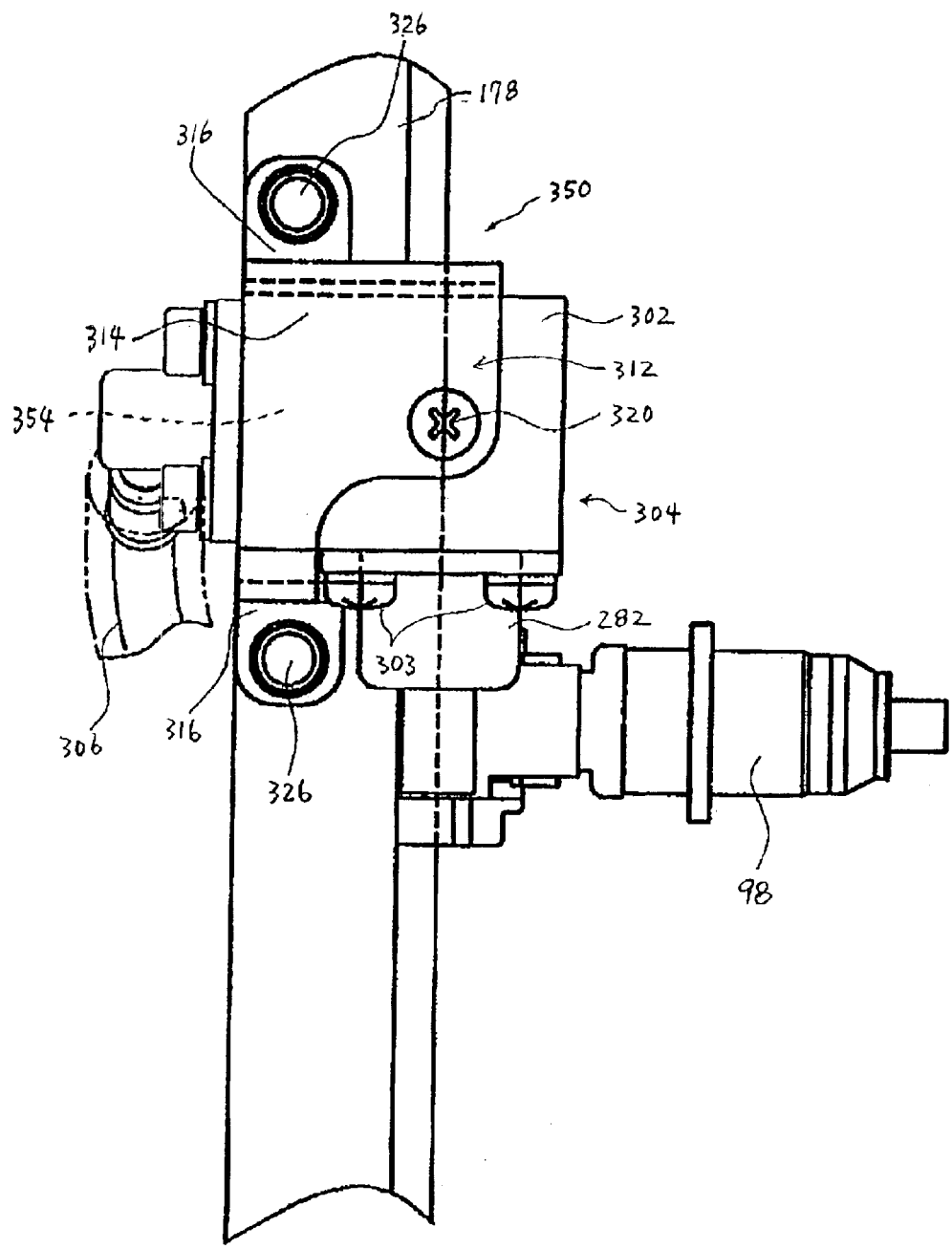
FIG. 12 is a partial side view of the fuel pressure mounting structure of FIG. 11 taken in the direction of the Arrow 12 of FIG. 11.

With reference to FIGS. 11 and 12, a modified fuel pressure mounting structure 350 configured in accordance with another embodiment of the present invention will be described below. The members that have already been described in connection with the first embodiment will be assigned the same reference numerals and will not be describe again unless further description is required.

In this modified structure 350, the same support member 312 is applied to mount the sensor unit 304 on the fuel rail 178. However, the illustrated mount sections 316 of the support member 314 are directly affixed to the fuel rail 178 without the elastic members 322, 324. Alternatively, the elastic members 322, 324 can still be interposed between the mount sections 316 and the fuel rail 178. In the illustrated embodiment, an elastic plate 352 is interposed between the pressure receiver section 302 and the first portion of the support section 314. Also, another elastic plate 354 is interposed between the pressure receiver section 302 and the fuel rail 178. Both the elastic plates 352, 354 preferably are made of a rubber material. The screw 320 preferably reaches the pressure receiver section 302 so that the support member 312 securely holds the sensor unit 304. Thus, the sensor unit 304 is mounted to the fuel rail 178 without directly contacting the fuel rail 178. In this arrangement, the vibrations may be transferred to the sensor unit 304 through the screw 320; however, the transfer of vibrations is nominal and most vibrations can be effectively absorbed by the elastic members.

Figure 13:
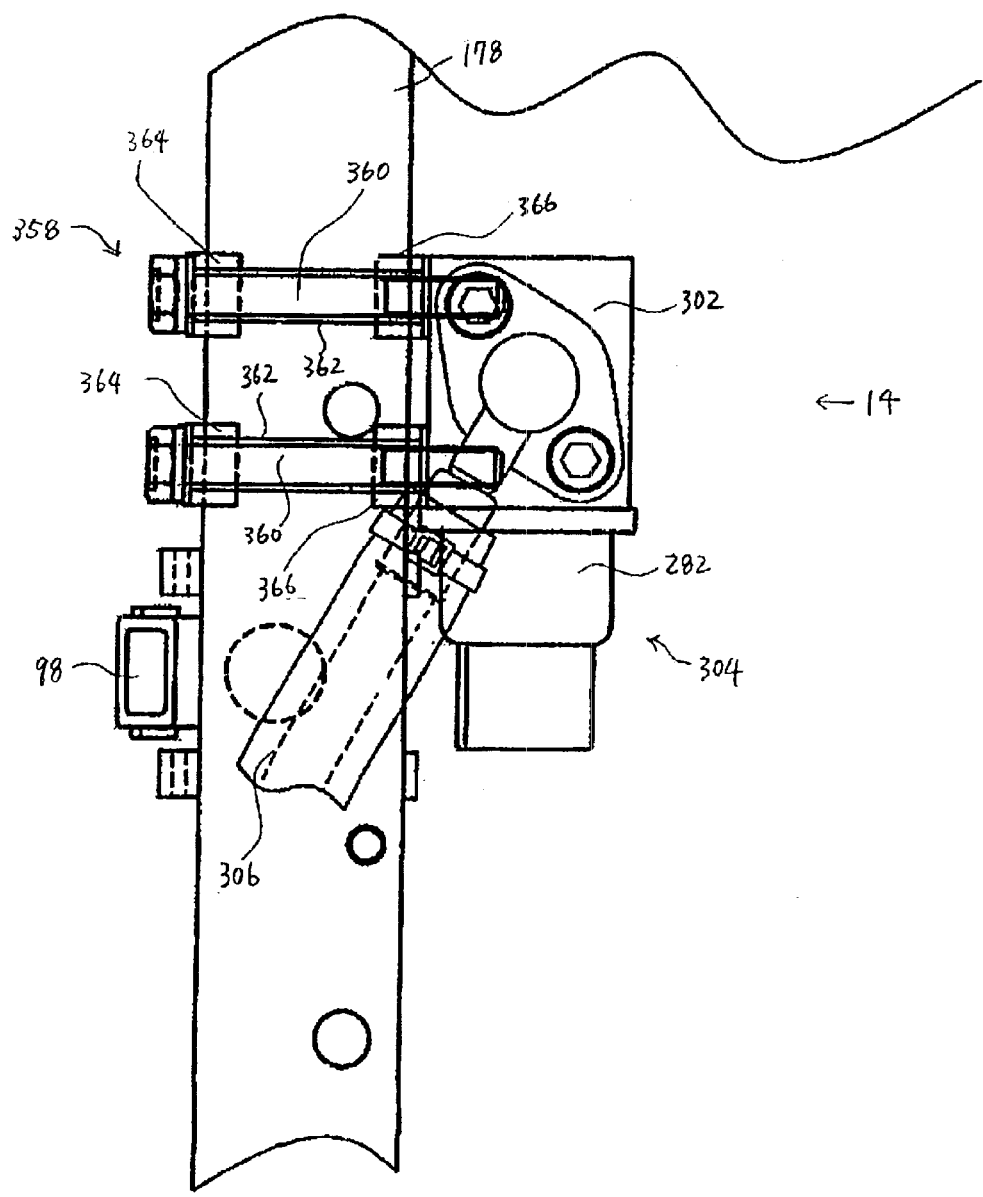
FIG. 13 is a partial rear view of another modified fuel pressure mounting structure configured in accordance with a still another embodiment of the present invention. The flexible conduit and portions of the mounting structure are illustrated in a see-through manner.
Figure 14:
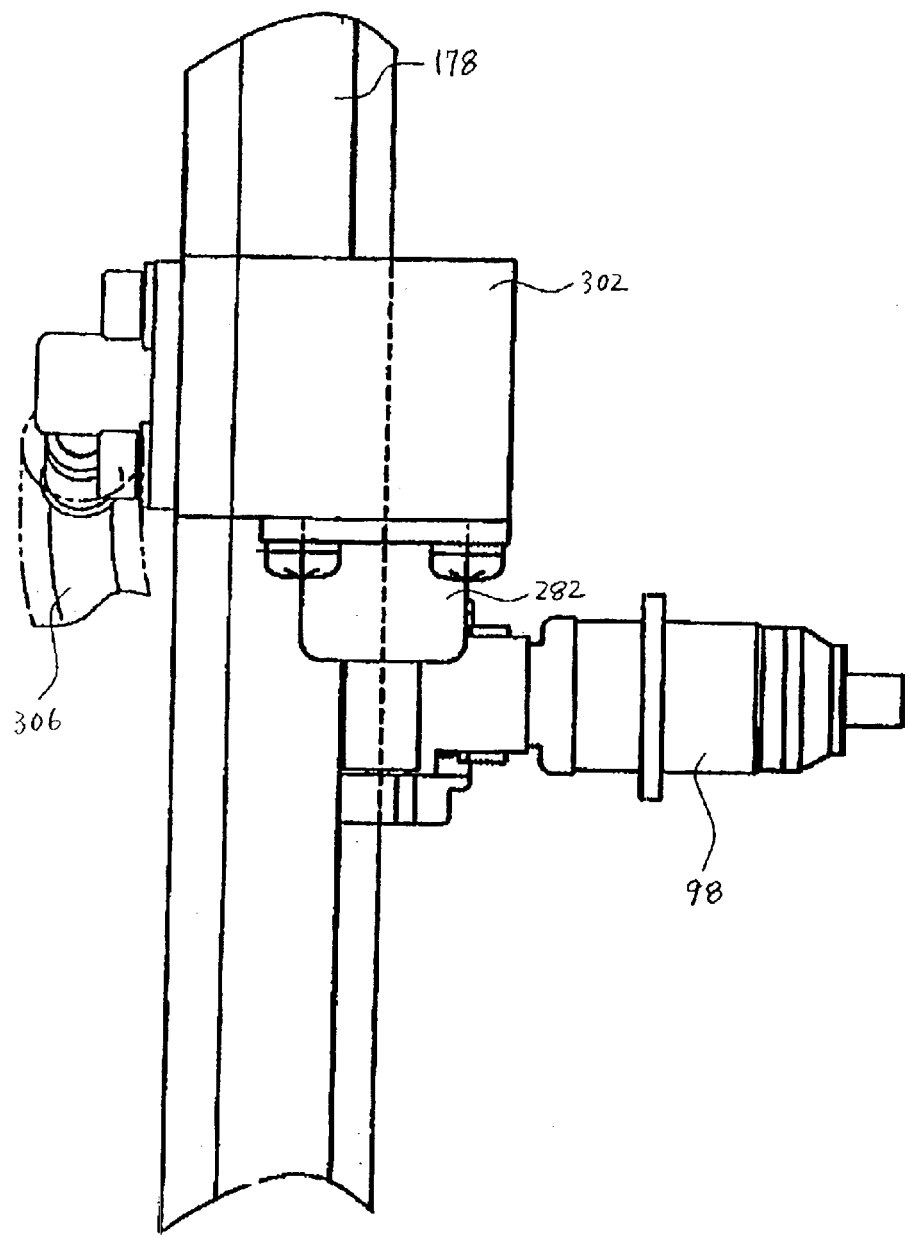
FIG. 14 is a partial side view of the fuel pressure mounting structure FIG. 13 taken in the direction of the Arrow 14 of FIG. 13.

With reference to FIGS. 13 and 14, another modified fuel pressure mounting structure 358 configured in accordance with a third embodiment of the present invention will be described below. The members that have already been described in connection with the first embodiment will be assigned the same reference numerals and will not be describe again unless further description is required.

In this structure 358, at least two bolts 360 extend through the fuel rail 178 and reach the pressure receiver 302 to affix the sensor unit 304 to the fuel rail 178. Collars 362 preferably extend together with the bolts 360. An elastic member 364, which preferably is made of a rubber material, is interposed between a head portion of each bolt 360 and the fuel rail 178, the bolt 360 passing through the elastic member 364. Also, another elastic member 366, which preferably is made of a rubber material, is interposed between the pressure receiver 302 and the fuel rail 178, the bolt 360 passing through the elastic member 366. The bolts 360 do not contact the fuel rail 178. Thus, the sensor unit 304 is mounted to the fuel rail 178 without directly contacting the fuel rail 178. The elastic members 364, 366 can dampen the vibrations.

Another Outboard Motor Featuring Fuel Rail Mounting Structures

With reference to FIGS. 15–22, another outboard motor 400 and particularly several fuel rail mounting structures of the outboard motor 400 will be described below. The fuel rail mounting structures described below can also be applied to the outboard motor 30 that has been described with reference to FIGS. 1–14.

Figure 15:
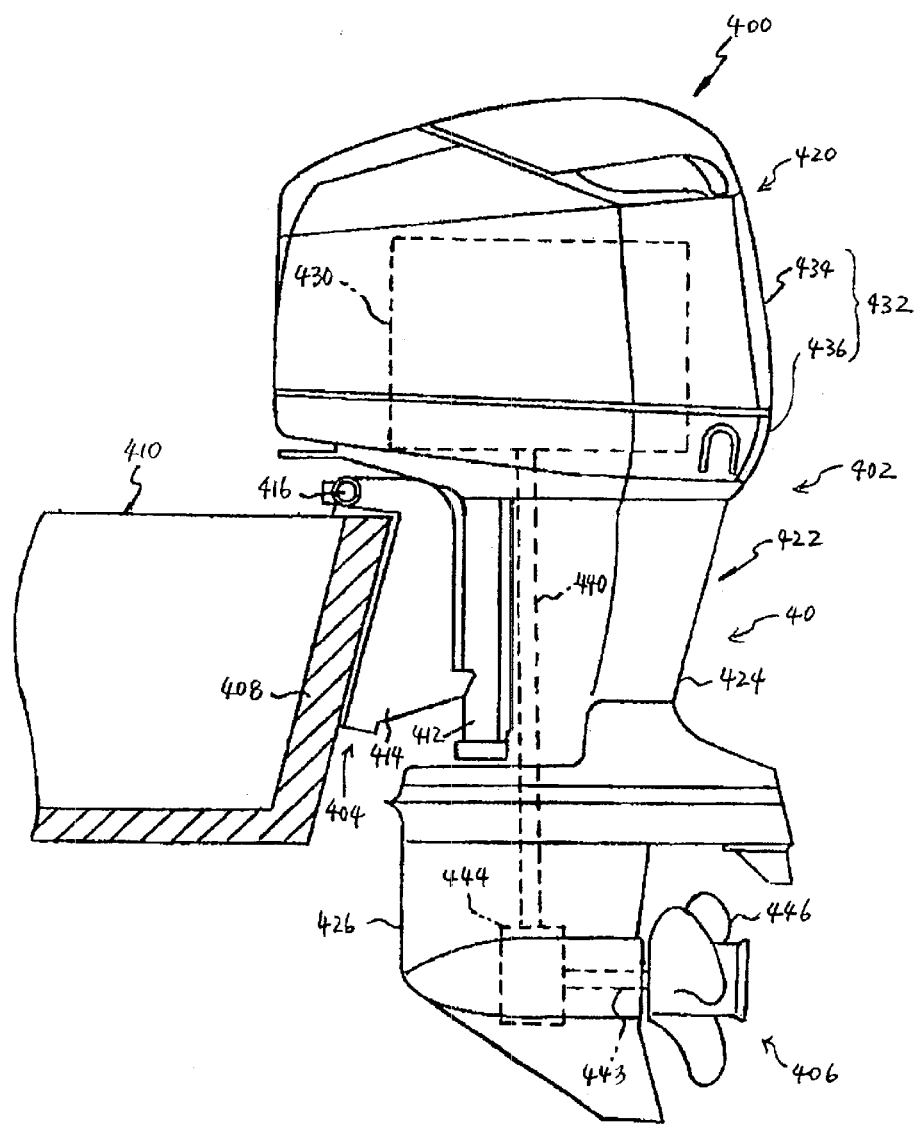
FIG. 15 is a side elevational view of another outboard motor configured in accordance with another aspect of the present invention. An associated watercraft is also illustrated in cross-section.

With initial reference to FIG. 15, the outboard motor 400 generally comprises a drive unit 402, a bracket assembly 404, and a propelling unit 406. The bracket assembly 404 supports the drive unit 402 on a transom 408 of an associated watercraft 410 and places the propelling unit 406 in a submerged position when the watercraft 410 rests on the surface of a body of water. The bracket assembly 404 preferably comprises a swivel bracket 412, a clamping bracket 414, a steering shaft and a pivot pin 416.

The steering shaft extends through the swivel bracket 412 and is affixed to the drive unit 402. The steering shaft is pivotally journaled for steering movement about a generally vertically extending steering axis defined within the swivel bracket 412. The clamping bracket 414 comprises a pair of bracket arms that are spaced apart from each other and that are affixed to the watercraft transom 408. The pivot pin 416 completes a hinge coupling between the swivel bracket 412 and the clamping bracket 414. The pivot pin 416 extends through the bracket arms so that the clamping bracket 414 supports the swivel bracket 412 for pivotal movement about a generally horizontally extending tilt axis defined by the pivot pin 416. The drive unit 402 thus can be tilted or trimmed about the pivot pin 416.

The illustrated drive unit 402 comprises a power head 420 and a housing unit 422. The housing unit 422 comprises a drive housing 424 and a lower unit 426. The power head 420 is disposed atop the drive unit 402 and includes an internal combustion engine 430 and a protective cowling assembly 432 surrounding the engine 430. The protective cowling assembly 432 preferably comprises top and bottom cowling members 434, 436 that are detachably coupled together.

The top cowling member 434 preferably has a rear intake opening on an upper rear portion. Ambient air is thus drawn into a closed cavity defined by the cowling assembly 432 through the rear intake opening.

The bottom cowling member 436 preferably has an opening through which an upper portion of an engine support member extends. The support member preferably is affixed atop the driveshaft housing 424. The bottom cowling member 436 and the support member together generally form a tray. The engine 430 is placed onto this tray and is affixed to the support member.

The driveshaft housing 424 extends vertically beneath the power head 420. The bracket assembly 404 is coupled with the driveshaft housing 424. The lower unit 426 depends from the driveshaft housing 424. A driveshaft 440 extends vertically through the driveshaft housing 424 and ends within the lower unit 426. The driveshaft 440 is coupled with a crankshaft 442 (FIGS. 16 and 17) of the engine 430 that extends vertically. The crankshaft 442 drives the driveshaft 440.

A propulsion shaft 443 extends horizontally through the lower unit 426 and is coupled with the driveshaft 440 via a transmission mechanism 444 that preferably comprises a bevel gear assembly. Thus, the driveshaft 440 drives the propulsion shaft 443 through this transmission mechanism 444. The propelling unit 406 is mounted to an outer end of the propulsion shaft 443. The illustrated propelling unit 406 is a propeller 446. The transmission mechanism 444 preferably incorporates a changeover unit that changes the transmission mechanism 444 among forward, reverse and neutral positions. The propeller 446 rotates at the forward position to propel the watercraft 410 forward and rotates at the reverse position to propel the watercraft 410 backward. The propeller 446 does not rotate at the neutral position and the watercraft 410 does not advance either forward or backward.

The engine 430 preferably has constructions and arrangements that are quite similar to those of the engine 36 of the outboard motor 30 described above. That is, the engine 430 operates on a two-stroke, crankcase compression principle and is generally configured as a V-shape with a pair of cylinder banks extending toward the rear of the engine. Each cylinder bank preferably defines three cylinder bores. Thus, the same systems, components and members that have already been described will be assigned the same reference numerals and will only be further described if additional information is required.

Figure 17:
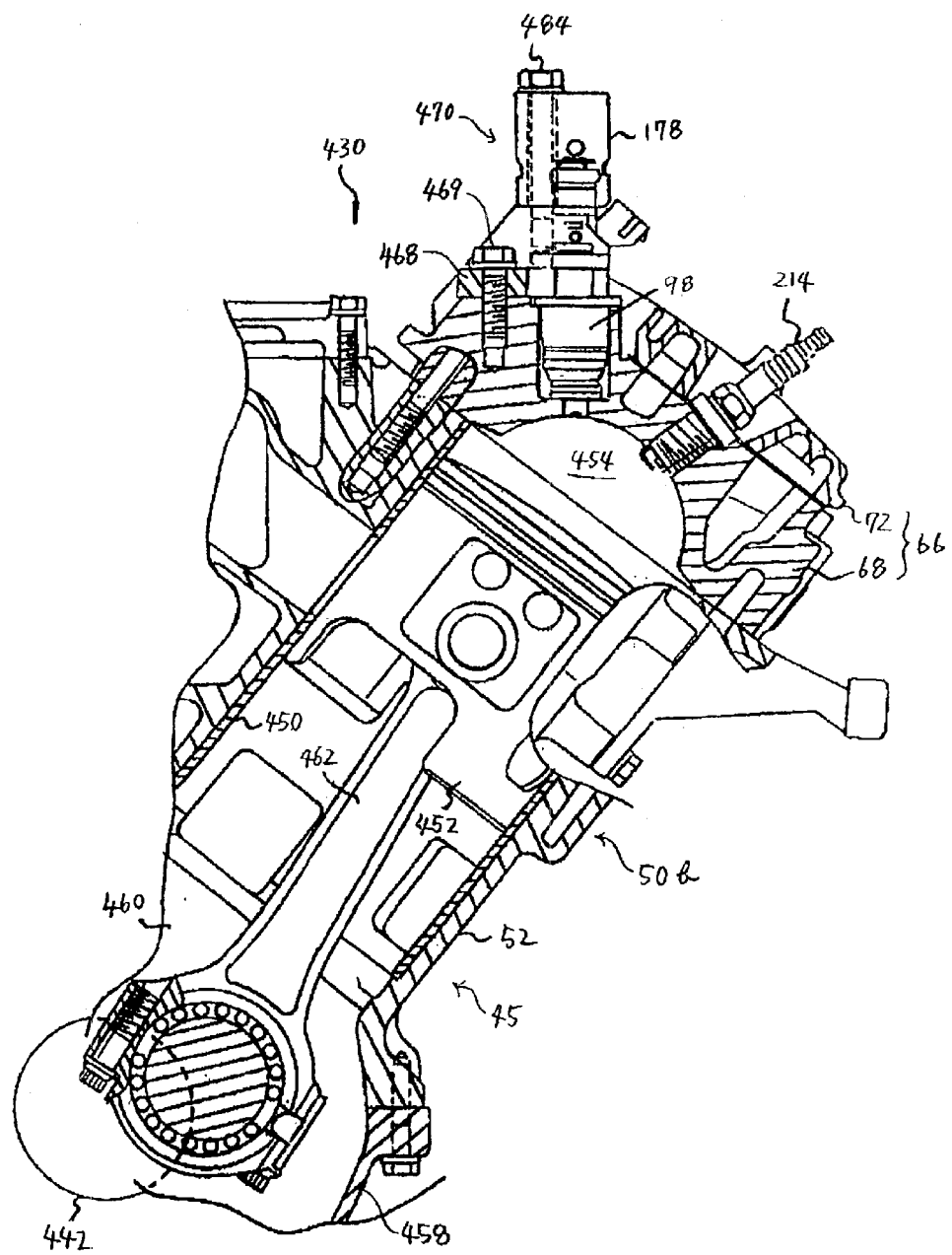
FIG. 17 is a partial, cross-sectional top plan view of the engine illustrating one bank thereof on the port side.

With particular reference to FIG. 17, the cylinder bank 50b defines cylinder bores 450. Pistons 452, which are movable members, reciprocate within the cylinder bores 450. A cylinder head member 68 closes an end of each of the cylinder bores 450. The cylinder head member 68 defines three combustion chambers 454 together with the cylinder bores 450 and the pistons 452. A cylinder head cover member 72 is affixed to the cylinder head member 68 to define a cylinder head assembly 66 with the cylinder head member 68.

A crankcase member 458 closes another end of each of the cylinder bores 450. Crankcase chamber sections 460 are formed between the cylinder block 52 and the crankcase member 458, corresponding to the respective combustion chambers 454. The crankshaft 442, which is substantially the same as the crankshaft 46 of the engine 36 described above, extends through the crankcase chamber sections 460. Connecting rods 462 rotatably connect the crankshaft 46 with the respective pistons 452. Accordingly, the crankshaft 46 rotates when the pistons 452 reciprocally move within the cylinder bores 450.

The cylinder block 52, the cylinder head assemblies 66 and the crankcase member 458 together define an engine body 45 of the engine 430. Spark plugs 214 extend through plug holes 464 (FIG. 18) of the cylinder head assemblies 66 into the combustion chambers 454. The fuel injectors 98 are coupled with the fuel rails 176, 178 and are also affixed directly to the cylinder head members 68 by a forked member 468 and a bolt 469.

Figure 16:
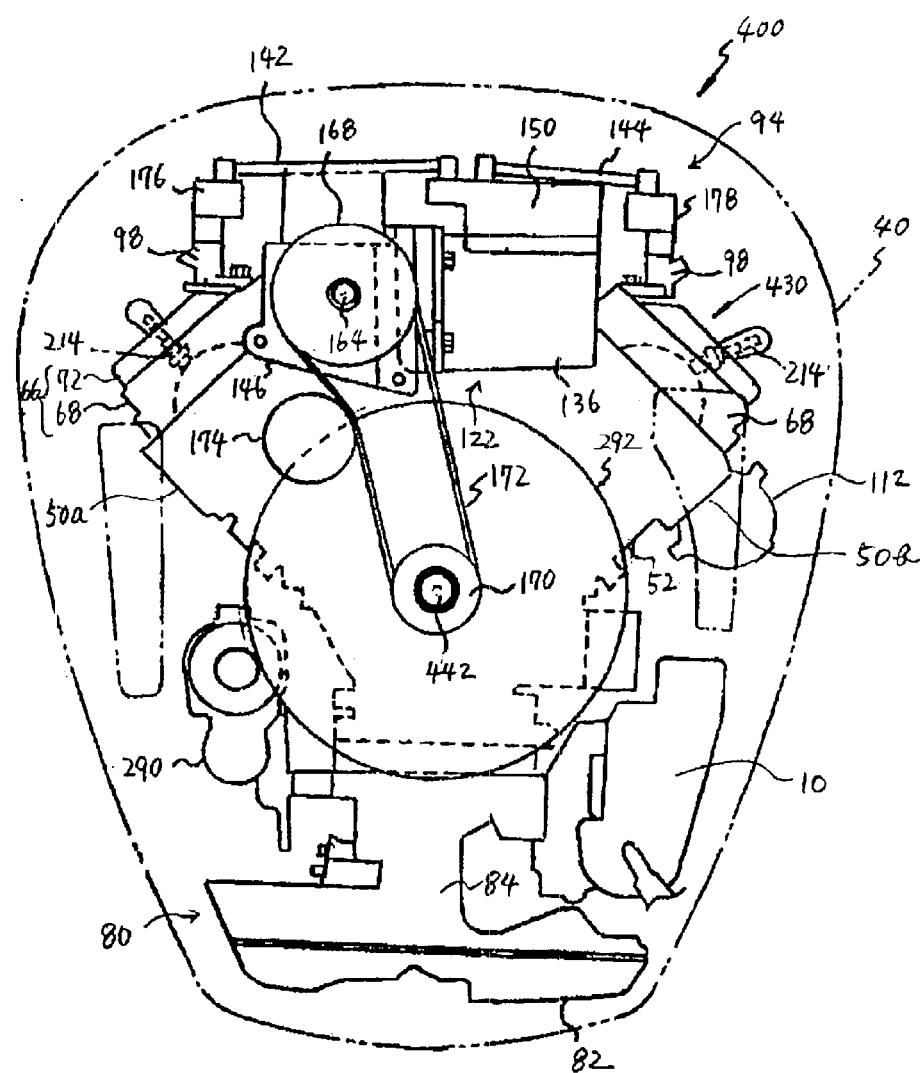
FIG. 16 is a top plan view showing a power head of the outboard motor of FIG. 15. An engine of the outboard motor is illustrated generally in solid lines, and a protective cowling of the power head, which encloses the engine, is illustrated in phantom lines.

With particular reference to FIG. 16, the engine 430 is provided with an air induction system 80, a fuel supply system 94, an exhaust system, a lubrication system and a cooling system. These systems are the same as, or quite similar to those which have been described above except for the fuel supply system 94. The fuel supply system 94 in this arrangement also incorporates a high pressure fuel pump unit 122. The pump unit 122 of this engine 430 is slightly different from the high-pressure fuel pump unit 122 of the engine 36. That is, the pump unit 122 of this engine 430 is provided with only one high pressure pump 136. In other words, one of the paired pumps in the engine 36, which is the pump 134, is omitted in this engine 430. Other portions of the engine 430 are similar to those of the engine 36.

Figure 18:
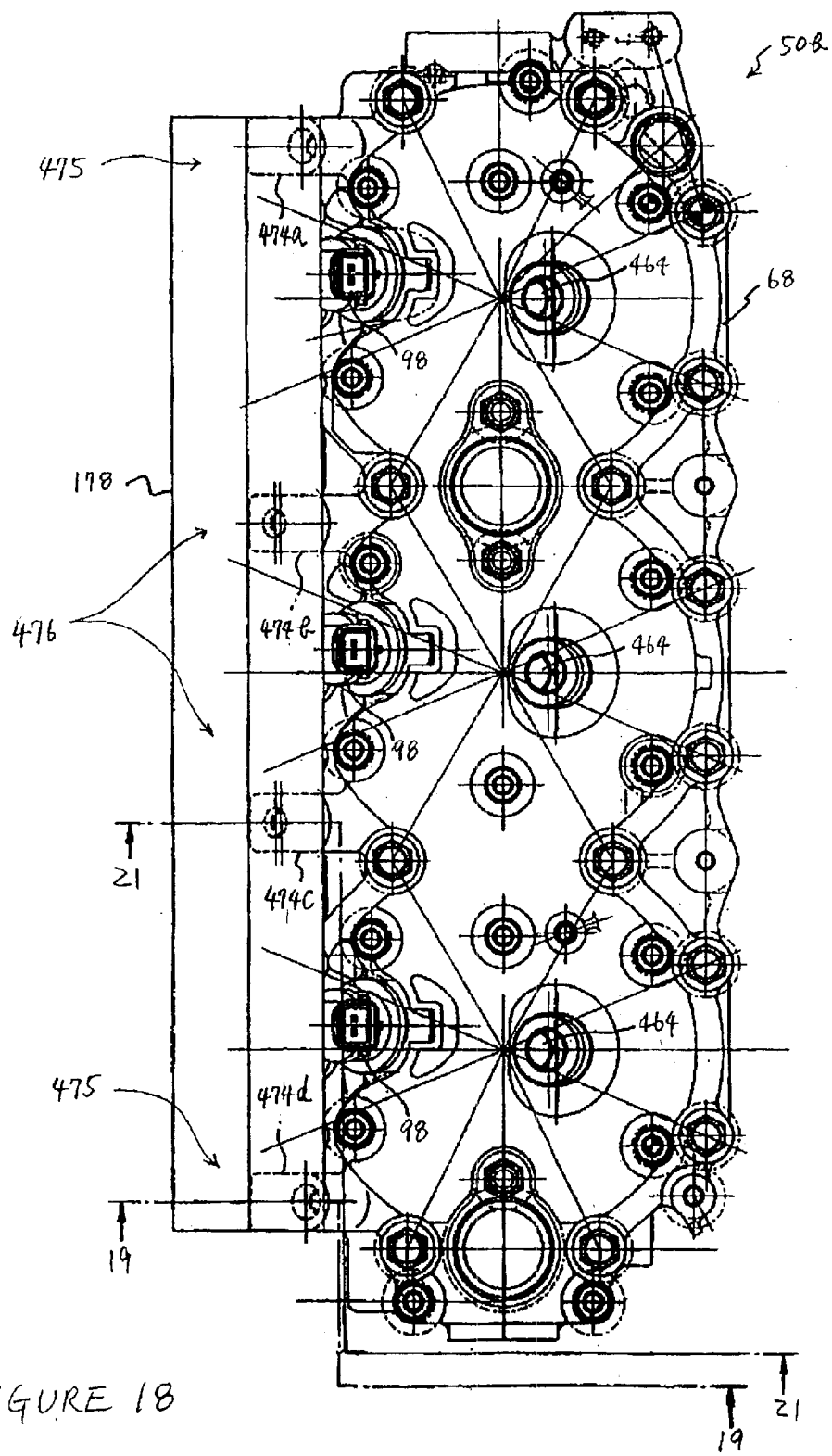
FIG. 18 is a rear elevational view of the portside bank of FIG. 17.

With reference to FIG. 18, four mount bosses 474a, 474b, 474c, 474d project from each cylinder head member 68. Those bosses 474a, 474b, 474c, 474d are positioned from top to bottom in that order and are spaced apart generally equally from each other.

The engine body 45 including the cylinder head member 68 can get very hot during the engine operations. On the other hand, the fuel rail 178 does not produce any heat. The heat in the cylinder head member 68 can transfer to the fuel rail 178 because the fuel rail 178 is mounted to the cylinder head member 68. The heat, however, will be absorbed by the fuel flowing through the internal passage of the fuel rail 178 and the fuel rail 178 itself does not actually heat up significantly. The difference between the temperature of the cylinder head member 68 and the temperature of the fuel rail 178 can produce a heat expansion of the cylinder head member 68 that is greatly different from a heat expansion of the fuel rail 178. As a result, high stresses can be produced at the respective bosses 474a, 474b, 474c, 474d.

The stress at the intermediate bosses 474b, 474c can be smaller than at the end bosses 474a, 474d because the difference in heat expansion between the cylinder head member 68 and the fuel rail 178 is the greatest at the distal ends of the fuel rail 178. Thus, the intermediate bosses 474b, 474c do not need to be as strong as the end bosses, 474a, 474d, which are under greater stress due to the heat expansion. Accordingly, the end bosses preferably have a greater magnitude of strength than do the intermediate bosses.

Fuel Rail Mounting Structures

Figure 19:
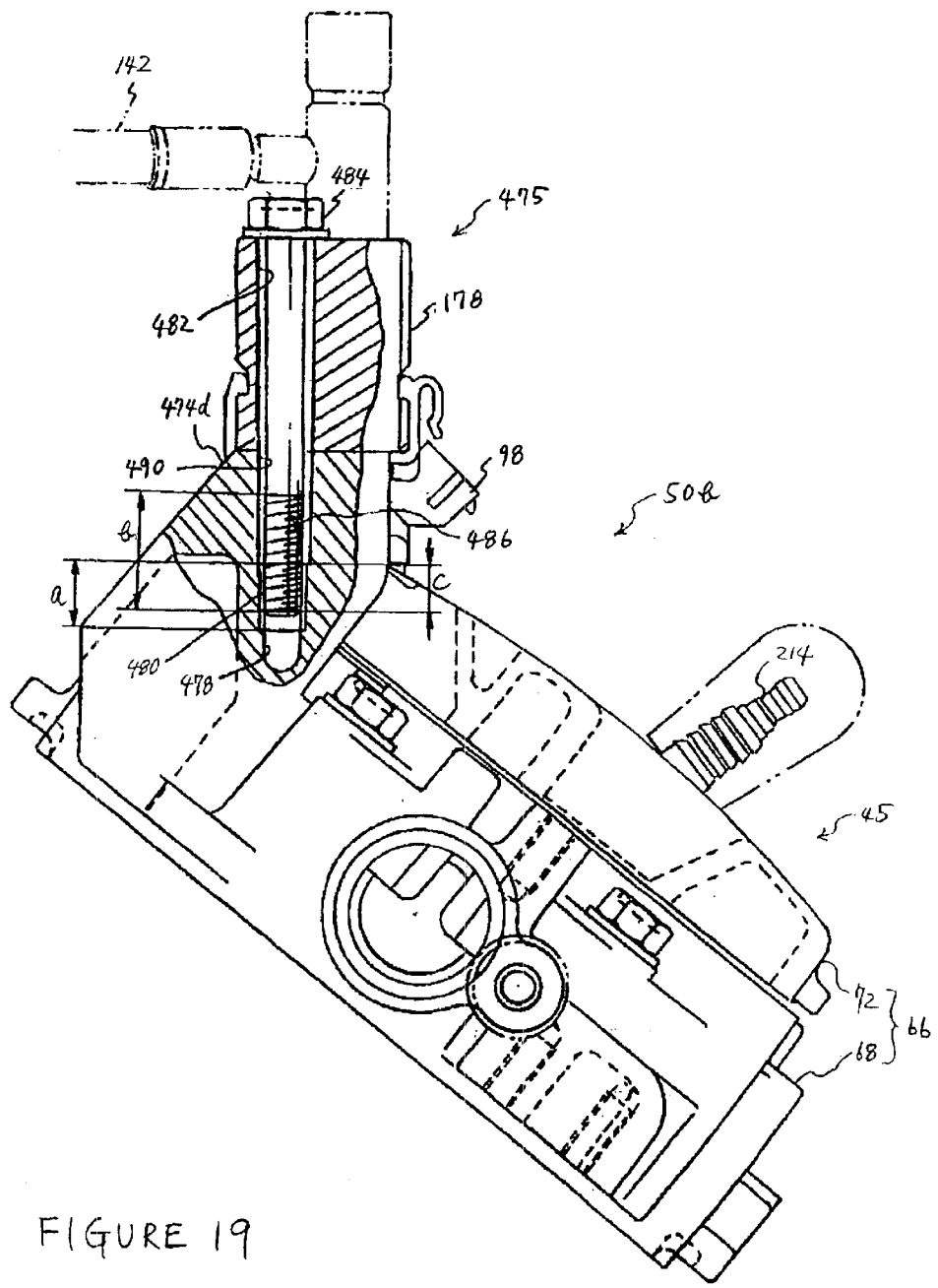
FIG. 19 is a top plan view of a cylinder head assembly of the engine FIG. 16 with the fuel rail on the port side, illustrating a fuel rail mounting structure configured in accordance with one embodiment of the present invention.
Figure 21:
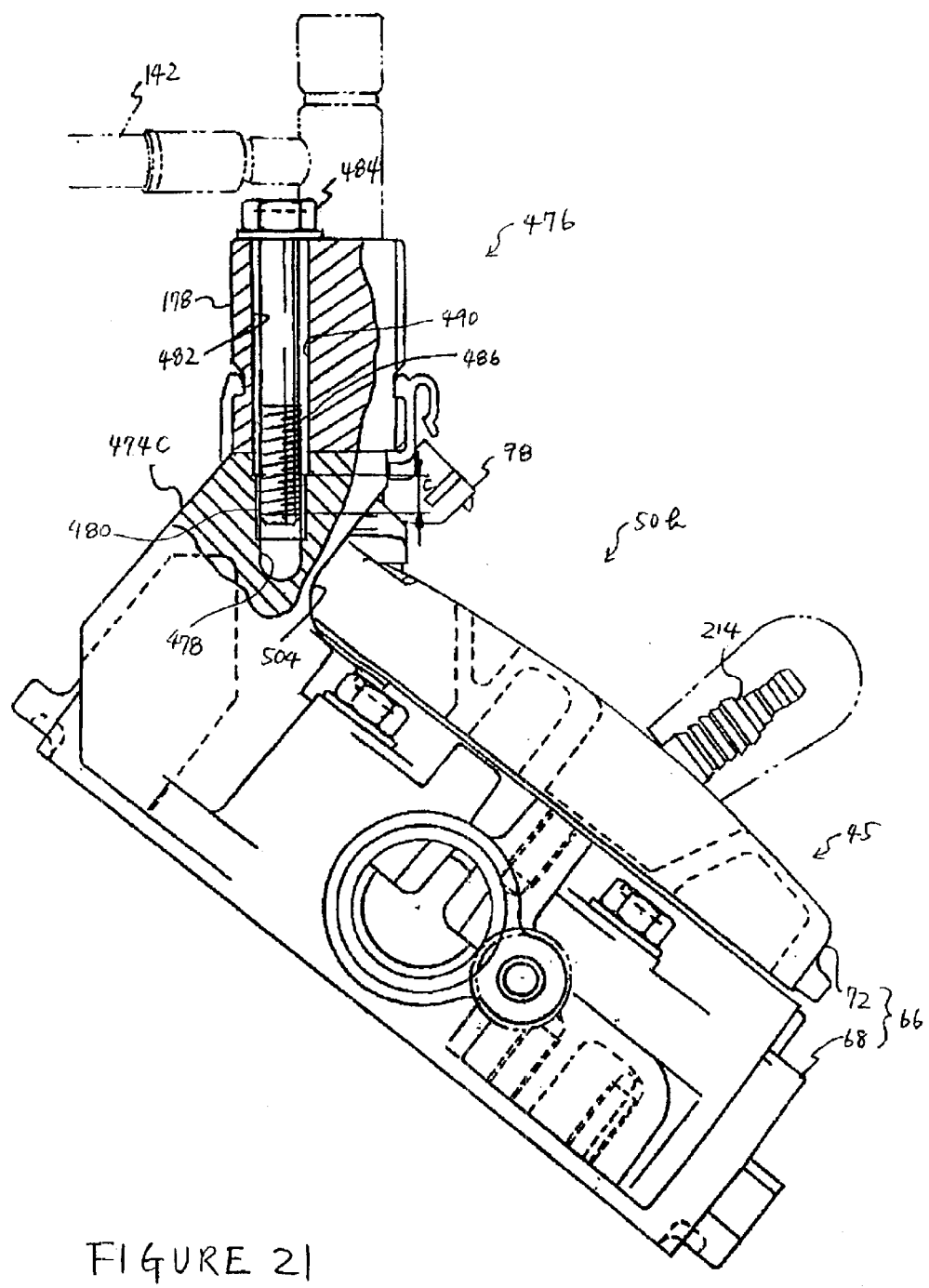
FIG. 21 is a top plan view of a cylinder head assembly of the engine of FIG. 16 with the fuel rail on the port side, illustrating a fuel rail mounting structure for an intermediate boss for use in combination with other mounting structures in an embodiment of the invention.

With continued reference to FIG. 18 and with additional reference to FIGS. 19 and 21, an end fuel rail mounting structure 475 is applied to the end bosses 474a, 474d and an intermediate fuel rail mounting structure 476 is applied to the intermediate bosses 474b, 474c in a preferred arrangement. FIG. 19 illustrates the end mounting structure 475 at the boss 474d, while FIG. 21 illustrates the intermediate mounting structure 476 at the boss 474c. It should be noted that the end mounting structure 475 at the boss 474a is the same as the structure at the boss 474d, and that the intermediate mounting structure 476 at the boss 474b is the same as the structure at the boss 474c.

With reference to FIG. 19, the boss 474d defines a relatively deep bolt hole 478 that reaches the cylinder head member 68 adjacent to the boss 474d. The cylinder head member 68 is a portion of the engine body that functions as a base supporting the boss 474d, as well as defining the roof of the combustion chamber in the illustrated embodiment. Portions of the engine body that do not protrude to form a boss, but are positioned under a boss like a foundation, provide increased support for the boss when a bolt is inserted into the bolt hole and fastened to the engine body. The bolt hole 478 preferably is formed in a casting process of the cylinder head member 68. The bolt hole 478 has a threaded section 480 preferably having a length "a" as shown in FIG. 19. The threaded section 480 extends, at least in part, into the cylinder head member 68 adjacent to the boss 474d. Preferably the entire threaded section extends into the cylinder head member 68 adjacent to the boss 474d. The fuel rail 178 defines a through-hole 482 that aligns with the bolt hole 478.

A bolt 484 extends through the through-hole 482 and the bolt hole 478 and reaches into the cylinder head member 68 adjacent to the boss 474d. The bolt 484 has a threaded section 486 of length "b" as shown in FIG. 19. The threaded section 486 is fully screwed into the threaded section 478 with the head of the bolt 484 holding the fuel rail 178 on to the engine body. The threaded section 486 of the bolt 484 engages the threaded section 480 of the bolt hole 478 for the length "c" as shown in FIG. 19. While length "c" represents an overlap of length "a" and "b", it is understood that length "a" and "b" could in some embodiments be equal, and further, could coincide such that length "c" is equal to length "a", to length "b", or to both lengths "a" and "b".

Preferably, an inner diameter of the bolt hole 478, except for the threaded section 480, is generally equal to an inner diameter of the through-hole 482. Also, the inner diameter of the bolt hole 478 and the inner diameter of the through-hole 482 are preferably larger than an outer diameter of the bolt 484. Accordingly, a space 490 is preferably defined between the inner surfaces of the bolt hole 478 and the through-hole 482 and the outer surface of the bolt 484.

For accurate positioning of the fuel rail 178 onto the cylinder head member 68, a collar (not shown) preferably is inserted into the through-hole 482 of each boss 474a, 474d of the mounting structure 475. It should be noted, however, that a small gap can still remain between the inner surfaces of the bolt hole 478 and the through-hole 482 and the outer surface of the bolt 484 even though the collar is inserted into each space 490 of the mounting structure 475.

Accordingly, in the illustrated fuel rail mounting structure 475, the bolt hole 478 reaches into the cylinder head member 68 adjacent to the boss 474d. The threaded section 486 of the bolt 484, at least in part, engages the threaded section 480 formed in cylinder head member 68 adjacent to the boss 474d. Thus, each mounting structure 475 is rigid enough to endure the stress.

In addition, the gap can still remain in the bolt hole 478, except for the engaged portion of the bolts with the threaded sections 486, 480, even though the collar is inserted into the space 482. Each boss 474a, 474d is not likely to be affected by thermal expansion of the corresponding bolt 484 because the bolt 484 generally does not contact a portion of the bolt hole 478 extending in the boss 474a, 474d and the bolt 484 is allowed to expand and contract without restraint. Accordingly, the bosses 474a, 474d are subject to less stress.

Figure 20:
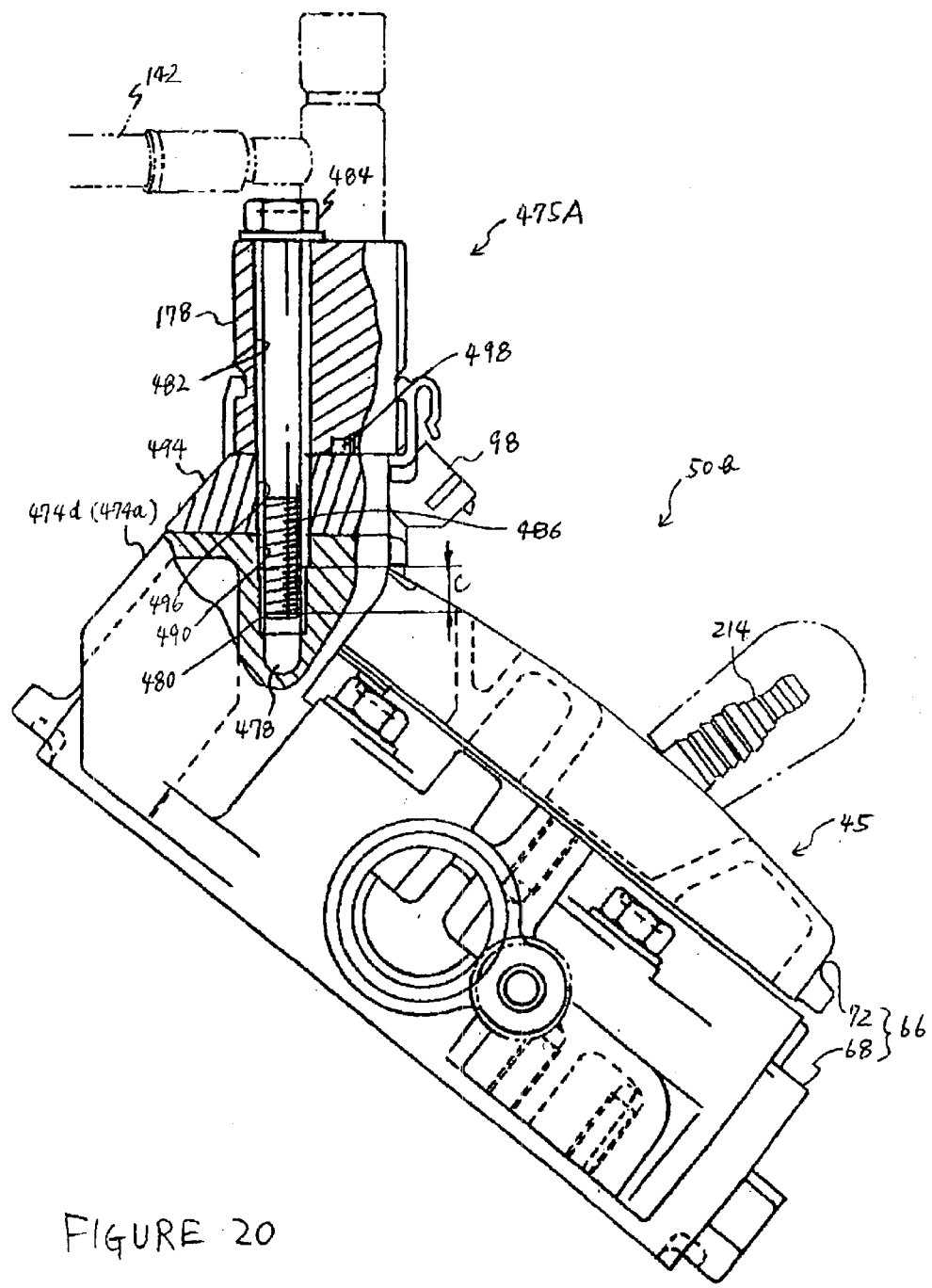
FIG. 20 is a top plan view of a cylinder head assembly of the engine FIG. 16 with the fuel rail on the port side, illustrating a modified fuel rail mounting structure configured in accordance with another embodiment of the present invention.

FIG. 20 illustrates a modified fuel rail mounting structure 475A. In this modified structure, the end bosses 474a, 474d are formed separately from the cylinder head member 68. The same members that been have already described will be assigned the same reference numerals and will not be described again unless the members need more specific descriptions.

In the illustrated modified arrangement of FIG. 20, a spacer 494 replaces at least the major portion of each boss 474a, 474d. The spacer 494 defines a through-hole 496 aligning with the bolt hole 478, which now is shorter than the bolt hole 478 of FIG. 19, and with the through-hole 482. The threaded section 480 is formed in the cylinder head member 68 adjacent to the boss 474a, 474d. A threaded section 486 of a bolt 484 is engaged with the threaded section 480 within cylinder head member 68 adjacent to the boss 474a, 474d.

The spacer 494 can pivot relative to the cylinder head 68 or the fuel rail 178 because the bolt 484 merely pass through the through-hole 496 of the spacer 494. A positioning pin 498 preferably extends from an outer surface of the spacer 494 toward an outer surface of the fuel rail 178. A notch corresponding to the pin 498 is defined at the outer surface of the fuel rail 178. Thus, the spacer 494 is positioned relative to the fuel rail 178 and is fixed relative thereto when the notch receives the pin 498.

In a further variation, the combination of the pin and the notch can be formed at the outer surfaces of the spacer 494 and the cylinder head member 68, respectively. The notch can be made at the spacer and the pin can extend from either the fuel rail 178 or the cylinder head member 68. A projection uniformly made either at the fuel rail 178, the cylinder head member 68 or the spacer 494 also can replace the pin 498. In the event of a large stress produced at the boss 474d (474a), the stress can be relieved by a slight movement of the spacer 494 and will not affect the boss 474d (474a).

The spacer 494 can be made of a metal material such as, for example, aluminum alloy that is typically used for a material of the cylinder head member 68. Alternatively, the spacer 494 can be made of a plastic material that can inhibit the heat of the cylinder head member 68 from transferring to the fuel rail 178. Accordingly, the fuel passing though the fuel rail 178 would be generally insulated from the heat of the cylinder head member 68.

With reference to FIG. 21, the fuel rail mounting structure 476 is generally similar to the fuel rail mounting structure 475 (FIG. 19), except for the strength thereof. The same members that have already been described will be assigned the same reference numerals and will not be described again unless the members need more specific descriptions.

In this mounting structure 476, the bolt hole 478 does not need to reach into the cylinder head member 68 adjacent to the boss 474c to the same degree described above in connection with the end bosses. The threaded section 486 of the bolt 484 does not engage a threaded section in cylinder head member 68 adjacent to the boss 474c, but rather engages the threaded section 480 in the boss 474c. Additionally, the boss 474c can be thinner than the boss 474d of FIG. 19. In the illustrated structure 476, the thinner boss preferably is made by forming a recess 504 at an outer surface of the boss 474c facing the cylinder head cover member 72. No collar is provided at each boss 474b, 474c of the mounting structure 476 because the collars at the end bosses 474a, 474d in this arrangement provide for the accurate positioning of the fuel rail 178. Thus, the structure 476 is simpler than the structure 475 of FIG. 19 and can contribute to reduce the manufacturing costs of the engine 430.

In addition, the space 482 occurs in the bolt hole 478, except for the portions of the bolt engaged with the corresponding threaded section 486, 480. The bosses 474b, 474c, therefore, are not placed under high stress from the bolt 484 because the bolt 484 generally does not contact a portion of the bolt hole 478 extending in the boss 474d and the bolt 484 is allowed to sufficiently expand or contract.

Figure 22:
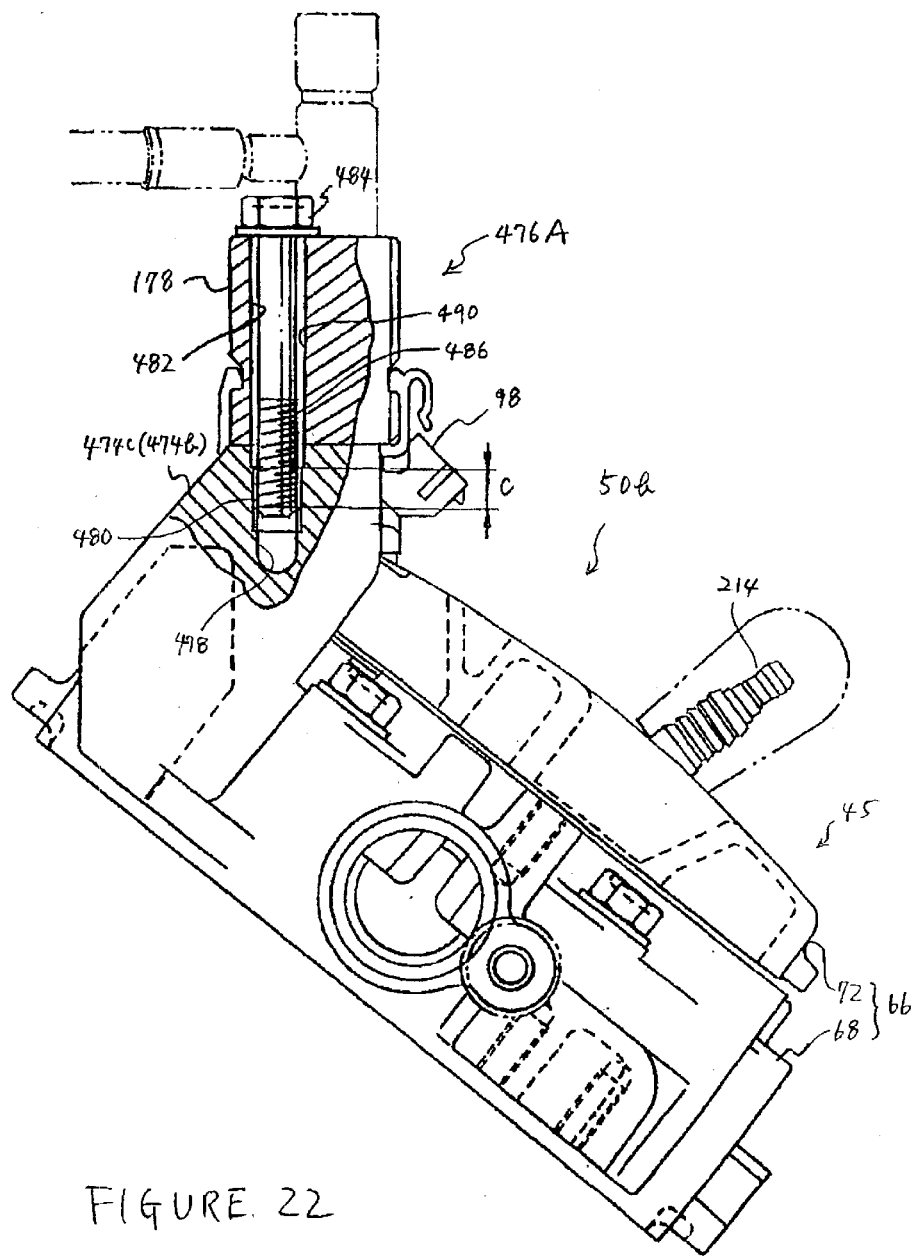
FIG. 22 is a top plan view of a cylinder head assembly of the engine of FIG. 16 with the fuel rail on the port side, illustrating another fuel rail mounting structure for use in combination with other mounting structures in an embodiment of the invention.
Figure 1:
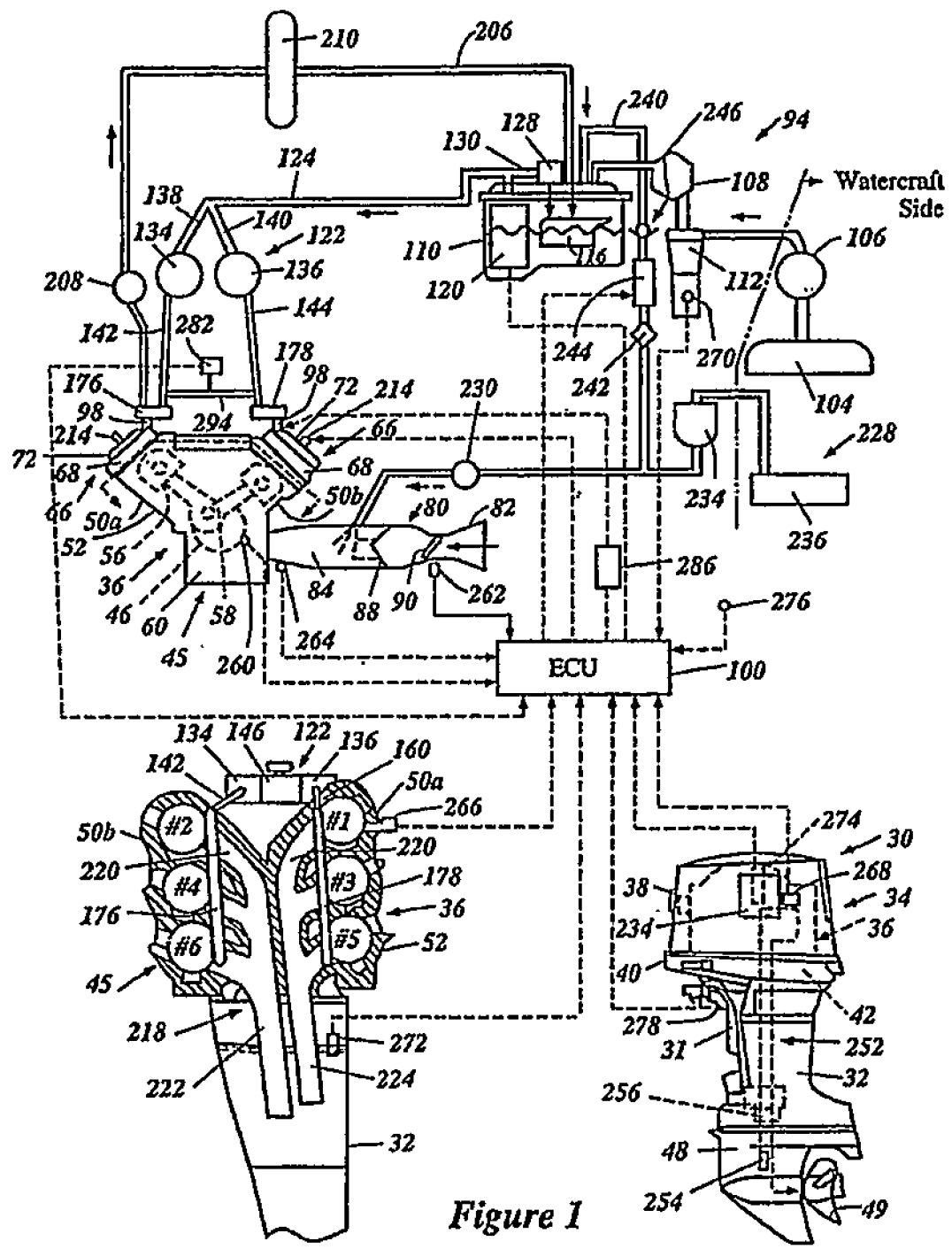
Figure 2:
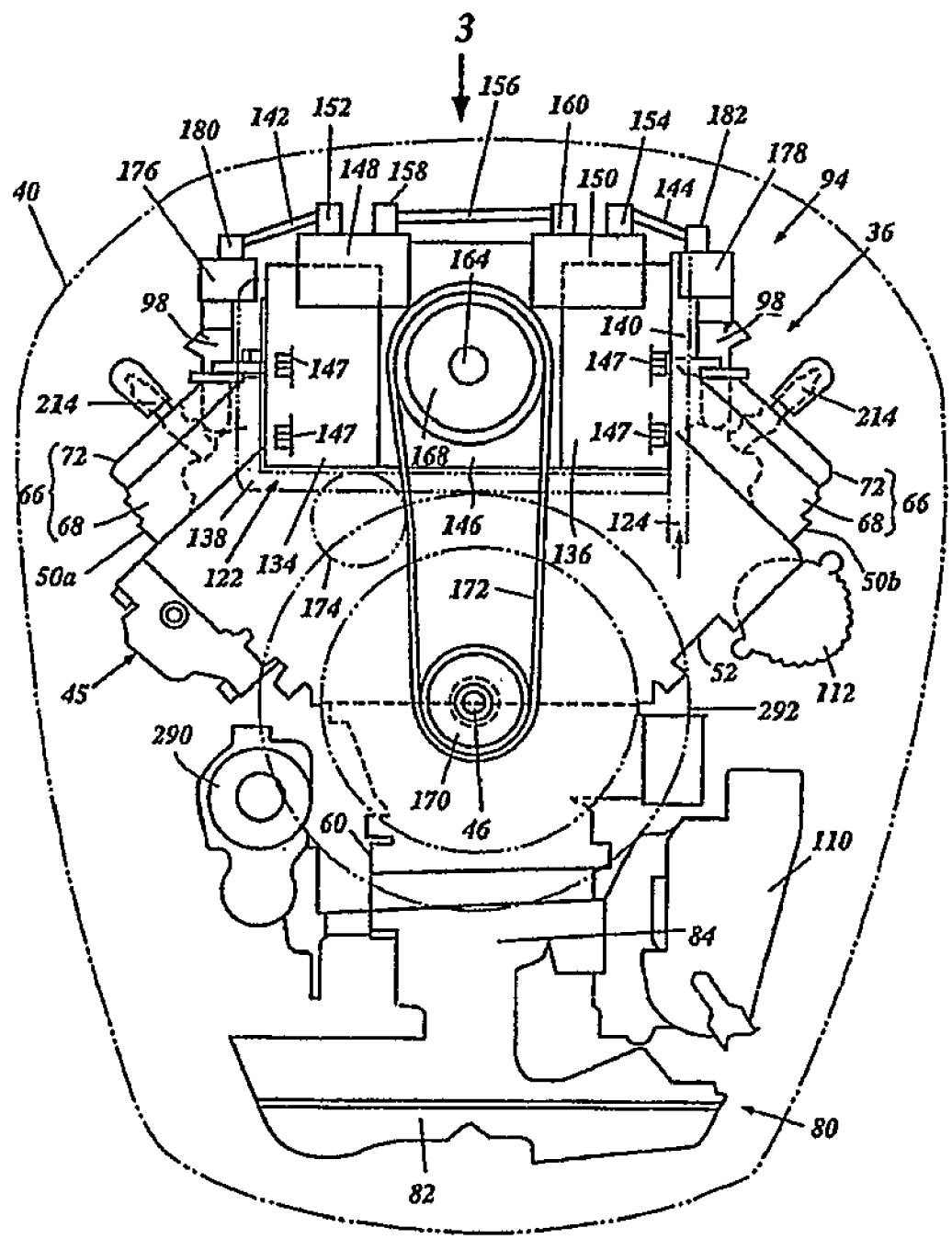
Figure 3:
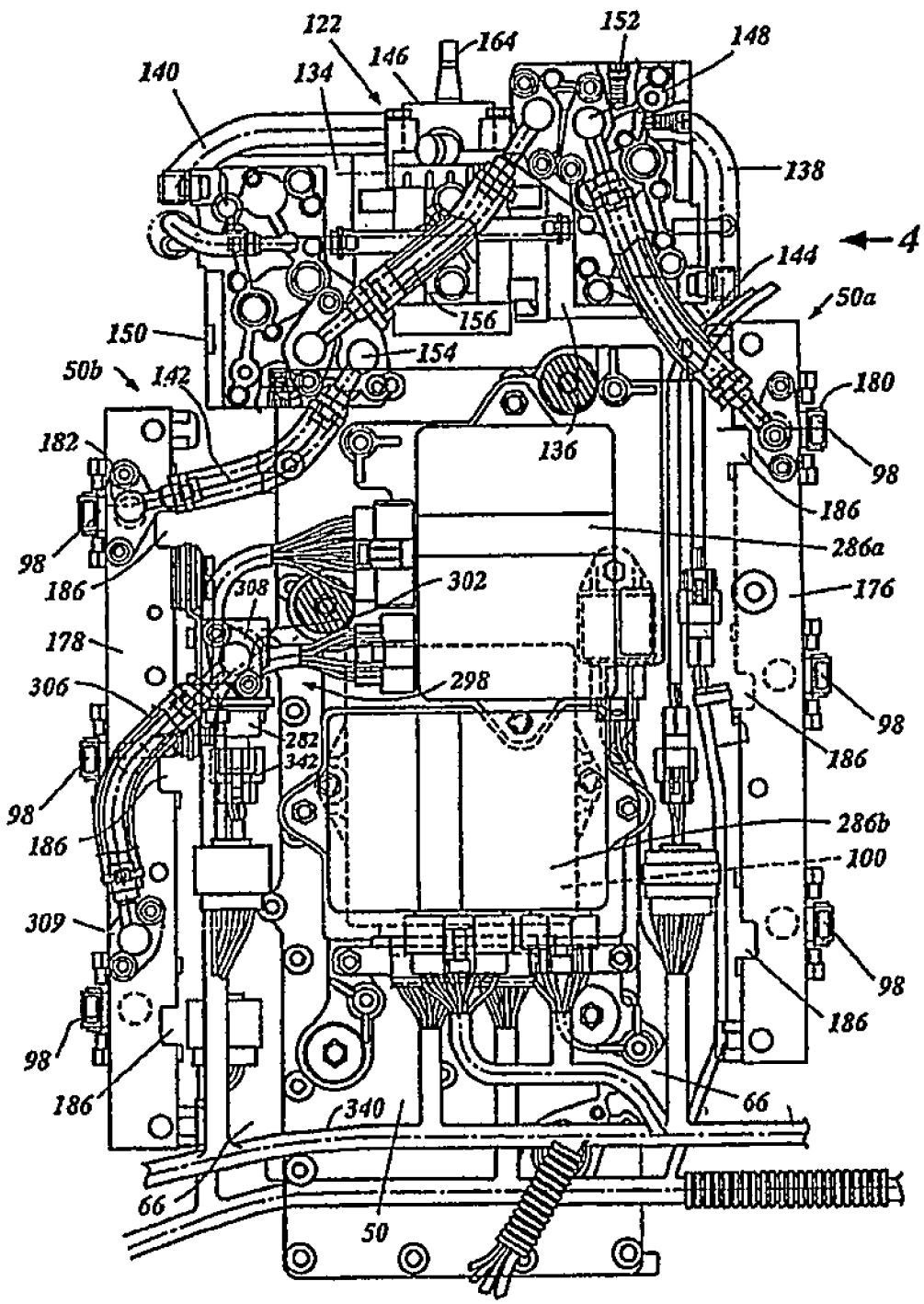
Figure 4:
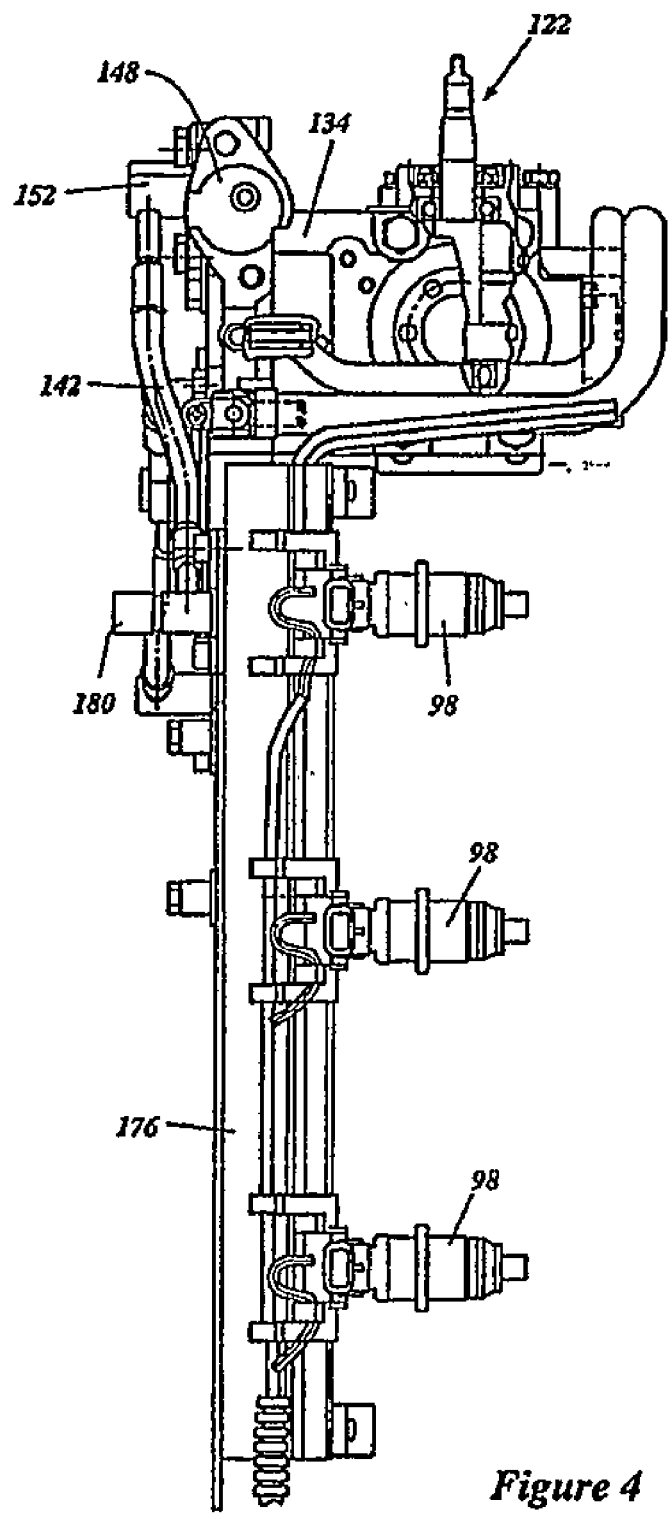
Figure 5:
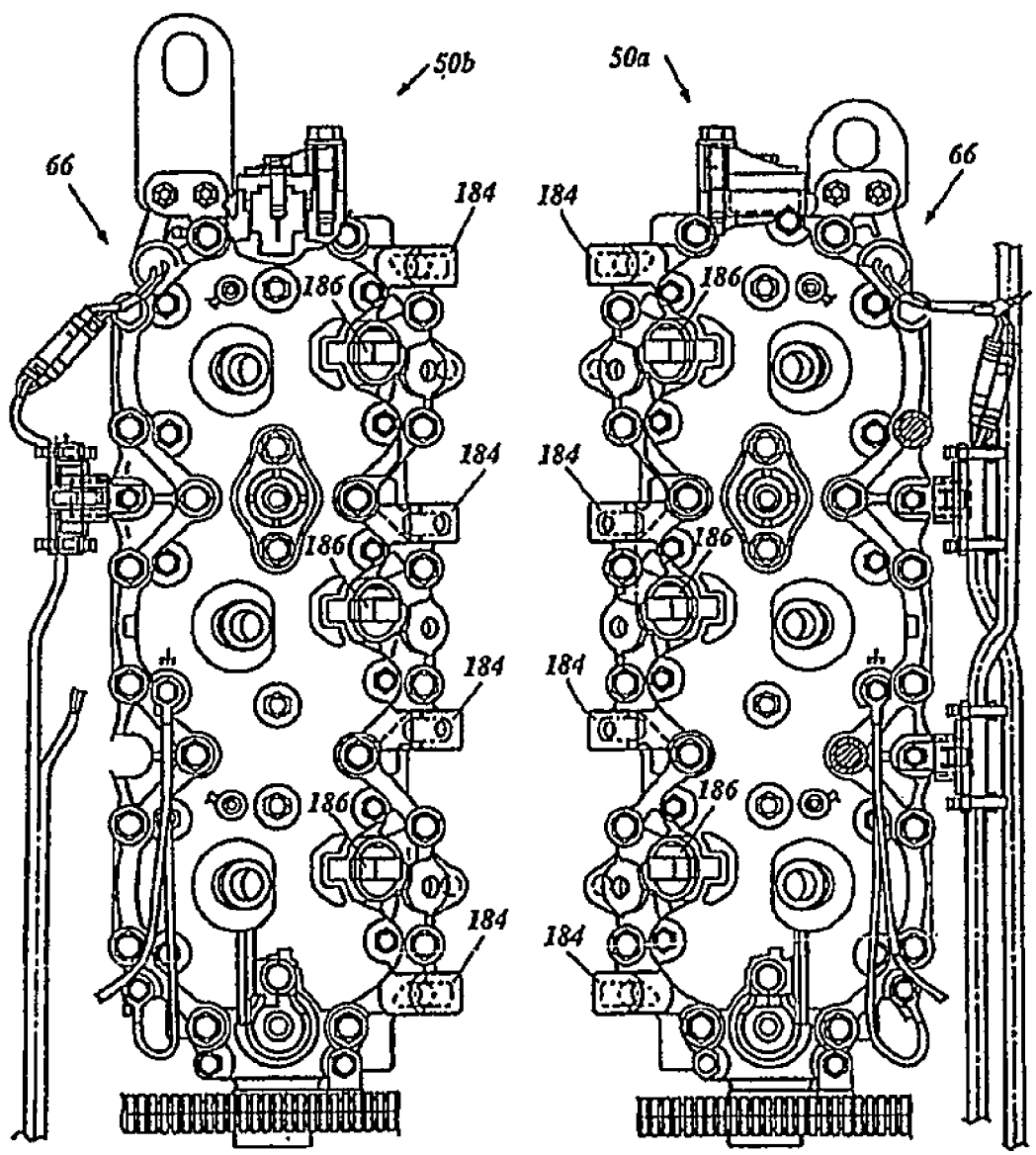
Figure 6:
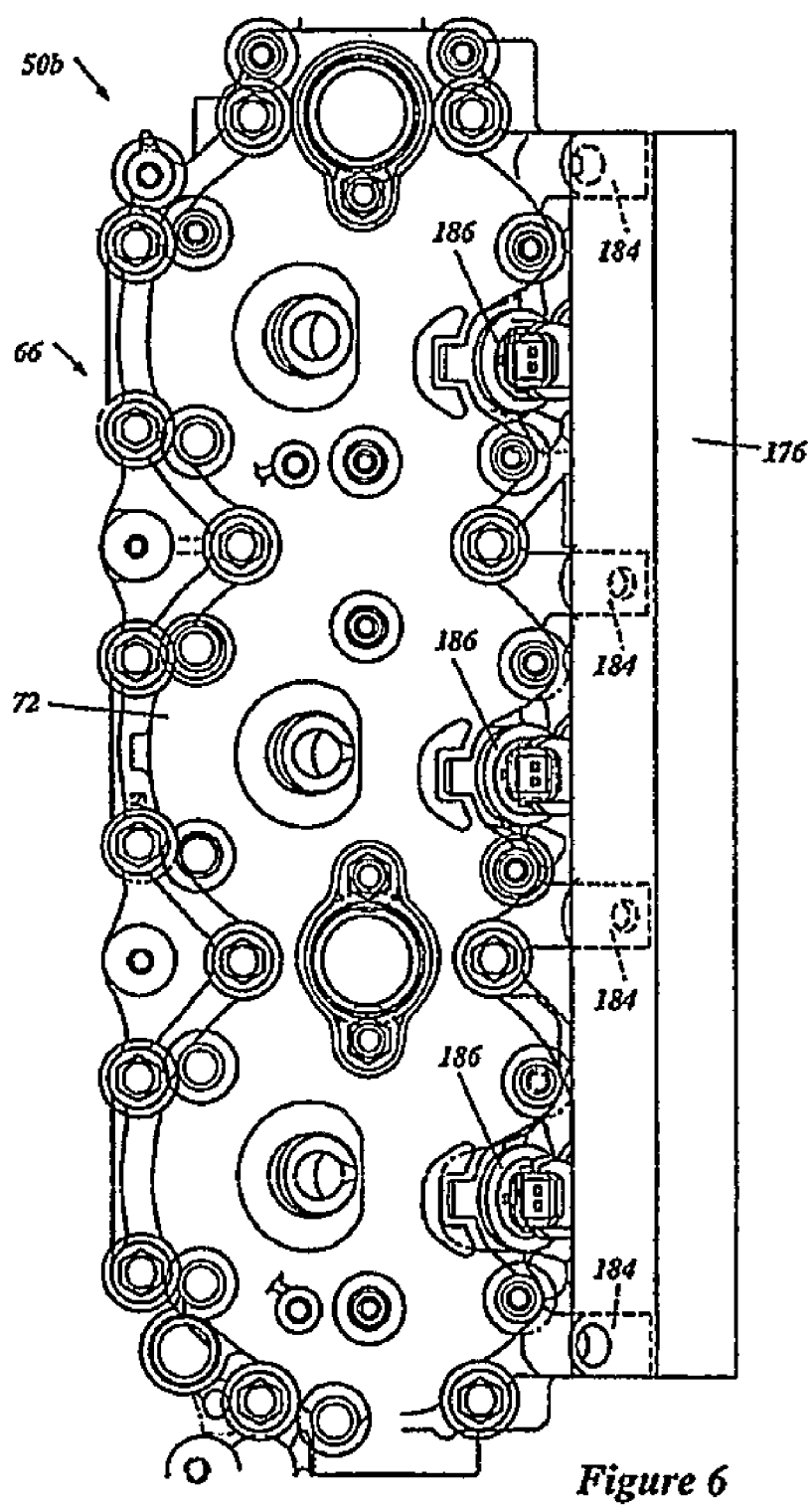
Figure 7:
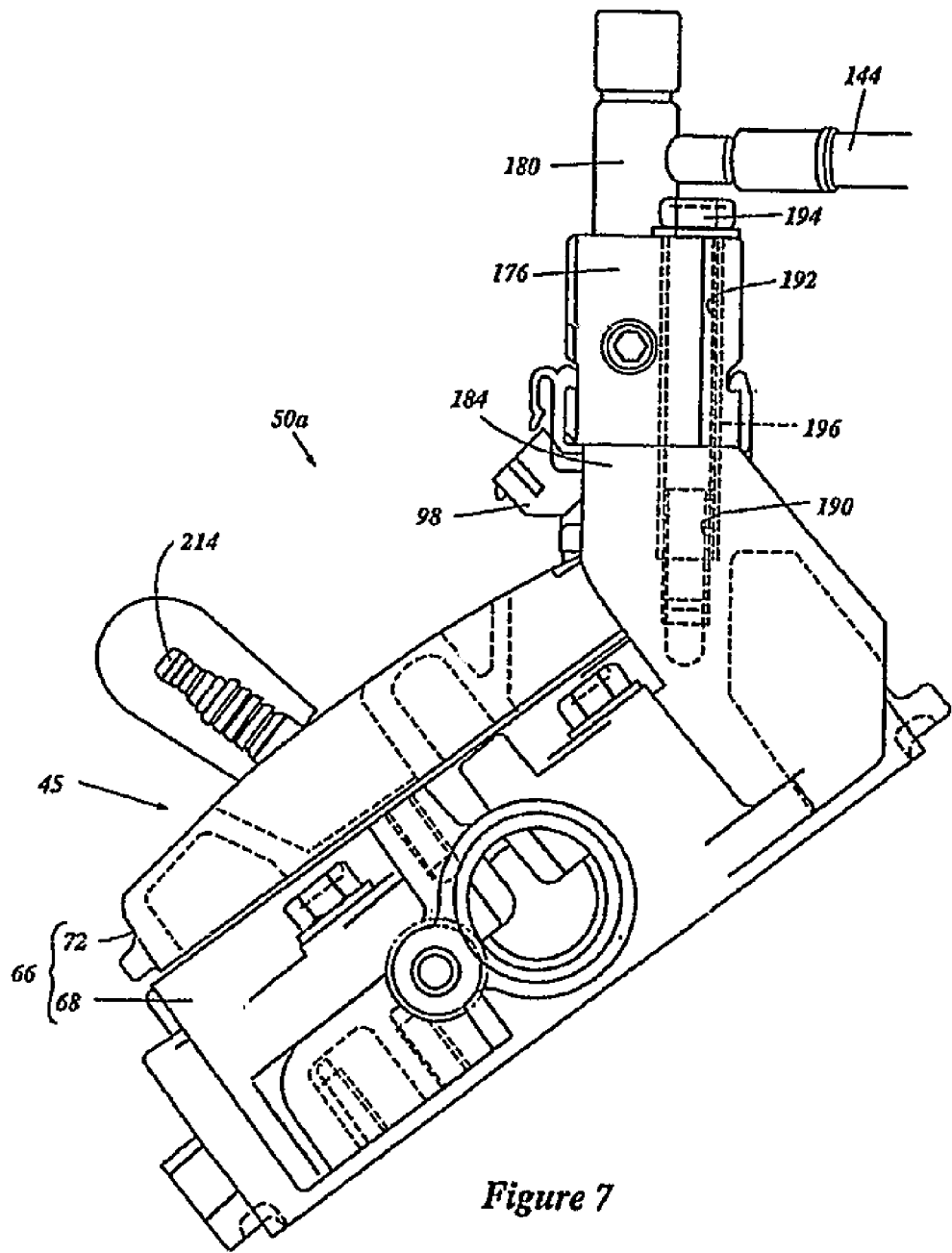
Figure 8:
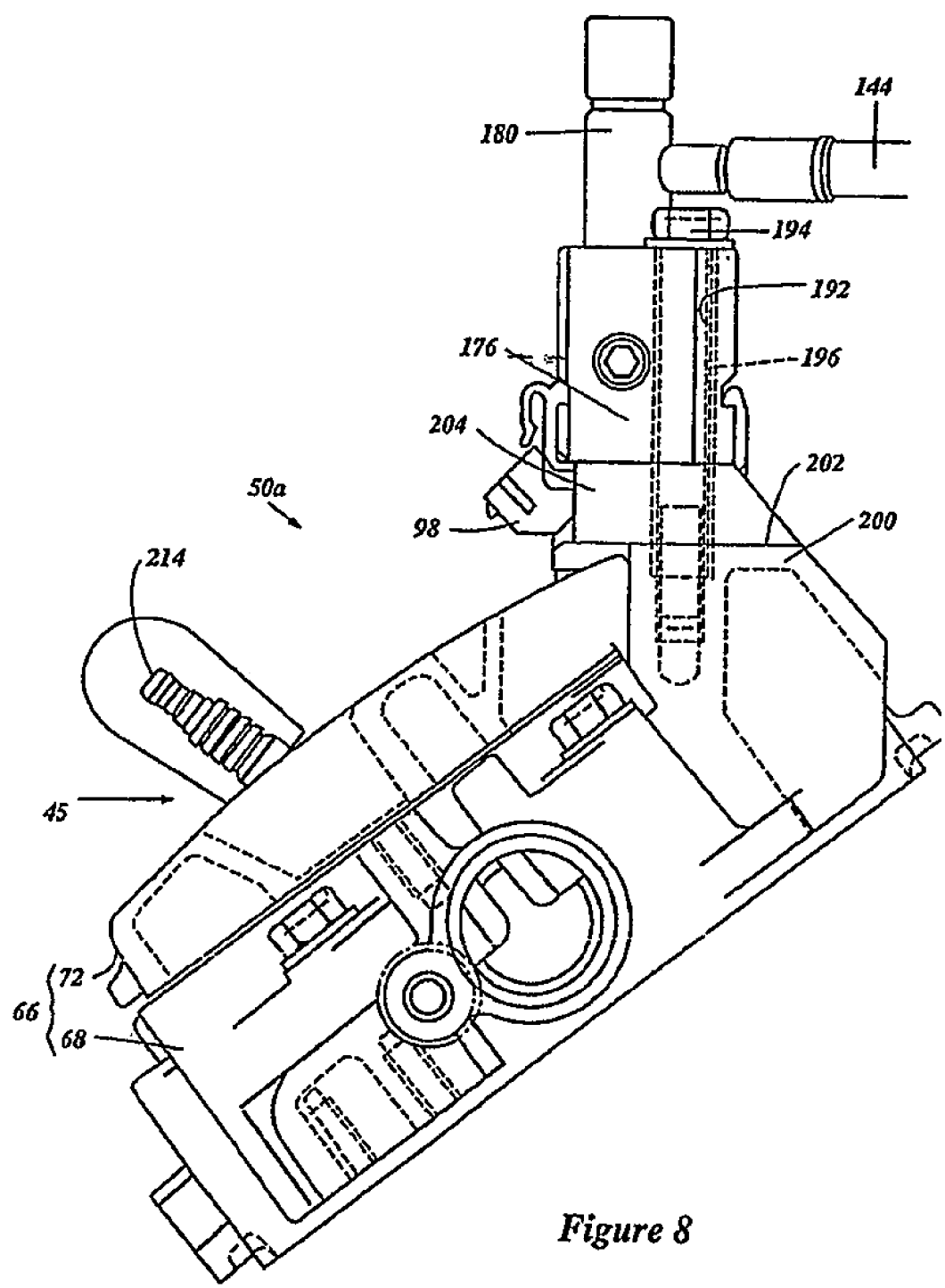
Figure 9:
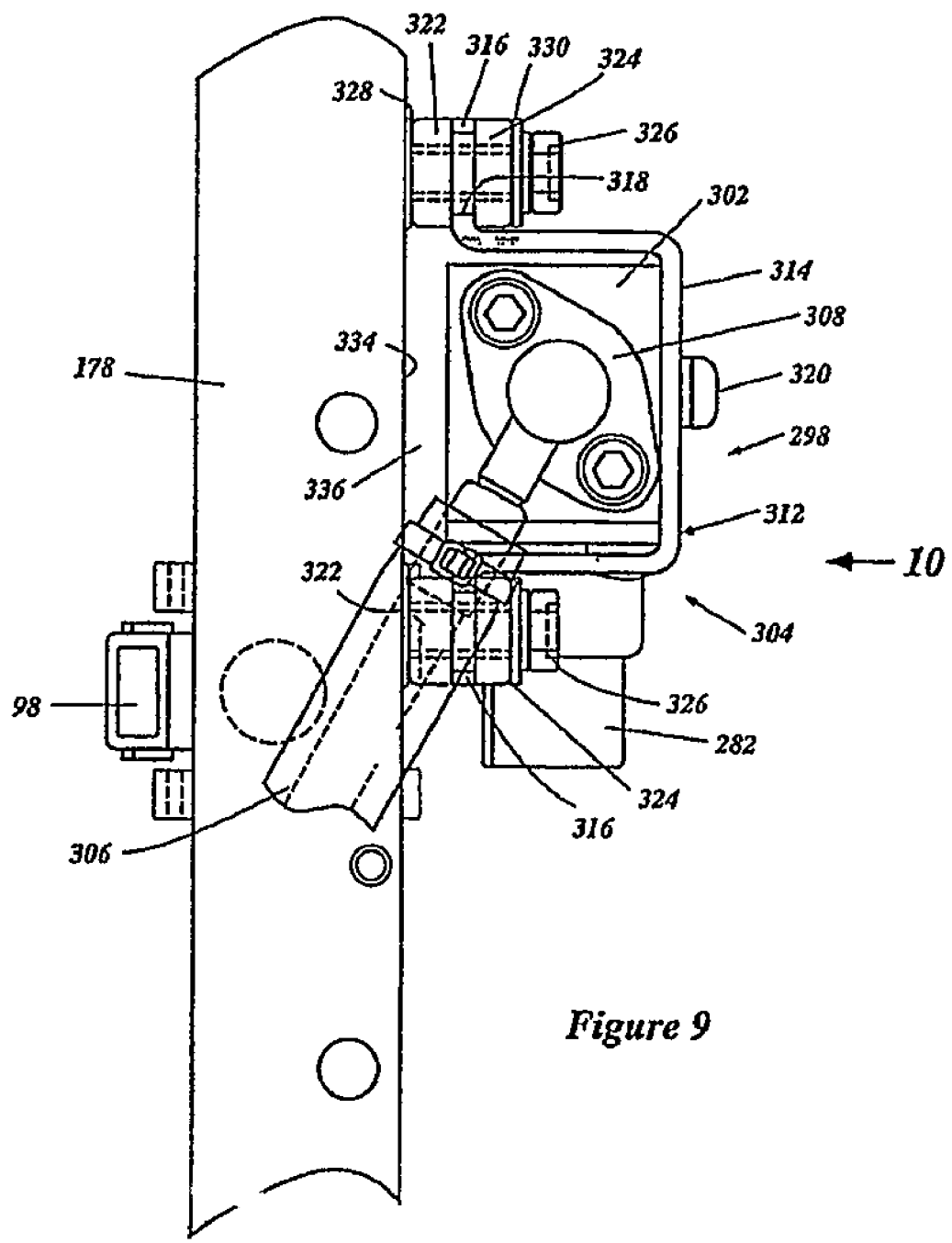
Figure 10:
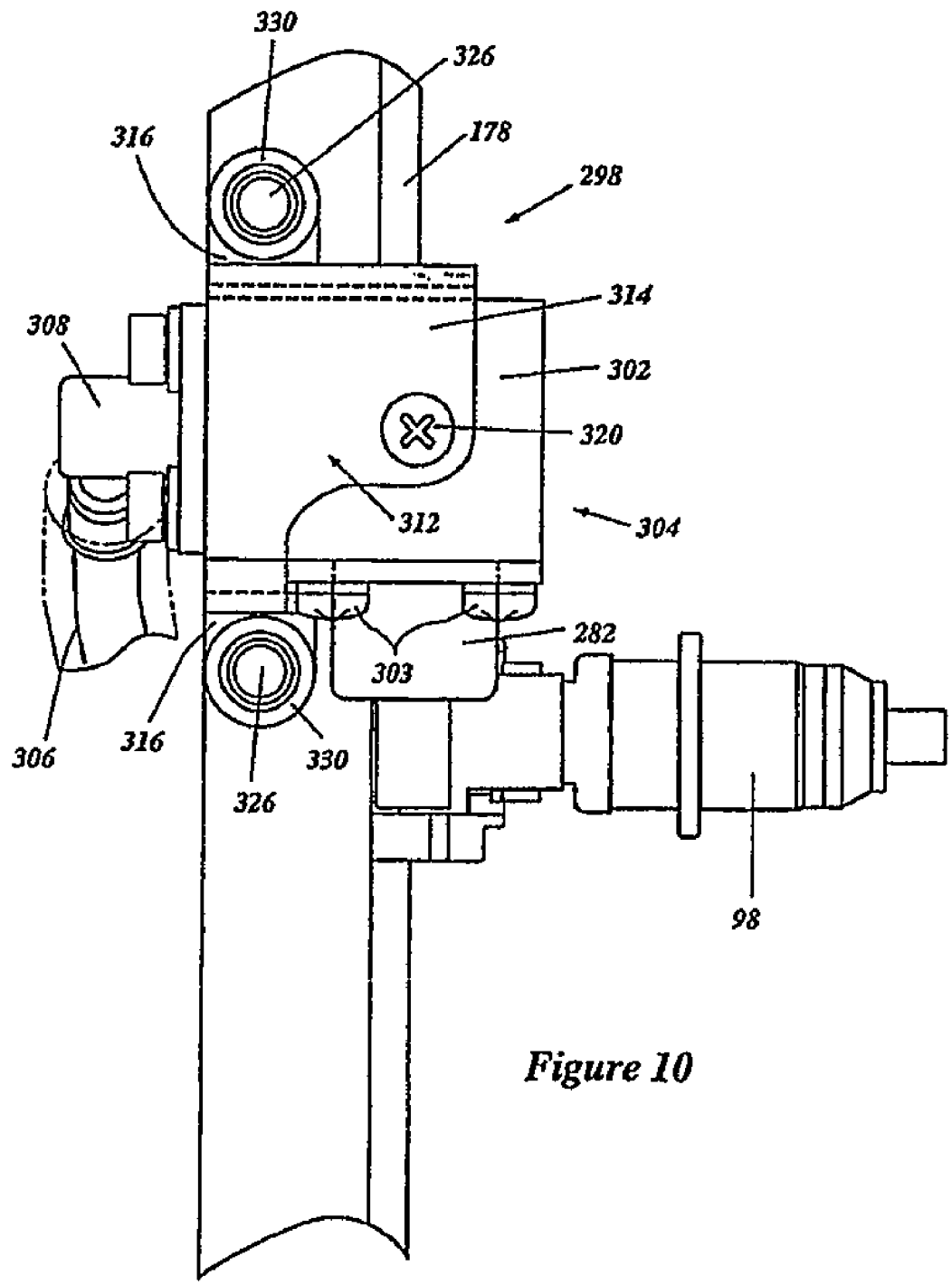
Figure 11:
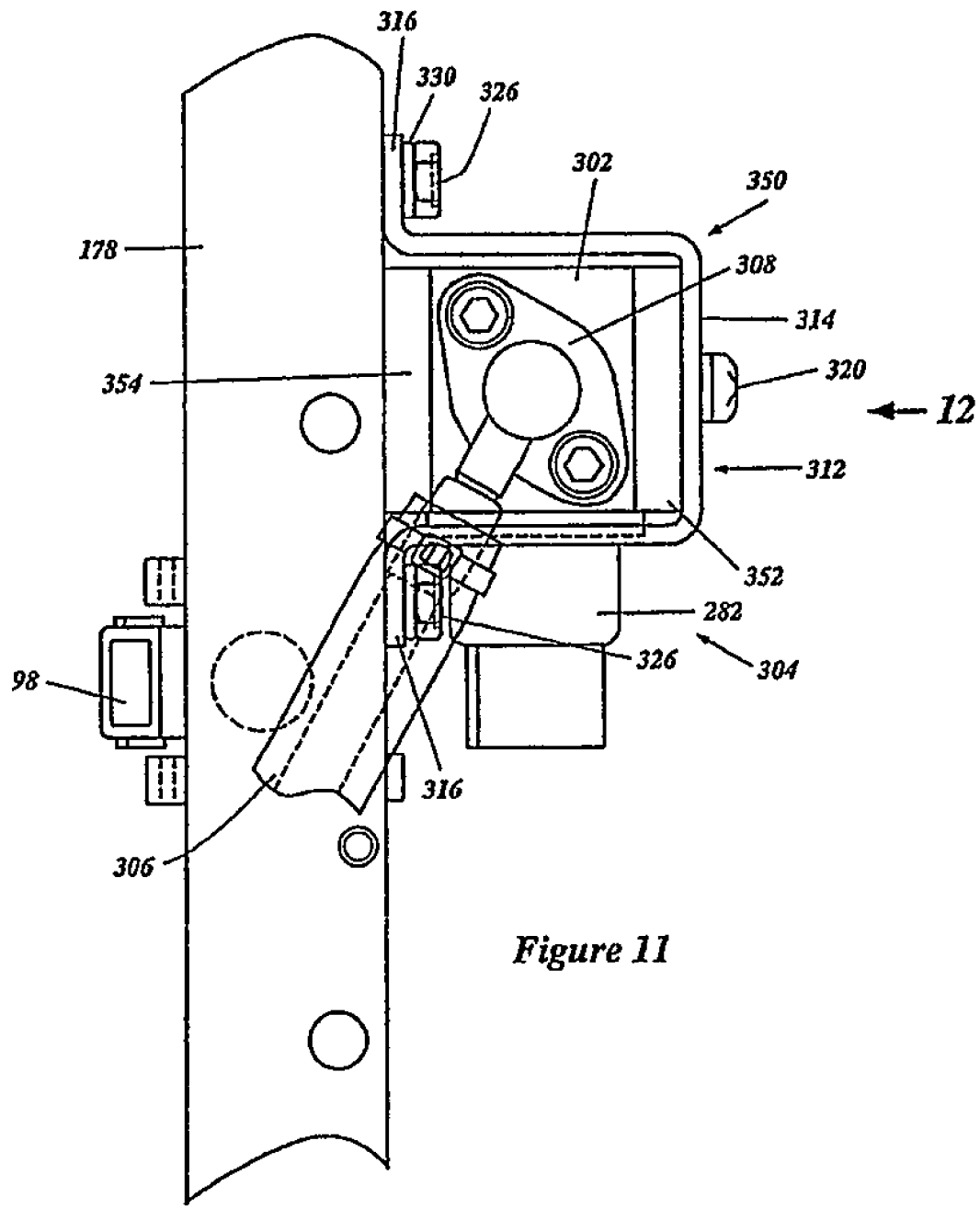
Figure 12:
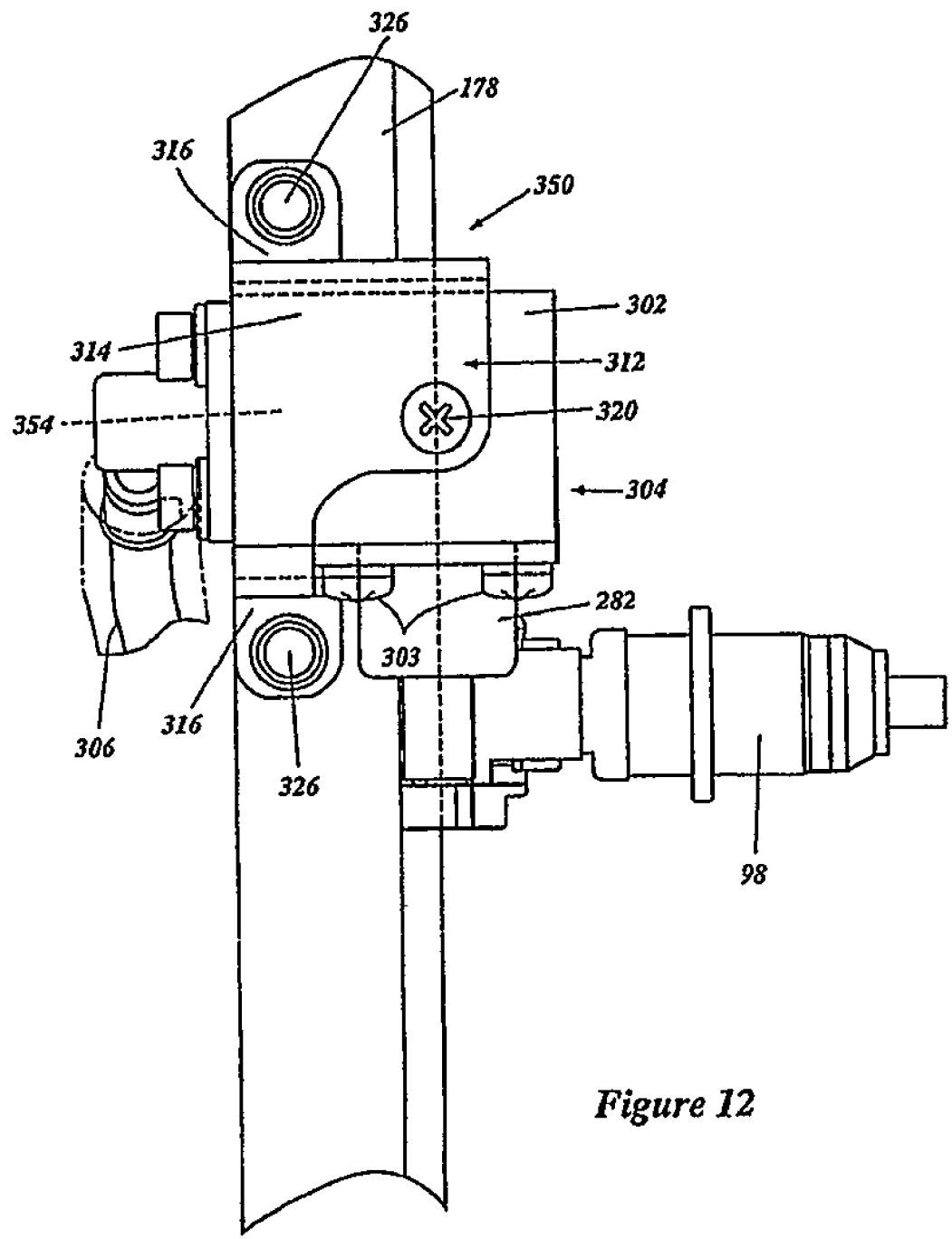
Figure 13:
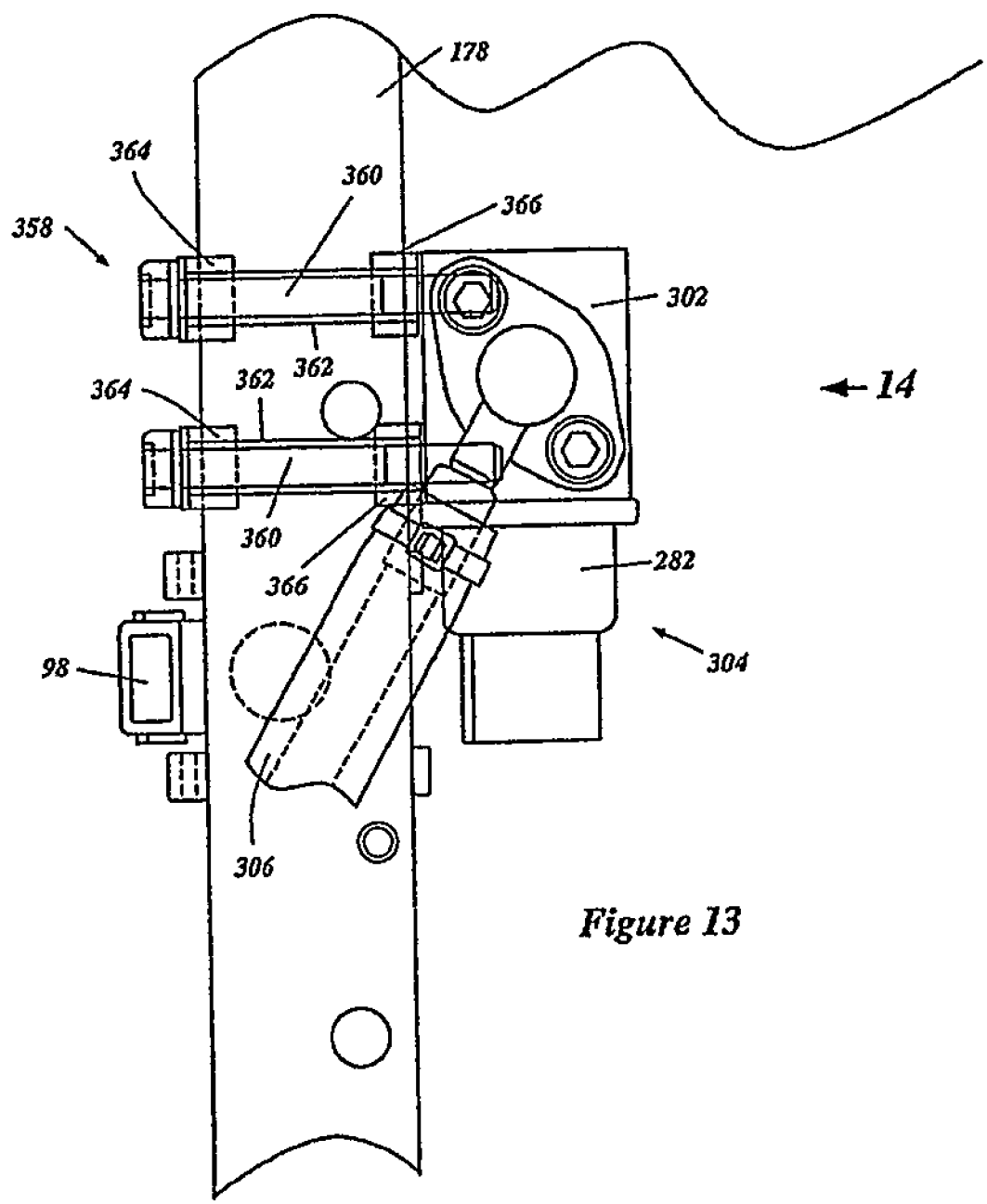
Figure 14:
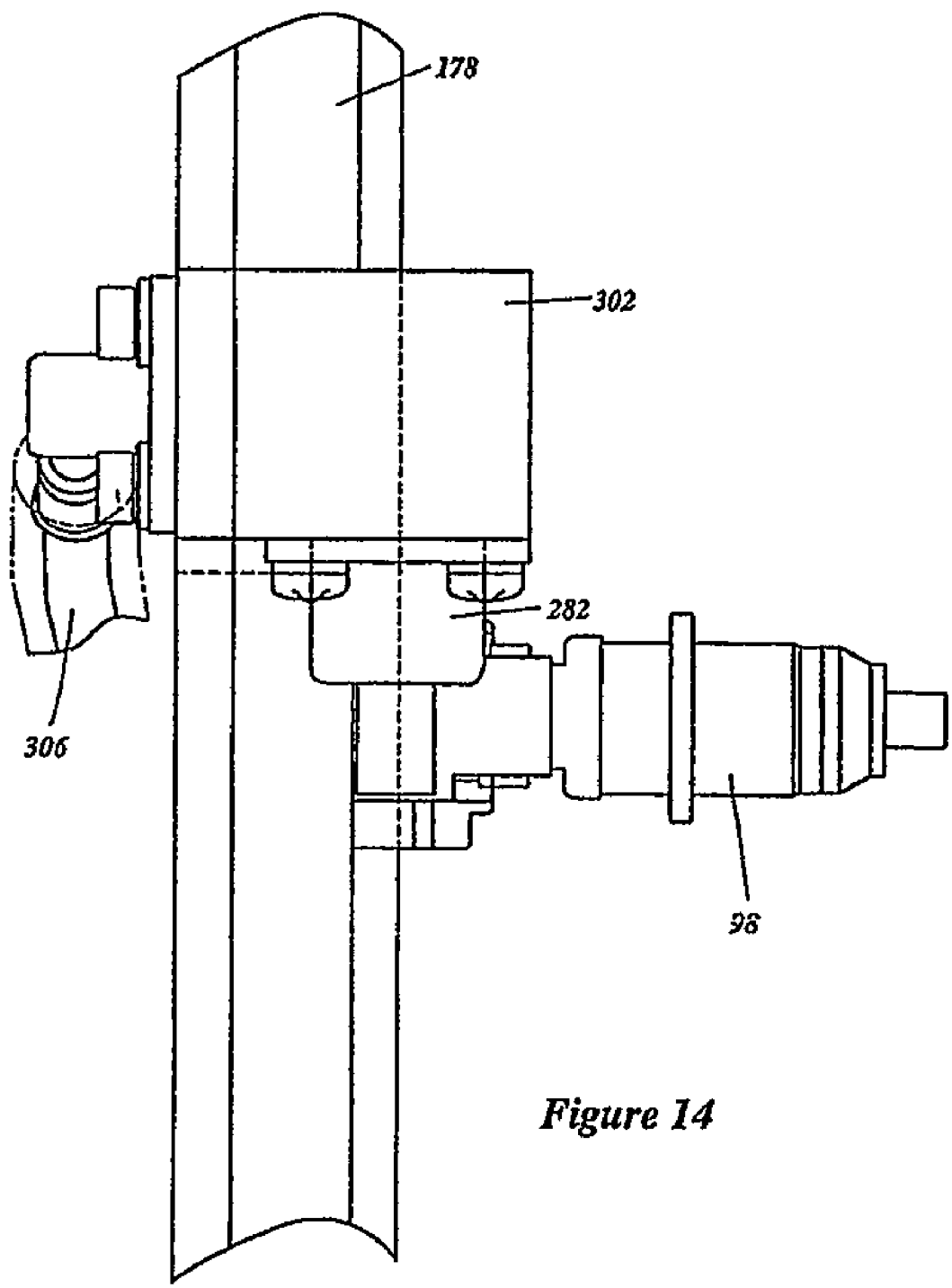
Figure 15:
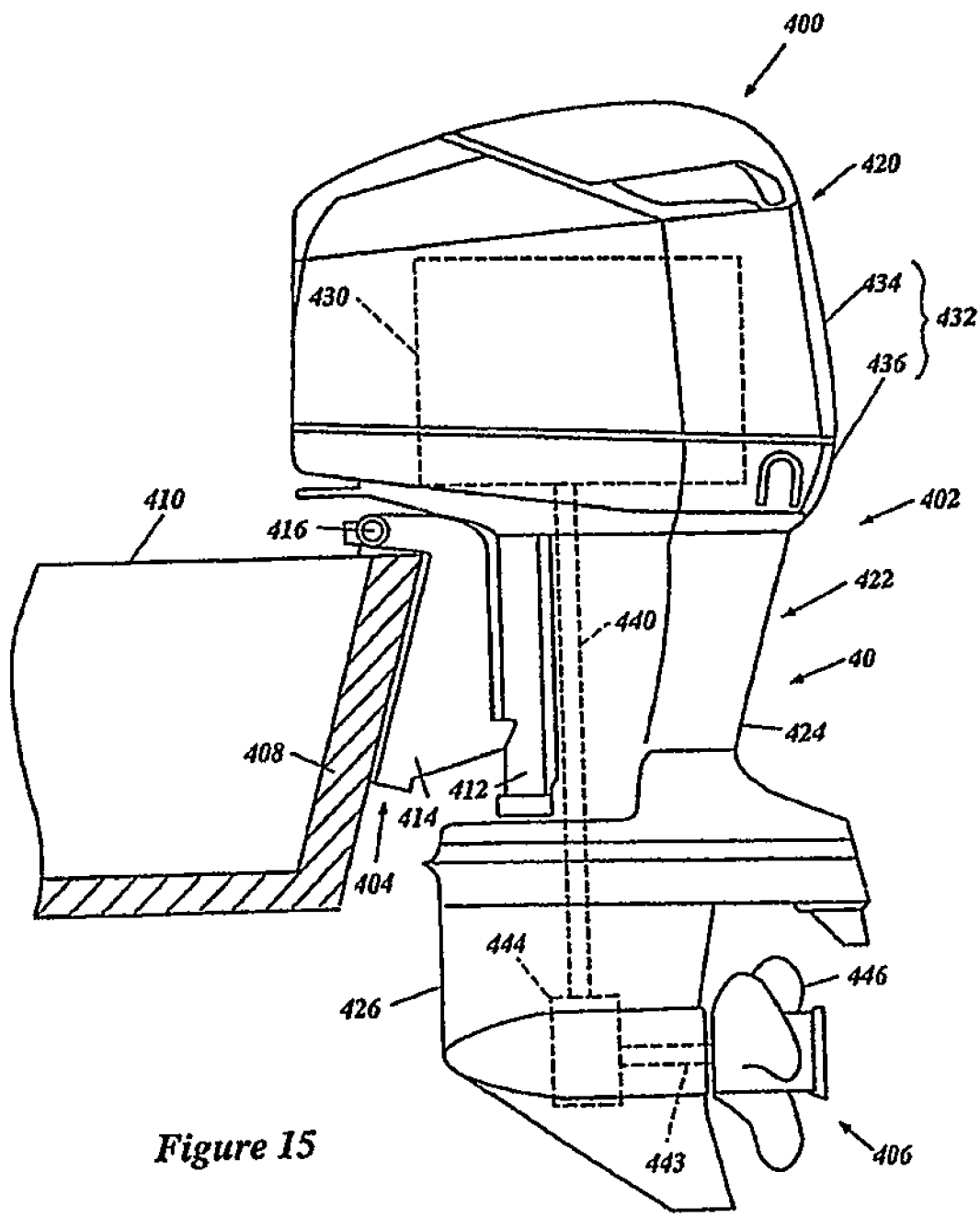
Figure 16:
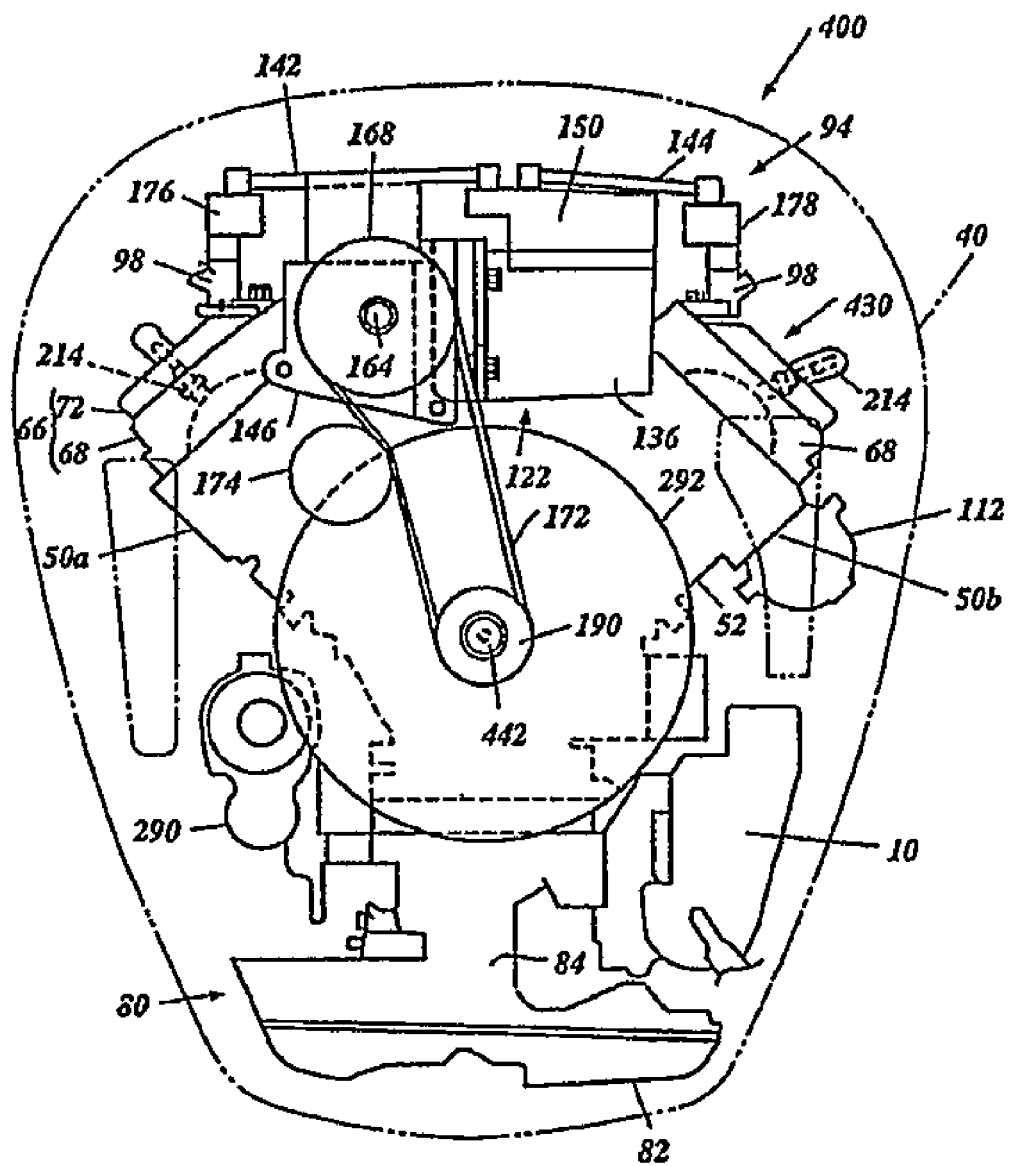
Figure 17:
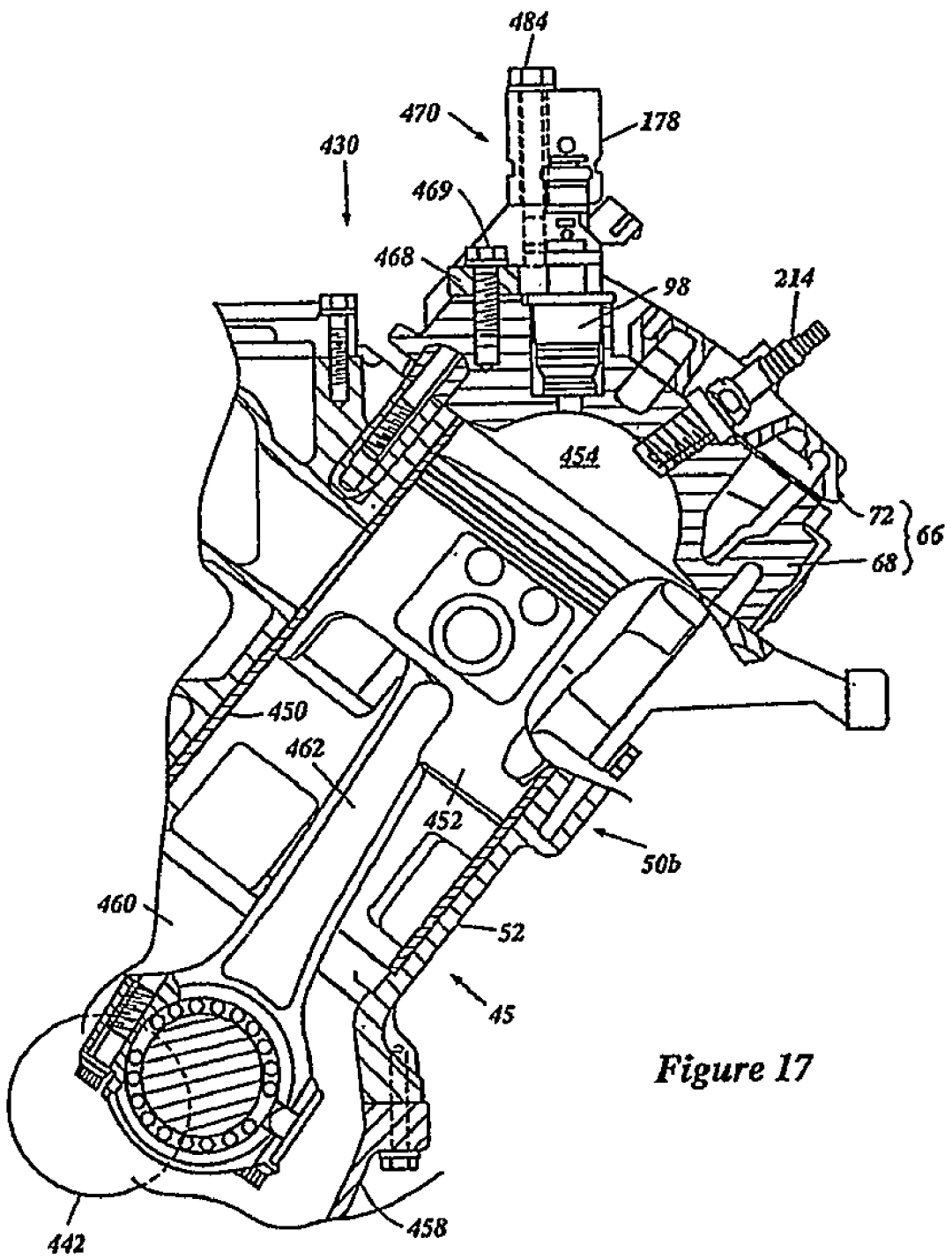
Figure 18:
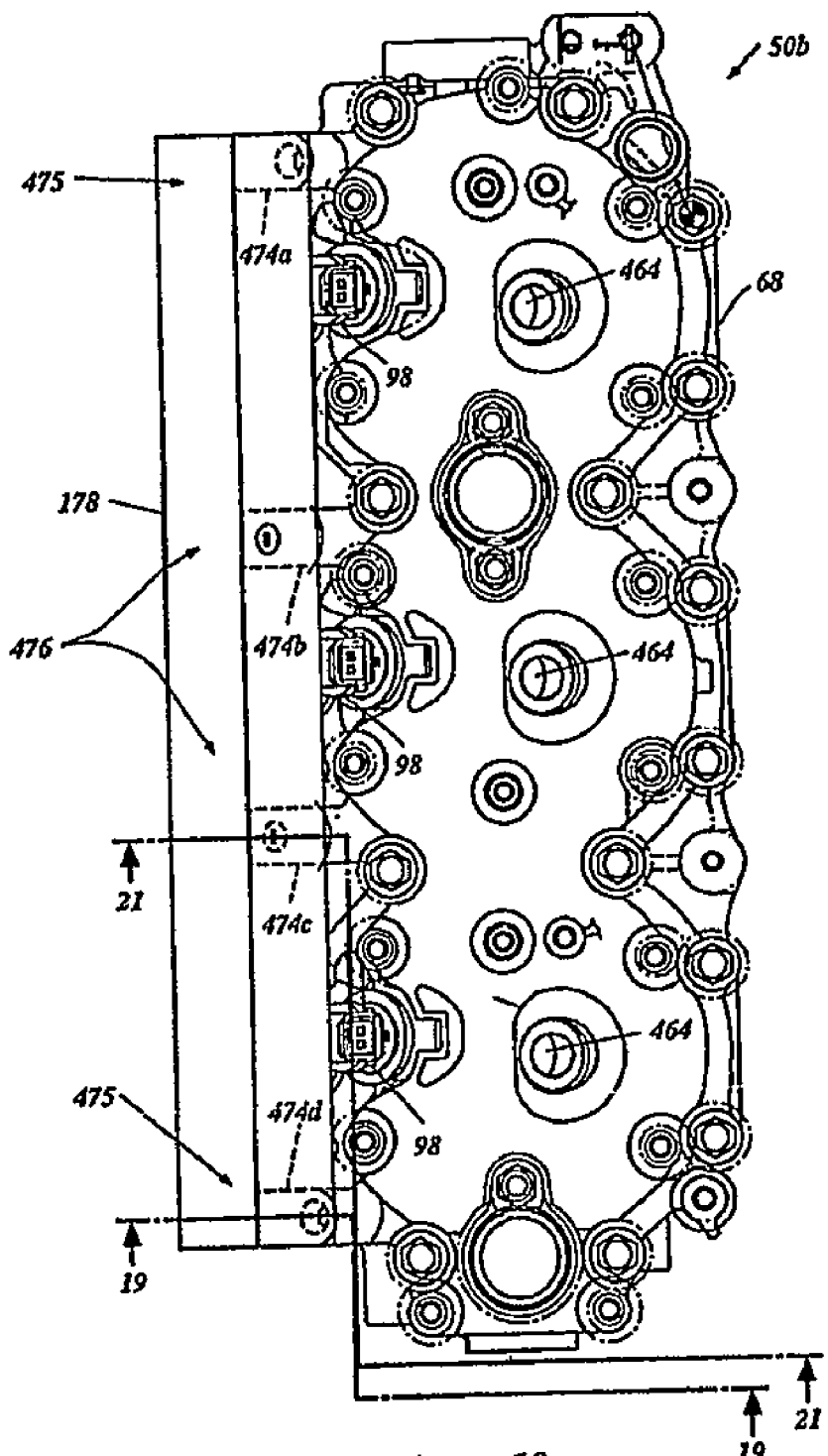
Figure 19:
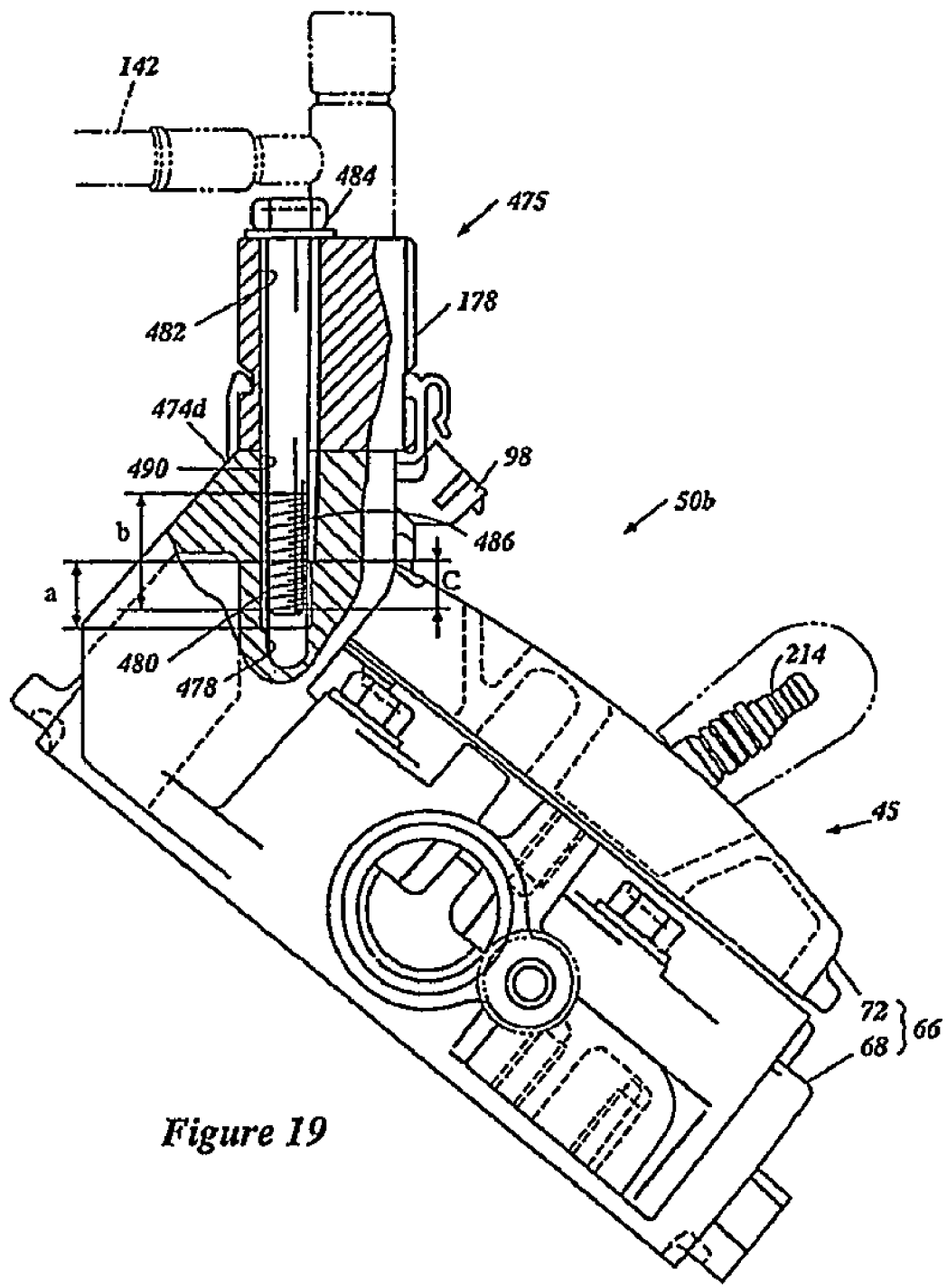
Figure 20:
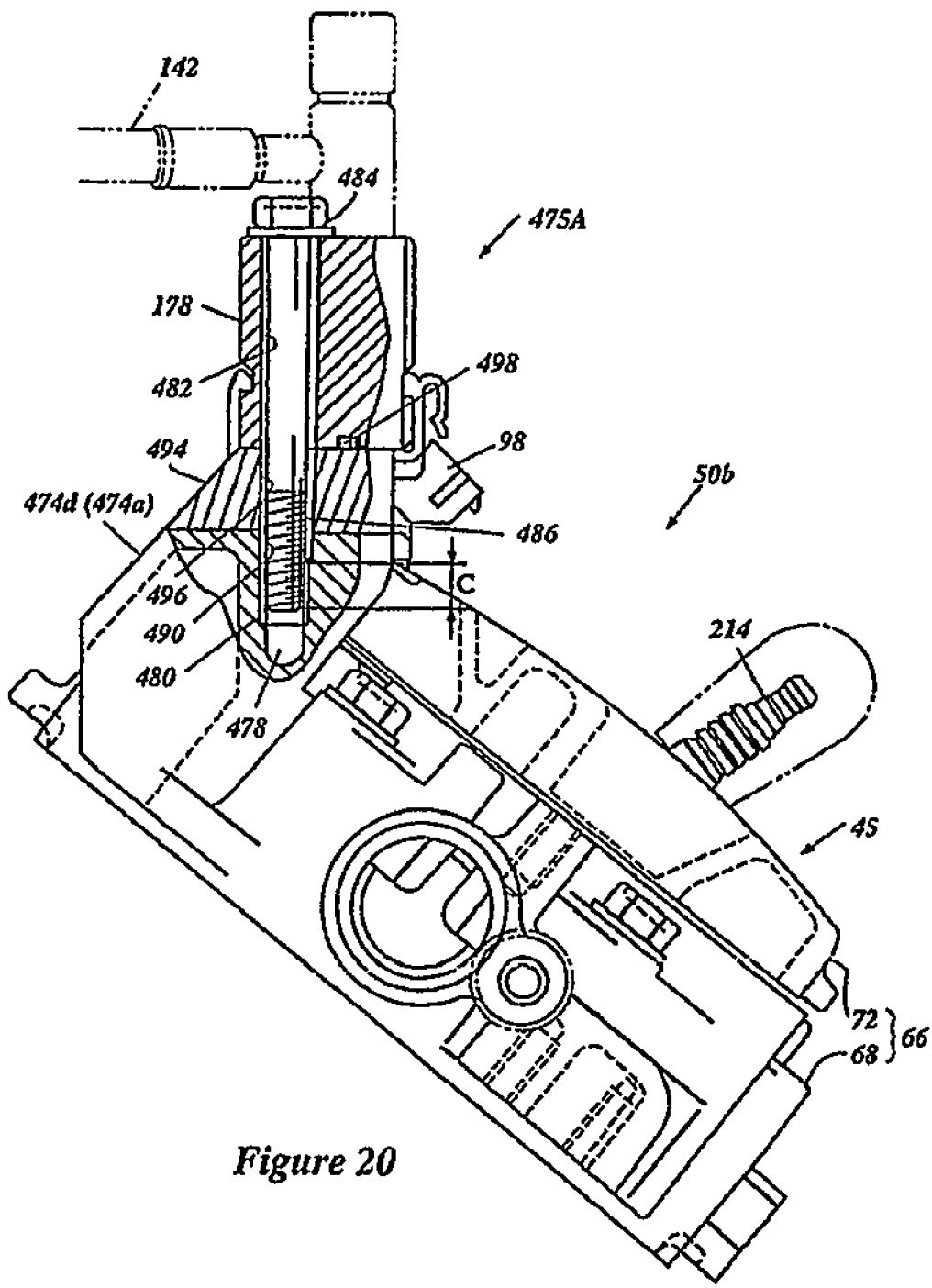
Figure 21:
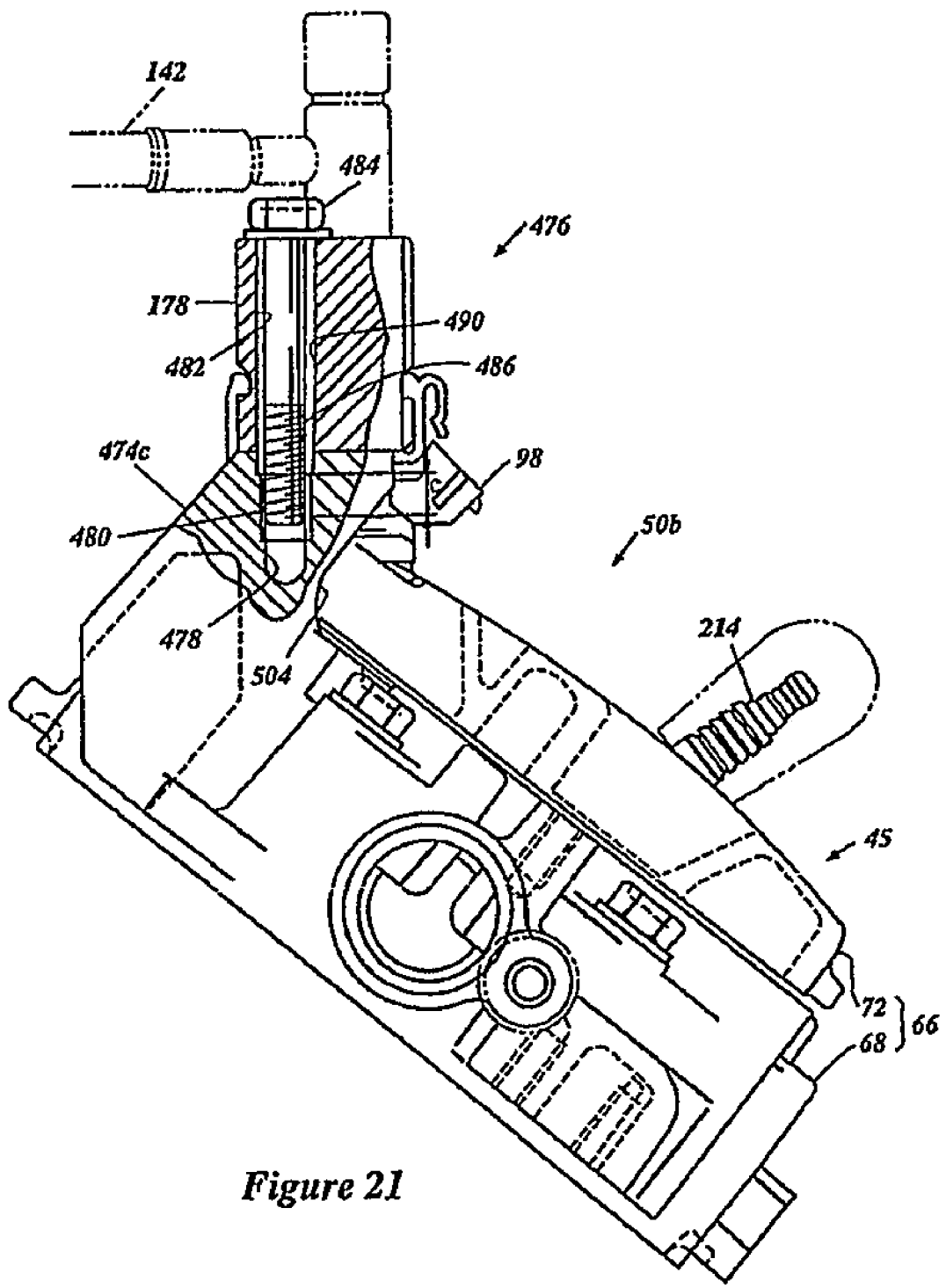
Figure 22:
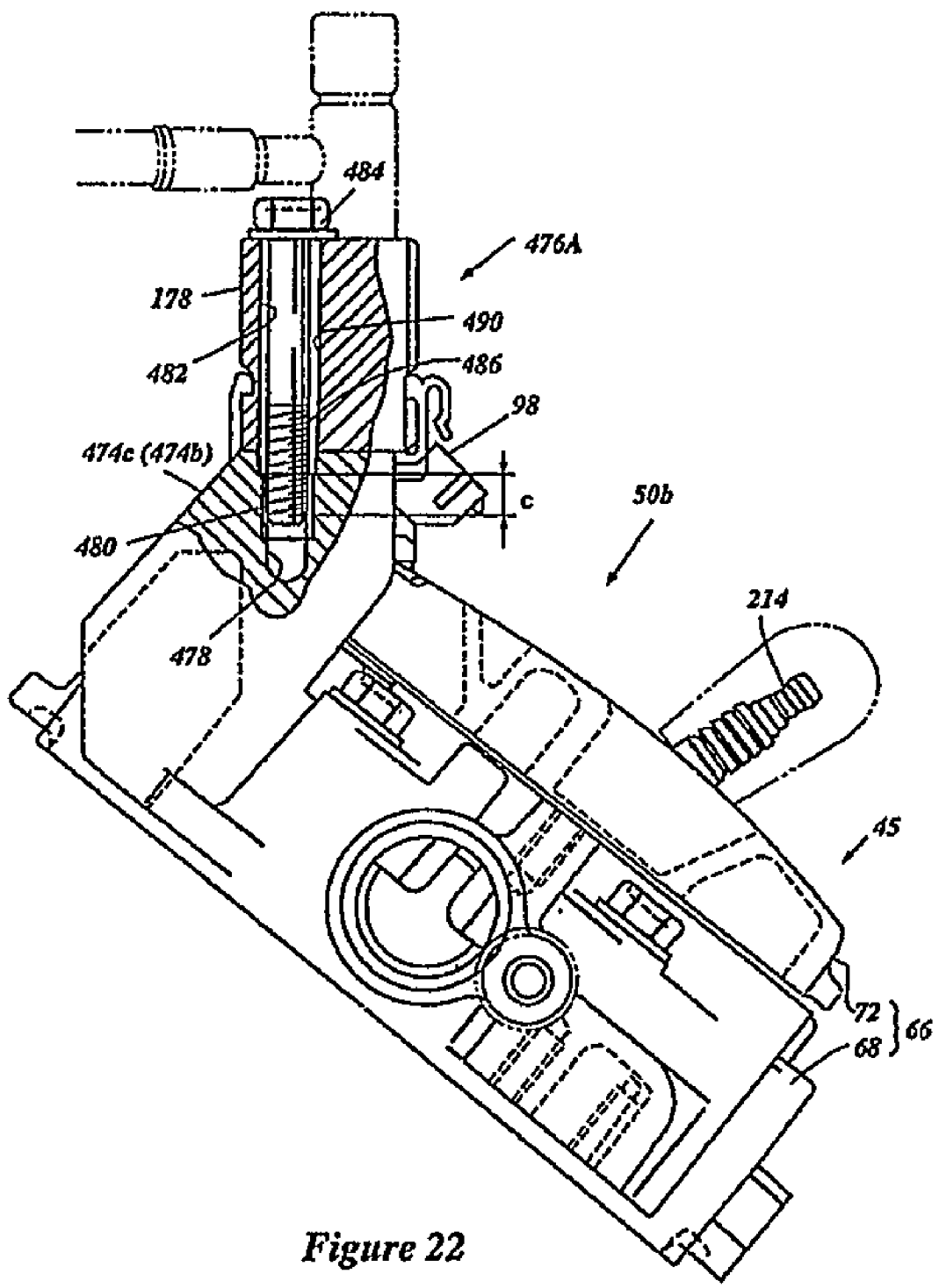

In an additional variation, the bosses 474b, 474c can be formed as thick as the bosses 474a, 474d. FIG. 22 illustrates another mounting structure 476A. In this structure 476A, the boss 474c (474b) does not have the recess 504 of FIG. 21. Other portions of the fuel rail mounting structure 476A are the same as those of the mounting structure 476.

Various combinations of the mounting structures 475, 475A, 476, 476A can be practiced. Preferably, mounting structures at end bosses surrounding one or more intermediate bosses, are constructed to be stronger against the stresses described above than those mounting structures at the intermediate bosses. However, the mounting structure 475, or the modified structure 475A, can be applied to all the bosses 474a, 474b, 474c, 474d. In this variation, the collars can be provided at all the bosses 474a, 474b, 474c, 474d. The collars also need not be used at all the bosses 474a, 474b, 474c, 474d. Additionally, the mounting structure 476A can be applied to the bosses 474a, 474d if the mounting structure 476 is applied to the intermediate bosses 474b, 474c because the mounting structure 476A is stronger than the mounting structure 476. It should also be noted that the mounting structures 475, 475A, 476, 476A can be applied to the cylinder bank 50a. Also, the number of bosses can vary. For example, three bosses can be applied instead of the four bosses described above.

Although this invention has been disclosed in the context of certain preferred embodiments, variations and examples, it will be understood by those skilled in the art that the present invention extends beyond the specifically disclosed embodiments to other embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

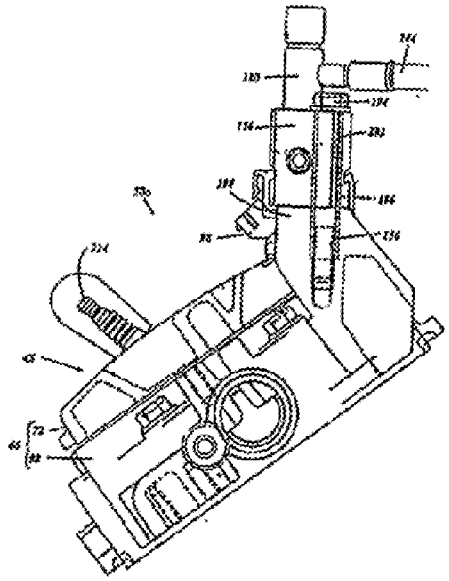

What is claimed is:

1. An internal combustion engine comprising an engine body defining a cylinder bore, a movable member movable within the cylinder bore, the engine body and the movable member together defining a combustion chamber, a fuel injector to supply fuel to the combustion chamber for combustion therein, a fuel rail defining a fuel passage through which fuel is supplied to the fuel injector, the fuel rail being mounted to the engine body, a fuel pump pressurizing the fuel, and a sensor unit elastically mounted to the fuel rail, the sensor unit comprising a fuel pressure sensor that detects a pressure of the fuel pressurized by the fuel pump.

2. The engine as set forth in claim 1, additionally comprising an elastic member, the sensor unit being mounted to the fuel rail such that the elastic member is interposed between the sensor unit and the fuel rail.

3. The engine as set forth in claim 2, wherein the sensor unit further comprises a pressure receiver, and the pressure receiver is coupled with the fuel pressure sensor.

4. The engine as set forth in claim 3, additionally comprising a second fuel conduit, the second fuel conduit connecting the pressure receiver with the first fuel rail.

5. The engine as set forth in claim 2, additionally comprising a support member supporting the sensor unit, the support member being interposed between the fuel rail and the sensor unit, and the support member being mounted to the fuel rail.

6. The engine as set forth in claim 5, wherein the elastic member is interposed between the support member and the fuel rail.

7. The engine as set forth in claim 6, wherein the support member is affixed to the fuel rail via the elastic member, and the sensor unit is affixed to the support member.

8. The engine as set forth in claim 5, wherein the elastic member is interposed between the support member and the sensor unit.

9. The engine as set forth in claim 8, wherein the support member is rigidly affixed to the fuel rail, and the sensor unit is affixed to the support member via the elastic member.

10. The engine as set forth in claim 5, wherein the sensor unit is spaced apart from an outer surface of the fuel rail.

11. The engine as set forth in claim 5, wherein the support member is a sheet of metal forming a mount section and a support section, the mount section is affixed to the fuel rail, and the support section is supporting the sensor unit.

12. The engine as set forth in claim 5, wherein the support member is a bolt.

13. The engine as set forth in claim 1, wherein the fuel rail is made of a metal material and is rigidly affixed to the engine body.

14. The engine as set forth in claim 1, wherein the engine body has a boss projecting therefrom, the fuel rail is affixed to the boss by a bolt, a bolt hole is defined to extend through the boss and into the engine body adjacent to the boss, the bolt hole has a threaded section at least in the engine body adjacent to the boss, and the bolt is screwed down into the threaded section of the bolt hole.

15. The engine as set forth in claim 14, wherein a portion of the bolt is spaced apart from an inner surface of the bolt hole.

16. The engine as set forth in claim 1, wherein the fuel injector is mounted to the fuel rail.

17. The engine as set forth in claim 1, wherein the fuel injector is disposed to spray fuel directly into the combustion chamber.

18. A marine drive comprising a propulsion device and an internal combustion engine powering the propulsion device, the engine comprising an engine body defining a cylinder bore, a movable member movable within the cylinder bore, the engine body and the movable member together defining a combustion chamber, a fuel injector to supply fuel to the combustion chamber for combustion therein, a fuel conduit defining a fuel passage through which fuel is supplied to the fuel injector, the fuel conduit being mounted to the engine body, a fuel pump pressurizing the fuel, and a sensor unit elastically mounted to the fuel conduit, the sensor unit comprising a fuel pressure sensor that detects a pressure of the fuel pressurized by the fuel pump.

19. An internal combustion engine comprising an engine body defining a cylinder bore, a movable member movable within the cylinder bore, the engine body and the movable member together defining a combustion chamber, a fuel injector to supply fuel to the combustion chamber for combustion therein, a fuel rail defining a fuel passage through which fuel is supplied to the fuel injector, the engine body having a boss projecting therefrom, a bolt hole being defined to extend through the boss and into the engine body adjacent to the boss, the bolt hole having a threaded section at least in the engine body adjacent to the boss, and a bolt being screwed down into the threaded section, a collar being inserted into a space defined between the bolt and the inner surface of the bolt hole.

20. The engine as set forth in claim 19, wherein the boss is formed together with the engine body in a unitary structure.

21. The engine as set forth in claim 19, wherein at least a part of the boss is formed separately from the engine body and is coupled with the engine body.

22. The engine as set forth in claim 19, wherein a portion of the bolt is spaced apart from an inner surface of the bolt hole.

23. An internal combustion engine comprising an engine body defining a cylinder bore, a movable member movable within the cylinder bore, the engine body and the movable member together defining a combustion chamber, a fuel injector to supply fuel to the combustion chamber for combustion therein, a fuel rail defining a fuel passage through which fuel is supplied to the fuel injector, the engine body having a boss projecting therefrom, a bolt hole being defined to extend at least into the boss, at least a part of the bolt hole having a threaded section, and a bolt being screwed down into the threaded section, at least a portion of the bolt being spaced apart from an inner surface of the bolt hole, and a collar inserted into a space defined between the bolt and the inner surface of the bolt hole.

24. The engine as set forth in claim 23, wherein the boss and the engine body define the bolt hole.

25. An internal combustion engine comprising an engine body defining a plurality of cylinder bores, movable members movable within the respective cylinder bores, the engine body and the movable members together defining a plurality of combustion chambers, a plurality of fuel injectors to supply fuel to the respective combustion chambers for combustion therein, a fuel rail defining a fuel passage through which fuel is supplied to the fuel injectors, the fuel rail being affixed to the engine body by at least first, second and third fastening mechanisms that are spaced apart from each other along a longitudinal axis of the fuel rail, the third mechanism being interposed between the first and second mechanisms, a magnitude of strength for the first and second mechanisms being greater than a magnitude of strength for the third mechanism.

26. An internal combustion engine comprising an engine body defining a plurality of cylinder bores, movable members movable within the respective cylinder bores, the engine body and the movable members together defining a plurality of combustion chambers, a plurality of fuel injectors to supply fuel to the respective combustion chambers for combustion therein, a fuel rail defining a fuel passage through which fuel is supplied to the fuel injectors, the engine body having first, second and third bosses extending therefrom, first and second bolt holes being defined to extend through the first and second bosses and into the engine body adjacent to the first and second bosses, a third bolt hole being defined to extend into the third boss and not into the engine body adjacent to the third boss, each one of the first and second bolt holes having a threaded section in the engine body adjacent to the first and second bosses, the third bolt hole having a threaded section in the third boss, and a plurality of bolts being screwed down into the respective threaded sections.

27. The engine as set forth in claim 26, wherein the first and second bosses are thicker than the third boss is.

28. The engine as set forth in claim 26, wherein the third boss is interposed between the first and second bosses.

29. The engine as set forth in claim 26, wherein at least a portion of each of the bolts is spaced apart from an inner surface of the corresponding bolt hole.

30. The engine as set forth in claim 29, wherein a collar is inserted into at least either the first or second bolt hole.

31. An internal combustion engine comprising an engine body defining a plurality of cylinder bores, movable members movable within the respective cylinder bores, the engine body and the movable members together defining a plurality of combustion chambers, a plurality of fuel injectors to supply fuel to the respective combustion chambers for combustion therein, a fuel rail defining a fuel passage through which fuel is supplied to the fuel injectors, the engine body having first, second and third bosses extending therefrom, the first and second bosses being thicker than the third boss, first, second and third bolt holes being defined to extend at least into the first, second and third bosses, respectively, a threaded section being formed in each one of the bolt holes, and a plurality of bolts being screwed down into the respective threaded sections.

32. The engine a set forth in claim 1 additionally comprising an elastic member elastically mounting the sensor unit to the fuel rail and being disposed between and contacting both the sensor unit and the fuel rail, the elastic member being configured to attenuate vibrations from the fuel rail.

33. The marine drive as set forth in claim 18 additionally comprising an elastic member elastically mounting the sensor unit to the fuel conduit and being disposed between and contacting both the sensor unit and the fuel conduit, the elastic member being configured to attenuate vibrations from the fuel conduit.

34. The marine drive as set forth in claim 33, wherein the fuel conduit is a fuel rail.

* * * * *

UNITED STATES PATENT AND TRADEMARK OFFICE
CERTIFICATE OF CORRECTION

| | |
|---|---|
| PATENT NO. | : 6,912,996 B2 |
| APPLICATION NO. | : 10/420538 |
| DATED | : July 5, 2005 |
| INVENTOR(S) | : Masahiko Kato |

It is certified that error appears in the above-identified patent and that said Letters Patent is hereby corrected as shown below:

The title page showing the illustrative figure should be deleted to be replaced with the attached title page.

The drawings 1-22, consisting of Figs. 1-22, should be deleted to be replaced with drawings, consisting of Figs. 1-22, as shown on the attached pages.

In Column 21, Line 48, in Claim 19, after "boss", please delete "and".

In Column 23, Line 1, in Claim 32, after "engine", please delete "a" and insert --as--.

Signed and Sealed this

Twelfth Day of June, 2007

JON W. DUDAS
*Director of the United States Patent and Trademark Office*

United States Patent
Kato

(12) United States Patent
(10) Patent No.: US 6,912,996 B2
(45) Date of Patent: Jul. 5, 2005

(54) ENGINE WITH FUEL INJECTION SYSTEM

(75) Inventor: Masahiko Kato, Shizuoka (JP)

(73) Assignee: Yamaha Marine Kabushiki Kaisha, Shizuoka (*) Notice: Subject to any disclaimer, the term of this patent is extended or adjusted under 35 U.S.C. 154(b) by 82 days.

(21) Appl. No.: 10/420,538

(22) Filed: Apr. 21, 2003

(65) Prior Publication Data
US 2004/0007212 A1 Jan. 15, 2004

(30) Foreign Application Priority Data
Apr. 19, 2002 (JP) .............................. 2002-117200
May 23, 2002 (JP) .............................. 2002-149597

(51) Int. Cl.⁷ ............................................ F02M 55/02
(52) U.S. Cl. ........................... 123/469; 123/456; 123/494
(58) Field of Search ............................... 123/456, 468, 123/469, 470, 494, 458

(56) References Cited

U.S. PATENT DOCUMENTS

| | | | |
|---|---|---|---|
| 5,036,669 A | * 8/1991 | Earleson et al. | 60/602 |
| 5,699,766 A | 12/1997 | Saito | |
| 5,723,780 A | * 3/1998 | Miwa et al. | 73/119 A |
| 5,785,025 A | * 7/1998 | Yoshiume et al. | 123/497 |
| 5,791,304 A | * 8/1998 | Taipale | 123/73 C |
| 5,957,112 A | 9/1999 | Takahashi et al. | |
| 6,032,638 A | 3/2000 | Kato | |
| 6,032,654 A | * 3/2000 | Kato | 123/509 |
| 6,058,907 A | 5/2000 | Motose et al. | |
| 6,098,013 A | * 8/2000 | Mueller | 701/112 |
| 6,119,453 A | 9/2000 | Motose et al. | |
| 6,135,095 A | 10/2000 | Motose et al. | |
| 6,148,777 A | 11/2000 | Motose et al. | |
| 6,213,096 B1 | 4/2001 | Kato et al. | |
| 6,220,217 B1 | 4/2001 | Kato | |
| 6,276,338 B1 | 8/2001 | Kato et al. | |
| 6,295,955 B1 | 10/2001 | Kato et al. | |
| 6,295,956 B1 | 10/2001 | Kato et al. | |
| 6,302,086 B1 | 10/2001 | Kato | |
| 6,302,088 B1 | 10/2001 | Kato | |
| 6,305,354 B1 | 10/2001 | Kato | |
| 6,321,711 B1 | 11/2001 | Kato | |
| 6,354,277 B1 | 3/2002 | Kato | |
| 6,357,402 B1 | 3/2002 | Kato | |
| 6,460,511 B2 | 10/2002 | Kato | |
| 6,609,372 B2 | * 8/2003 | Maddock et al. | 60/602 |

FOREIGN PATENT DOCUMENTS

| | | |
|---|---|---|
| JP | 2000-179432 | 12/1998 |
| JP | 2001-65386 | 8/1999 |

* cited by examiner

Primary Examiner—Thomas Moulis
(74) Attorney, Agent, or Firm—Knobbe, Martens, Olson & Bear, LLP

(57) ABSTRACT

An engine incorporates a fuel injector to supply fuel to a combustion chamber defined in an engine body. At least one fuel rail defines a fuel passage through which fuel is supplied to the fuel injector. The fuel rail is mounted to the engine body. A fuel pump pressurizes the fuel. A sensor unit is elastically mounted to the fuel rail. The sensor unit has a fuel pressure sensor that detects a pressure of the fuel pressurized by the fuel pump. The engine body has bosses that project therefrom. The engine body defines bolt holes that extend through the bosses and into the engine body adjacent to the bosses. A threaded section is formed in each bolt hole in the engine body adjacent to the corresponding boss. A bolt is screwed down into each threaded section. A portion of each bolt is spaced apart from an inner surface of a corresponding bolt hole to reduce the effects of thermal expansion of the engine body and the fuel rail.

34 Claims, 22 Drawing Sheets